(12) United States Patent
Slotznick

(10) Patent No.: US 11,889,187 B1
(45) Date of Patent: *Jan. 30, 2024

(54) COMPUTER PROGRAM PRODUCT AND METHOD FOR AUTO-FOCUSING ONE OR MORE LIGHTING FIXTURES ON SELECTED PERSONS IN A VENUE WHO ARE PERFORMERS OF A PERFORMANCE OCCURRING AT THE VENUE

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,750

(22) Filed: Jul. 28, 2023

Related U.S. Application Data

(63) Continuation-in-part of application No. 18/117,199, filed on Mar. 3, 2023, now Pat. No. 11,750,925,
(Continued)

(51) Int. Cl.
*G10L 15/22* (2006.01)
*H04N 23/67* (2023.01)
(Continued)

(52) U.S. Cl.
CPC ........... *H04N 23/675* (2023.01); *G10L 15/22* (2013.01); *H04N 23/611* (2023.01); *H04R 1/08* (2013.01); *H04R 2420/07* (2013.01)

(58) Field of Classification Search
CPC ........ G01S 1/725; G01S 5/02521; G01S 5/10; G06F 3/04886; G06Q 10/063;
(Continued)

(56) References Cited

U.S. PATENT DOCUMENTS

| 7,092,002 | B2 * | 8/2006 | Ferren | H04N 7/142 348/E7.083 |
| 7,564,476 | B1 * | 7/2009 | Coughlan | H04N 7/147 348/14.08 |

(Continued)

OTHER PUBLICATIONS

Marc Rochkind, "How to Set Up an Affordable Hybrid Zoom Meeting." Downloaded from web page: https://community.zoom.com/t5/Meetings/How-to-Set-Up-an-Affordable-Hybrid-Zoom-Meeting/m-p/56161?attachment-id=1918, publication date: Apr. 24, 2022, 4 pages.

(Continued)

*Primary Examiner* — Gerald Gauthier
(74) *Attorney, Agent, or Firm* — Panitch Schwarze Belisario & Nadel LLP

(57) ABSTRACT

One or more lighting fixtures are auto-focused on selected persons in a venue who are performers of a performance occurring at the venue. Each of the performers are associated with a tag of a real-time location system (RTLS). The auto-focusing operates by receiving a signal indicating a scene of a performance that is currently being performed, identifying which RTLS-tagged performer or performers are active during the currently performed scene, identifying the position(s) of the RTLS-tagged performer or performers who are active during the currently performed scene, and auto-focusing the one or more lighting fixtures on the identified position(s) of the RTLS tag.

14 Claims, 20 Drawing Sheets

Related U.S. Application Data which is a continuation of application No. 17/952,802, filed on Sep. 26, 2022, now Pat. No. 11,601,731.

(60) Provisional application No. 63/400,790, filed on Aug. 25, 2022.

(51) Int. Cl.
*H04R 1/08* (2006.01)
*H04N 23/611* (2023.01)

(58) Field of Classification Search
CPC ............ G06Q 20/1085; G06Q 20/3829; G06T 17/05; G06V 10/763; G07C 9/20; G08B 21/0469; G10L 17/22; G10L 25/22; H04B 17/318; H04L 65/403; H04N 7/142; H04N 7/147; H04N 7/155; H04N 7/173; H04N 7/18; H04N 21/234327; H04N 21/643; H04N 23/611; H04N 23/675; H04N 23/90; H04R 1/08; H04R 27/00; H04R 2420/07; H04W 4/023; H04W 4/026; H04W 4/80; H05B 47/105
See application file for complete search history.

(56) References Cited

U.S. PATENT DOCUMENTS

| | | | |
|---|---|---|---|
| 7,564,478 B2 | 7/2009 | Couglan et al. | |
| 7,920,159 B2* | 4/2011 | Ueno | H04N 21/234327 348/14.1 |
| 8,035,335 B2 | 10/2011 | Duron et al. | |
| 8,130,257 B2* | 3/2012 | Cutler | H04N 23/611 382/103 |
| 8,274,544 B2 | 9/2012 | Kurtz et al. | |
| 8,373,739 B2* | 2/2013 | Sampsel | H04N 7/173 348/14.08 |
| 8,773,499 B2* | 7/2014 | Watson | H04N 23/90 348/14.15 |
| 8,848,029 B2* | 9/2014 | Moletti | H05B 47/105 348/14.1 |
| 9,007,425 B1* | 4/2015 | Simon | H04N 7/18 348/14.05 |
| 9,633,270 B1 | 4/2017 | Tangeland et al. | |
| 9,668,164 B2 | 5/2017 | Richley et al. | |
| 9,690,538 B1* | 6/2017 | Doyle, III | H04W 4/023 |
| 9,759,803 B2 | 9/2017 | O'Hagan et al. | |
| 9,942,513 B1 | 4/2018 | Aarrestad et al. | |
| 9,942,518 B1* | 4/2018 | Tangeland | G06V 10/763 |
| 10,070,040 B2 | 9/2018 | Meyer | |
| 10,257,465 B2 | 4/2019 | Tangeland et al. | |
| 10,356,362 B1* | 7/2019 | Rudberg | H04N 7/147 |
| 10,390,182 B2 | 8/2019 | Swart | |
| 10,447,970 B1 | 10/2019 | Chu | |
| 10,659,679 B1 | 5/2020 | Beeler et al. | |
| 10,860,059 B1 | 12/2020 | Knoppert | |
| 11,107,490 B1 | 8/2021 | Slotznick | |
| 11,601,731 B1* | 3/2023 | Slotznick | H04N 23/611 |
| 2003/0048353 A1 | 3/2003 | Kenoyer et al. | |
| 2003/0090564 A1* | 5/2003 | Strubbe | H04N 7/142 348/E7.083 |
| 2006/0259416 A1 | 11/2006 | Johnson | |
| 2006/0290519 A1 | 12/2006 | Boate et al. | |
| 2007/0074123 A1 | 3/2007 | Omura et al. | |
| 2009/0002237 A1 | 1/2009 | Nonoyama | |
| 2010/0087241 A1* | 4/2010 | Nguyen | G07F 17/3227 463/17 |
| 2010/0198690 A1 | 8/2010 | Gilvar et al. | |
| 2010/0228602 A1 | 9/2010 | Gilvar et al. | |
| 2010/0241693 A1 | 9/2010 | Ando et al. | |
| 2011/0119224 A1 | 5/2011 | Mangione-Smith | |
| 2011/0135149 A1 | 6/2011 | Gefen | |
| 2011/0137680 A1* | 6/2011 | Sweeney | G07C 9/20 705/2 |
| 2011/0228041 A1* | 9/2011 | Krisbergh | H04N 7/147 348/14.12 |
| 2011/0285808 A1* | 11/2011 | Feng | H04N 7/142 348/E7.083 |
| 2012/0013509 A1 | 1/2012 | Wisherd et al. | |
| 2012/0046978 A1* | 2/2012 | Cartwright | G06Q 10/063 707/705 |
| 2012/0062729 A1 | 3/2012 | Hart et al. | |
| 2012/0084812 A1 | 4/2012 | Thompson et al. | |
| 2012/0300014 A1* | 11/2012 | Krantz | H04N 7/147 348/E7.083 |
| 2012/0323090 A1 | 12/2012 | Bechtel et al. | |
| 2012/0323592 A1 | 12/2012 | Palmer et al. | |
| 2013/0010984 A1* | 1/2013 | Hejnicki | H04R 27/00 381/107 |
| 2013/0127620 A1 | 5/2013 | Siebers et al. | |
| 2013/0253950 A1 | 9/2013 | Vanderpohl, III et al. | |
| 2013/0317944 A1* | 11/2013 | Huang | G01S 5/02521 455/457 |
| 2014/0229387 A1 | 8/2014 | Chow | |
| 2014/0316792 A1 | 10/2014 | Siddiqui | |
| 2014/0361928 A1 | 12/2014 | Hughes et al. | |
| 2015/0057981 A1 | 2/2015 | Gross | |
| 2016/0014178 A1* | 1/2016 | Cholkar | H04N 21/643 348/14.12 |
| 2016/0134838 A1 | 5/2016 | Tangeland et al. | |
| 2016/0171202 A1 | 6/2016 | Goad | |
| 2016/0226207 A1 | 8/2016 | Fullerton et al. | |
| 2016/0359941 A1 | 12/2016 | Kvaal et al. | |
| 2017/0124365 A1* | 5/2017 | Shin | G01S 5/10 |
| 2017/0238114 A1* | 8/2017 | Milne | H04W 4/80 381/79 |
| 2017/0324933 A1 | 11/2017 | Alrod et al. | |
| 2018/0020285 A1 | 1/2018 | Zass | |
| 2018/0098145 A1 | 4/2018 | McGary et al. | |
| 2018/0181908 A1 | 6/2018 | Jones et al. | |
| 2018/0206069 A1* | 7/2018 | Santos | H04W 4/026 |
| 2018/0211718 A1 | 7/2018 | Heath | |
| 2018/0242169 A1 | 8/2018 | Kowal et al. | |
| 2018/0247022 A1 | 8/2018 | Kaminsky | |
| 2018/0293221 A1 | 10/2018 | Finkelstein et al. | |
| 2018/0329896 A1 | 11/2018 | Goethals et al. | |
| 2018/0336972 A1 | 11/2018 | Carbonell et al. | |
| 2019/0019494 A1 | 1/2019 | Wheeler et al. | |
| 2019/0026436 A1 | 1/2019 | Bender et al. | |
| 2019/0141473 A1 | 5/2019 | Swart | |
| 2019/0147711 A1 | 5/2019 | Grom | |
| 2019/0208381 A1* | 7/2019 | Booij | G01S 1/725 |
| 2019/0281573 A1 | 9/2019 | Tyagi et al. | |
| 2019/0379839 A1 | 12/2019 | Hellerud et al. | |
| 2020/0082396 A1* | 3/2020 | Chow | G06Q 20/1085 |
| 2020/0104522 A1 | 4/2020 | Collart | |
| 2020/0142021 A1 | 5/2020 | Riley | |
| 2020/0228928 A1 | 7/2020 | Good et al. | |
| 2020/0257788 A1 | 8/2020 | Bhattacharyya et al. | |
| 2020/0351435 A1* | 11/2020 | Therkelsen | H04N 7/155 |
| 2020/0368616 A1 | 11/2020 | Delamont | |
| 2021/0037337 A1 | 2/2021 | Park et al. | |
| 2021/0095974 A1 | 4/2021 | Bondi et al. | |
| 2021/0144459 A1 | 5/2021 | Kaiser | |
| 2021/0248283 A1* | 8/2021 | Kincart | G06T 17/05 |
| 2021/0306803 A1* | 9/2021 | Swart | H04B 17/318 |
| 2021/0350197 A1* | 11/2021 | Chow | G06Q 20/3829 |
| 2021/0399911 A1 | 12/2021 | Jorasch et al. | |
| 2022/0101847 A1* | 3/2022 | Receveur | G10L 17/22 |
| 2022/0130223 A1* | 4/2022 | Garbey | G08B 21/0469 |
| 2022/0224735 A1* | 7/2022 | Tokuchi | H04L 65/403 |
| 2023/0025405 A1 | 1/2023 | Kim et al. | |

OTHER PUBLICATIONS

"Going Hybrid" Hybrid Meeting Setup and Tips, by Rotary District 5950 with contributions from Rotary Districts 5960 and 6690. Downloaded from https://portal.ciubrunner.ca/50084/Documents/en-ca/bf9066b3-86d1-482e-bbfd-a80ce4f37357/1/ on Oct. 1, 2022. Document marked "Last updated Aug. 18, 2020". Original posting date: unknown, 2 pages.

(56) References Cited

OTHER PUBLICATIONS

Meeting Owl 3, product description from Owl Labs. Downloaded from https://resources.owllabs.com/hubfs/website/pdps/mo3%20datasheet/datasheet_mo3_en.pdf on Oct. 1, 2022. Copyright 2022. Original posting date: unknown, 3 pages.

"Getting Started with Zoom Rooms", product description from Zoom Support at Zoom Video Communications, Inc. Downloaded from https://support.zoom.us/hc/en-us/articles/207483343-Getting-started-with-Zoom-Rooms on Oct. 1, 2022. Document marked: last update Mar. 22, 2022. Original posting date: unknown. 3 pages.

"Getting Started with Smart Gallery", product description from Zoom Support at Zoom Video Communications, Inc. Downloaded from https://support.zoom.us/hc/en-us/articles/4403190845069-Getting-started-with-Smart-Gallery on Oct. 1, 2022. Document marked: last update Jun. 27, 2022. Original posting date: unknown, 4 pages.

"All You Need to Know About Smart Gallery and Why It's Changing Hybrid Meetings", by Cynthia Lee, product description on Zoom Blog at Zoom Video Communications, Inc. Downloaded from https://blog.zoom.us/all-you-need-to-know-about-smart-gallery/ on Oct. 1, 2022. Article dated: Dec. 8, 2022, 3 pages.

"Zoom Rooms Design Guide", product support from Zoom Support at Zoom Video Communications, Inc. Downloaded from https://support.zoom.us/hc/en-us/articles/360021724691-Zoom-Rooms-Design-Guide on Oct. 1, 2022. Last update Jul. 25, 2022. Original posting date: unknown, 2 pages.

Photo of Classroom at the Penn State Law School, in State College, Pennsylvania. Image of Penn State Law School classroom/lecture hall is embedded in the page: https://pennstatelaw.psu.edu/academics/research-centers. Image url: https://pennstatelaw.psu.edu/sites/default/files/styles/content_header_image/public/PSL_Students_in_classroom_0.png?itok=5kFmDfyJ, downloaded Oct. 1, 2022. Page copyright 2019. Date at which picture taken: unknown, 1 page.

Wikipedia entry for "Real-time locating system." downloaded from web page: https://en.wikipedia.org/wiki/Real-time_locating_system, download date: Aug. 22, 2022, page last edited: Jun. 24, 2022, 10 pages.

What is RTLS—Real Time Location System? Litum blog posting, downloaded from web page: https://litum.com/blog/what-is-rtls-real-time-location-system-rfid/, publication date: Jul. 15, 2021, 14 pages.

"How a pair of microchips could transform football into an intricate dance of data", by Al Dellinger, posted on Daily Dot on Aug. 12, 2015, updated on May 18, 2021. Downloaded from https://www.dailydot.com/debug/nfl-rfid-player-tracking-zebra-technologies/ on Oct. 1, 2022. 6 pages.

Phenyx Pro PTU-5000A Quad-Channel UHF Wireless Microphone System, product description from Phenyx Pro. Downloaded from https://phenyxpro.com/products/ptu-5000a on Oct. 2, 2022. Original posting date: unknown, 3 pages.

Logitech Rally Camera, product description from Logitech, Inc. Downloaded from https://www.logitech.com/content/dam/logitech/en/video-collaboration/pdf/rally-camera.pdf on Oct. 2, 2022. Published Jun. 2018, 2 pages.

Office Action dated Dec. 6, 2022 in U.S. Appl. No. 17/952,802.

Wikipedia entry for "Intelligent lighting", downloaded on Aug. 4, 2023 from webpage: https://en.wikipedia.org/wiki/Intelligent_lighting, 9 pages.

Edgar Cervantes, "Camera zoom explained: How optical, digital, and hybrid zoom work", Android Authority, Jan. 11, 2022, downloaded on Aug. 4, 2023 from webpage: https://www.androidauthority.com/camera-zoom-optical-digital-hybrid-1021264/, 2 pages.

Wikipedia entry for "Stage lighting instrument", downloaded on Aug. 4, 2023 from webpage: https://en.wikipedia.org/wiki/Stage_lighting_instrument, 15 pages.

Wikipedia entry for "Wireless microphone", downloaded on Aug. 4, 2023 from webpage: https://en.wikipedia.org/wiki/Wireless_microphone, 11 pages.

Emily Krings, "How to Stream Live From an Apple iPhone in 6 Easy Steps", Dacast, Mar. 28, 2023, downloaded on Aug. 4, 2023 from webpage: https://www.dacast.com/blog/how-to-stream-live-from-iphone/, 8 pages.

Tom May, "The best iPhone microphone 2023: get high-quality audio with your Apple phone", Digital Camera World, last updated May 9, 2023, downloaded on Aug. 4, 2023 from webpage: https://www.digitalcameraworld.com/buying-guides/best-microphones-for-iphone, 15 pages.

Wikipedia entry for "Find My Device", downloaded on Aug. 4, 2023 from webpage: https://en.wikipedia.org/wiki/Find_My_Device, 2 pages.

Wikipedia entry for "Find My", downloaded on Aug. 4, 2023 from webpage: https://en.wikipedia.org/wiki/Find_My, 5 pages.

Litum, "BLE vs UWB—Which Technology is Better for RTLS?", Apr. 1, 2022, downloaded on Aug. 4, 2023 from webpage: https://litum.com/ble-vs-uwb-which-technology-is-better-for-rfid-rtls/, 5 pages.

Wikipedia entry for "Voice activity detection", downloaded on Aug. 4, 2023 from webpage: https://en.wikipedia.org/wiki/Voice_activity_detection, 4 pages.

Wikipedia entry for "Voice-operated switch", downloaded on Aug. 4, 2023 from webpage: https://en.wikipedia.org/wiki/Voice-operated_switch, 2 pages.

Wikipedia entry for "Caller ID", downloaded on Aug. 4, 2023 from webpage: https://en.wikipedia.org/wiki/Caller_ID, 15 pages.

Apple Insider, "AirTag", downloaded on Aug. 4, 2023, page updated 4 weeks previously from webpage: https://appleinsider.com/inside/airtags, 9 pages.

Kyle Barr, "Apple and Google Set Joint Standards to stop AirTag Stalking", Gizmodo, article updated May 2, 2023, downloaded on Aug. 4, 2023 from webpage: https://gizmodo.com/airtag-apple-google-find-my-app-1850396569, 3 pages.

Social Tables Blog, "Tech Thursday: The Trick to Calculate Event Capacity Correctly in 3 Simple Steps", Cvent, downloaded on Aug. 4, 2023 from webpage: https://www.socialtables.com/blog/event-planning/capacity-party-space-calculator/, 8 pages.

Ash Turner, "Number of iPhone Users in the World/USA (2023)", Bank My Cell, page appears to have been last modified on Jun. 5, 2023, downloaded on Aug. 4, 2023 from webpage: https://www.bankmycell.com/blog/number-of-iphone-users, 6 pages.

David Charnoy, "Best Earbuds for Phone Calls for 2023: Earbuds With Mic", CNET, Jul. 17, 2023, downloaded on Aug. 4, 2023 from webpage: https://www.cnet.com/tech/mobile/best-wireless-earbuds-and-bluetooth-headphones-for-making-calls/, 17 pages.

\* cited by examiner

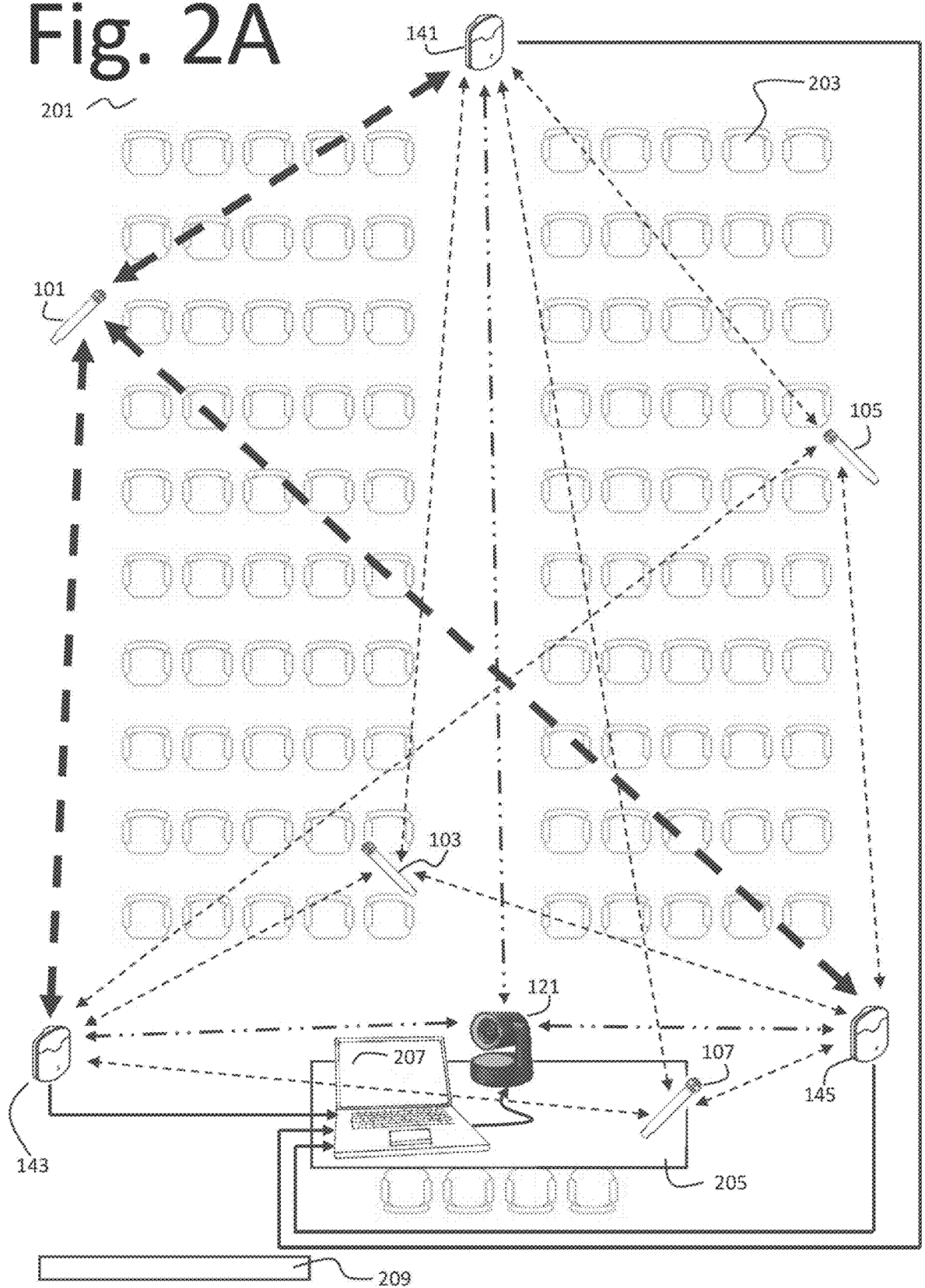

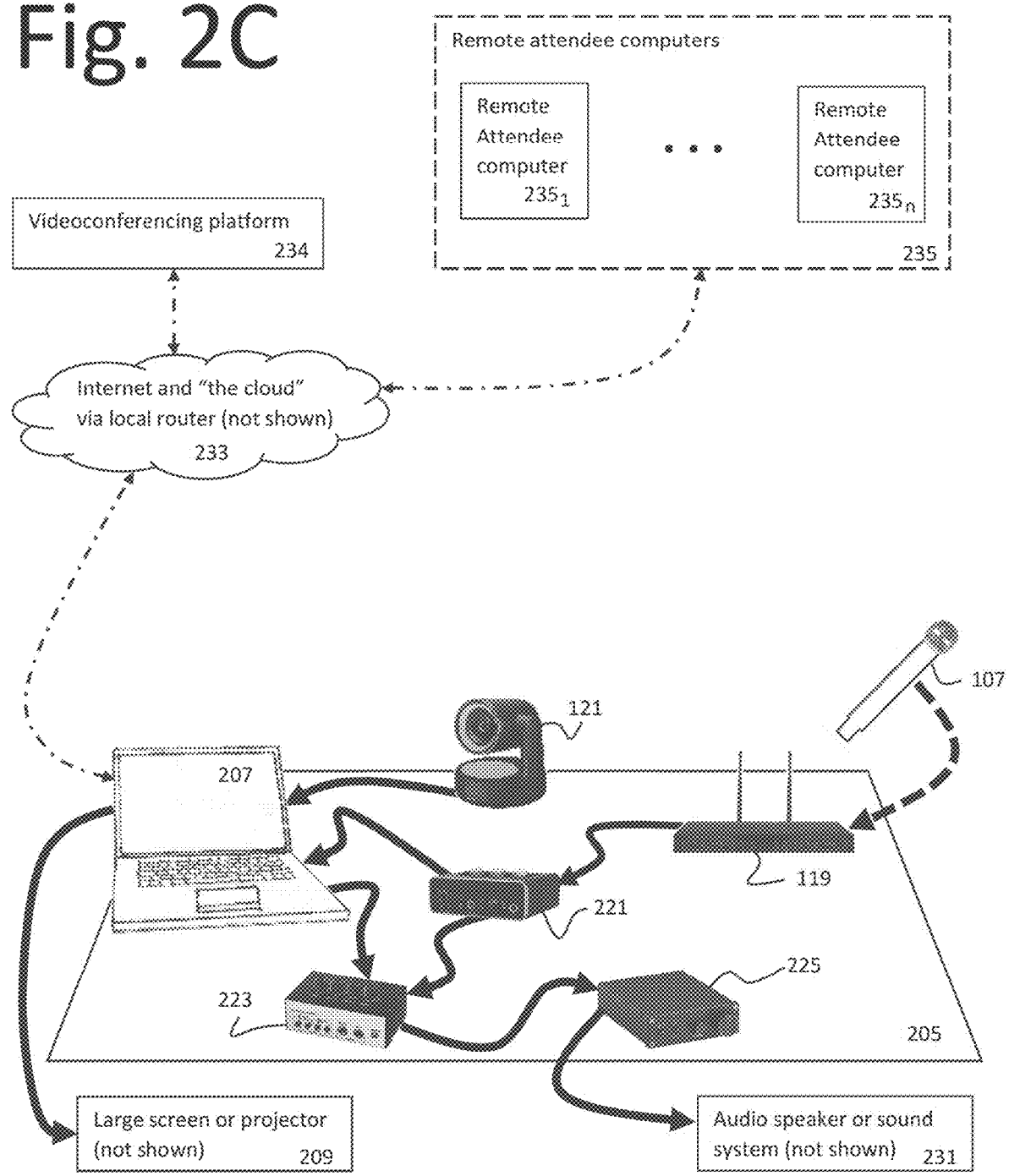

Flow chart for calibration of RFID virtual mesh

Flow chart for setting default webcam view

Fig. 8A  Microphone Locater System set-up
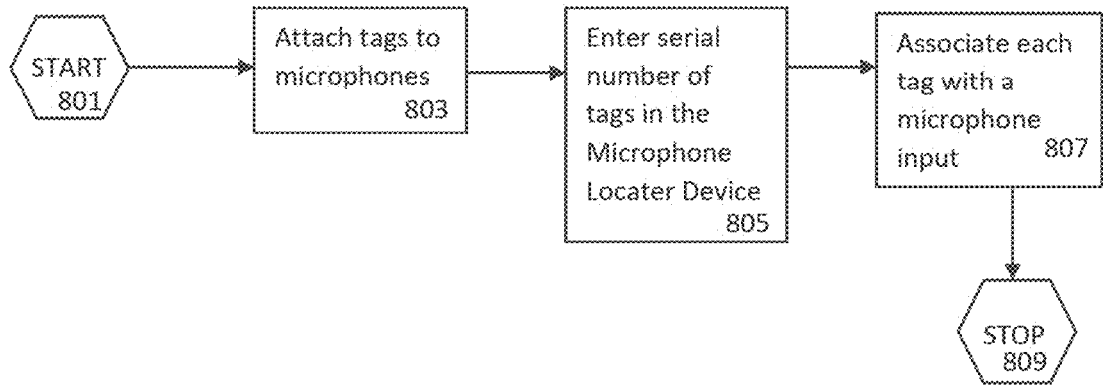
Fig. 8B  Processing within Microphone Locater Device
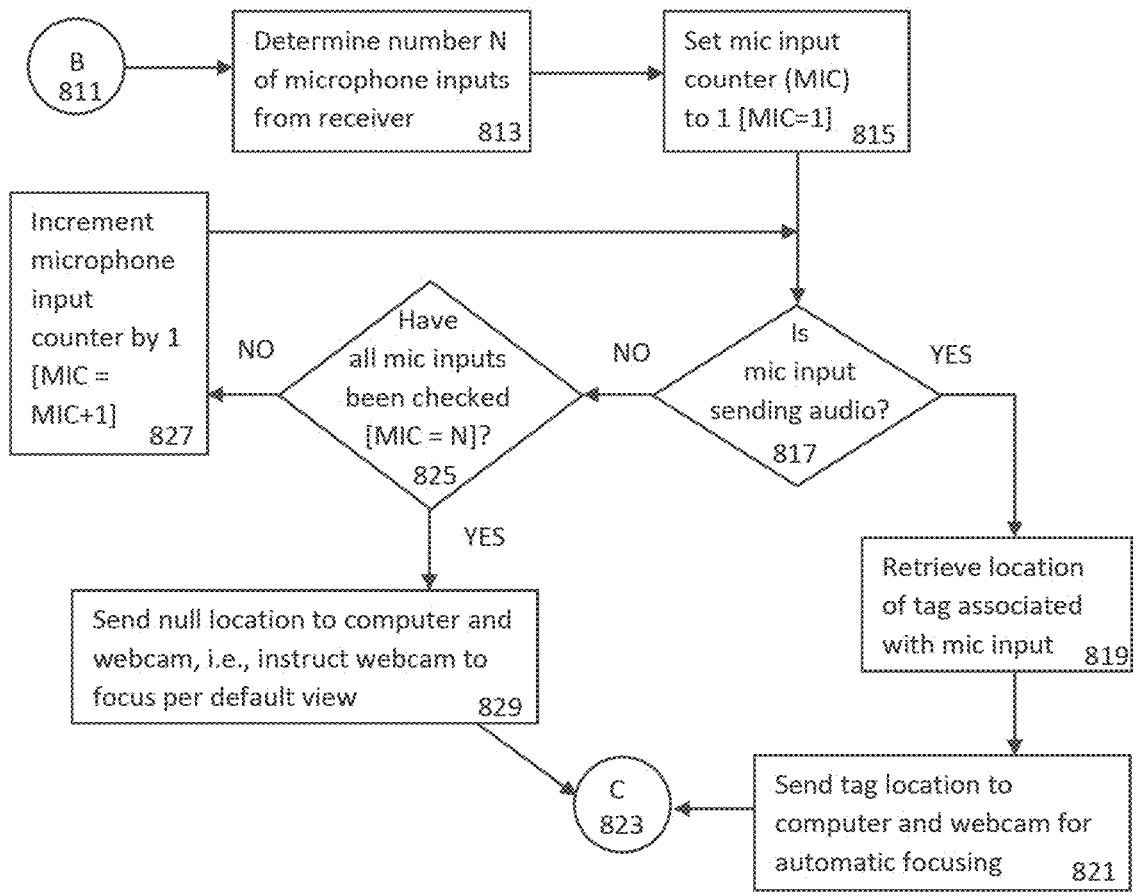

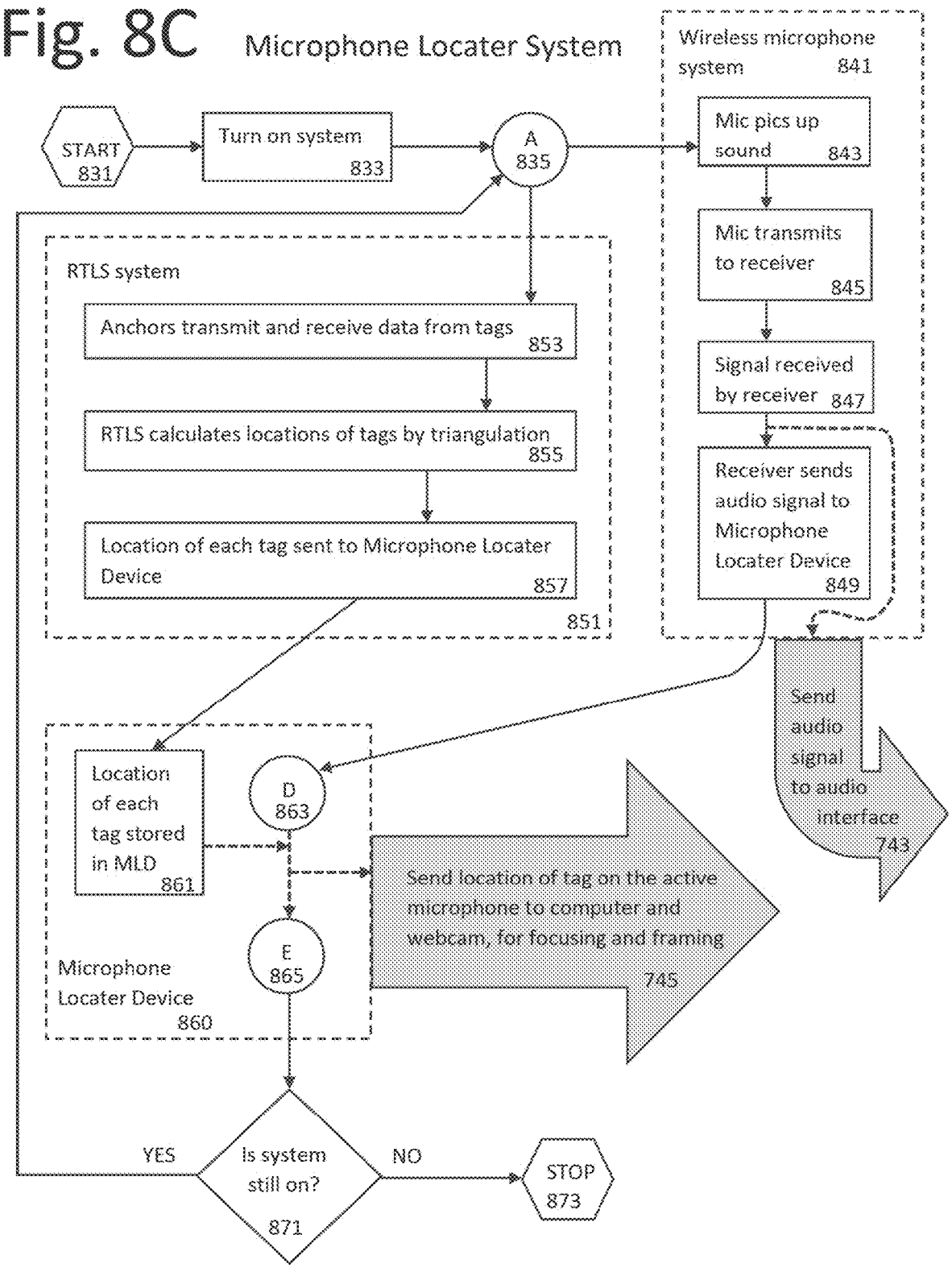

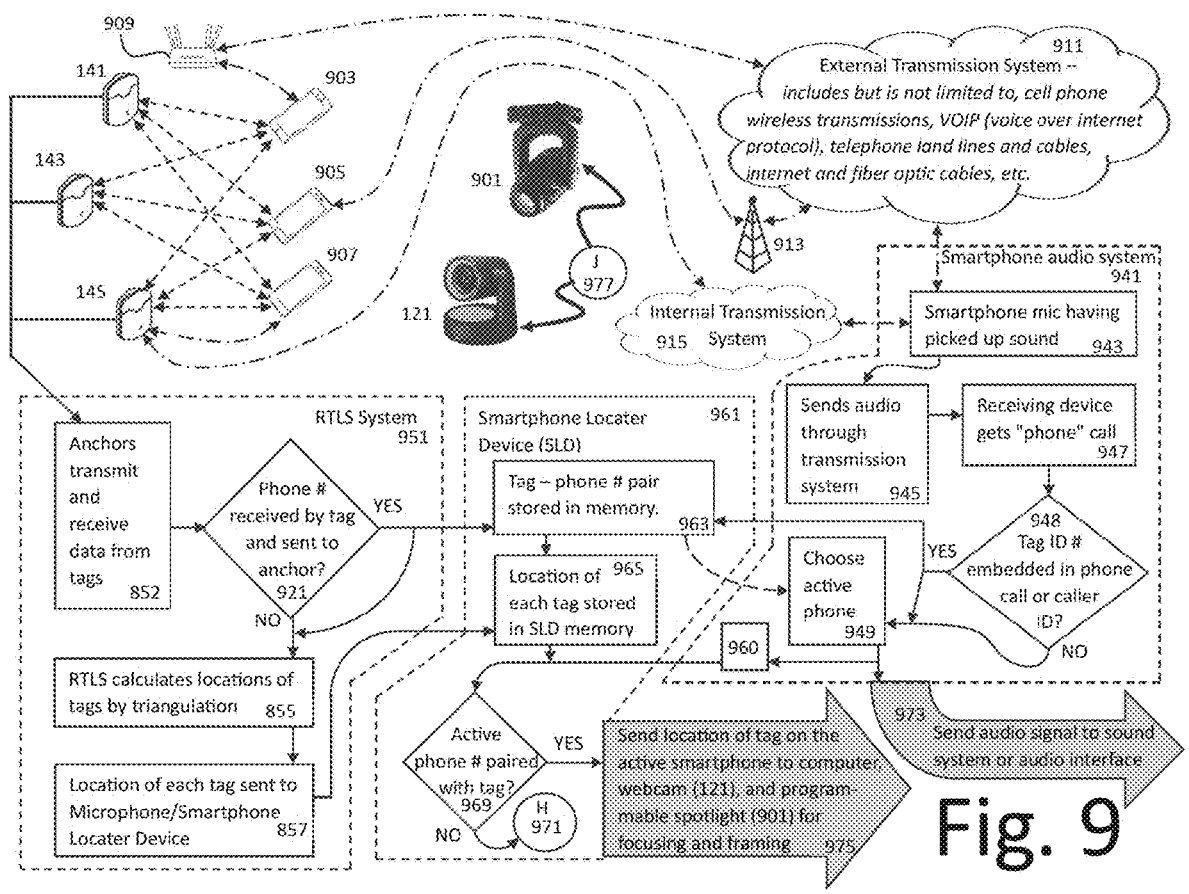

1001  1003  1005

1011
1013
1015

1021  1025
1023

1033
1031  1035 database 1100

| RTLS tag identifier | performer | name of performer |
|---|---|---|
| 144557788 | P1 | John Doe |
| 144557789 | P2 | Mary Smith |
| 144557790 | P3 | Bob Silver |
| ⋮ | ⋮ | |

Figure 11 database 1200

| scene | lighting | active microphone | notes |
|---|---|---|---|
| 1 | P1 | P1 | P1 is talking |
| 2 | P1, P2 | P1 | P1 is talking, P2 is dancing |
| 3 | P1, P3 | P1, P3 | P1 and P3 are talking |
| 4 | P2, P3 | None | P2 and P3 are dancing |

Figure 12 database 1300

| scene | lighting fixture 1 | lighting fixture 2 | camera 1 | camera 2 |
|---|---|---|---|---|
| 1 | P1 | none | P1 | none |
| 2 | P1 | P2 | P1 | P2 |
| 3 | P1 | P3 | P1 | P3 |
| 4 | P2 | P3 | P2 | P3 |

Figure 13

START

1400 - Detect when a microphone having an RTLS tag affixed thereto is active

↓

1402 – Identify the position of RTLS tag

↓

1404 – Auto-focus a camera on the identified position of the RTLS tag

↓

END

Figure 14

COMPUTER PROGRAM PRODUCT AND METHOD FOR AUTO-FOCUSING ONE OR MORE LIGHTING FIXTURES ON SELECTED PERSONS IN A VENUE WHO ARE PERFORMERS OF A PERFORMANCE OCCURRING AT THE VENUE

CROSS-REFERENCE TO RELATED APPLICATIONS

This application is a continuation-in-part of copending U.S. Non-Provisional patent application Ser. No. 18/117,199 filed Mar. 3, 2023, now U.S. Pat. No. 11,750,925, which, in turn, is a continuation of U.S. Non-Provisional patent application Ser. No. 17/952,802 filed Sep. 26, 2022, now U.S. Pat. No. 11,601,731, both of which are incorporated by reference herein.

This application claims priority to U.S. Provisional Patent Application No. 63/400,790 filed Aug. 25, 2022, which is incorporated by reference herein.

This application is related to the following concurrently filed U.S. Non-Provisional Patent Applications:

1. U.S. application Ser. No. 18/227,740 filed Jul. 28, 2023 entitled "Computer program product and method for auto-focusing a camera on a person in a venue who is wearing, or carrying, or holding, or speaking into a microphone at the venue."

2. U.S. application Ser. No. 18/227,746 filed Jul. 28, 2023 entitled "Computer program product and method for auto-focusing a lighting fixture on a person in a venue who is wearing, or carrying, or holding, or speaking into a microphone at the venue."

3. U.S. application Ser. No. 18/227,757 filed Jul. 28, 2023 entitled "Computer program product for auto-focusing one or more cameras on selected persons in a venue who are performers of a performance occurring at the venue."

BACKGROUND OF THE INVENTION

1. Introduction

The general field of invention is the technology to facilitate and enhance "hybrid" meetings—that is, gatherings of people where some participants attend in-person, and other participants attend virtually via an online videoconferencing platform such as (but not limited to) Zoom.

In 2020, the Covid-19 pandemic forced people and organizations to practice social distancing and avoid meeting in person. Instead, they met online virtually using videoconferencing platforms. Since then, with medical advances to combat Covid, (including both preventive measures such as vaccines, and medical treatments for those infected), many organizations have reverted to in-person meetings, while other organizations are experimenting with hybrid meetings and gatherings to accommodate more vulnerable or physically distant participants. People are finding that neither the meeting technologies and meeting protocols that worked for in-person meetings, nor those that worked for virtual meetings on Zoom, necessarily work for every hybrid meeting format.

The present invention provides novel and improved technology for hybrid meetings that
(a) use an auditorium-style seating arrangement for the in-person component of the meeting, in which seats are arranged in rows, facing front, as in a theater, with the primary in-person speaker(s) generally at the front of the room (in contrast to a committee-style meeting where all in-person attendees are seated around a table),
(b) allow speakers, panelists, and audience members to join the meeting from both the in-person component as well as virtually from online,
(c) follow a meeting protocol where one person talks at a time,
(d) allow the generally-more-passive audience members who are neither presenters nor panelists (whether the more-passive audience members are seated in the rows of seats or listening/attending online) to verbally ask questions or offer comments and be seen, and in-person audience members who comment are expected to stand while delivering comments.

One goal for hybrid meeting technologies and protocols is to create a level or equitable playing field for participation, so that every participant, whether attending in-person or attending remotely online, has an "equal" or "equivalent" experience, and "equal" or "equivalent" opportunity to participate. However, what "equal" and "equivalent" mean varies with meeting attributes such as (but not limited to) the number of attendees (in-person versus online), the size of room, the meeting format (e.g. a small "round table" committee discussion versus a large conference presentation to an audience in auditorium-style seating), the purpose of the meeting, and the technology budget (e.g. how many video cameras, video camera operators, and production engineers fit in the budget).

With respect to audio equality and inclusiveness, consider a speaker, (a) whether attending online or attending the meeting in-person, and (b) whether speaking from the lectern (dais, pulpit, rostrum or podium, or panelists table) at the front of the room, making comments from the back of a large room, or attending the meeting virtually from a distant location and speaking online over a videoconferencing platform such as (but not limited to) Zoom. Each speaker wants the audio of his or her words to be to be heard as well as any other speaker in the room or online, and wants his or her words to be clearly understood by members of both the online audience and the in-person audience. Similarly, a listener (whether attending in-person or online) wants to hear each speaker as well as any other speaker.

One particular set-up for a hybrid meeting that provides this audio equality is described clearly, concisely, and with diagrams by Marc Rochkind (https://community.zoom.com/t5/Meetings/How-to-Set-Up-an-Affordable-Hybrid-Zoom-Meeting/m-p/56161?attachment-id=1918). The set-up uses wireless roving directional mics, a USB audio interface, an audio mixer, an in-room speaker with amplifier, and a laptop computer connected to the internet and a videoconferencing platform such as Zoom. The meeting protocol requires handing the mics to in-person audience members, and instructing the audience how to speak clearly into them, along with the importance of connecting to the in-room speaker to provide audio feedback to in-person audience members who are speaking into the wireless mics. Importantly, this audio equality is delivered without requiring a production technician to be providing active audio mixing during the event. This type of set-up will be discussed in more detail below as prior art, in the context of FIG. 2C. However, as is obvious to those knowledgeable in the art, alternative equipment can be configured similarly to provide this kind of audio coverage for the in-person portion of a hybrid meeting and connecting the audio among the in-person and the online portions of the meeting.

With respect to video equality and inclusiveness, consider a speaker (a) whether attending online or attending the meeting in-person, and (b) whether speaking from the lectern at the front of the room while presenting to the audience in-person, making comments from the back of a large room, or speaking to the meeting virtually from a distant location via a videoconferencing platform. Each speaker wants any video of him or her (if allowed by the meeting host and format) to be as crisp, focused, prominent and visible to the featured speakers and panelists (and most often members of the online and in-person audiences) as the video of any other speaker in the room or online. And a viewer (whether attending in-person or online) wants to see each speaker as well as the other speakers.

Current technology does not provide this kind of video equality and inclusiveness for large auditorium-style meetings, at least not without expensive multiple cameras and camera operators, or expensive specially outfitted and engineered auditoriums (see discussion below). In contrast, most hybrid meetings that don't employ a video camera operator only deploy one fixed focus webcam. This may be aimed at the front of the auditorium to capture video of the featured speaker or panelists (for the in-person auditorium-style part of the meeting). Alternatively (as described in Marc Rochkind's set-up) this camera can focus on the in-person participants. Some installations allow the host/moderator/lead presenter to remotely move the focus of the webcam to different panelists or presenters.

Some meetings (or equipment installations for meetings) add a second fixed focus camera by using a smartphone which joins the virtual meeting on the videoconferencing platform separately, but without audio. See suggestions for hybrid set-up by the Minnesota Rotary Clubs: https://portal.clubrunner.ca/50084/Documents/en-ca/bf9066b3-86d1-482e-bbfd-a80ce4f37357/1/.

When the meeting employs two or more cameras, one camera faces and videos the speaker/panelist(s) at the front of the room and one camera faces and videos the audience. The camera facing the audience gives the online participants a sense of the in-person audience reactions and as well as video of any audience member who asks questions or offers comments.

The present invention works differently with respect to in-person audience members who offer comments or questions. When a participant from the audience at the in-person portion of the hybrid meeting is given the microphone to speak or make a comment, the present invention automatically provides a video feed to the videoconferencing platform that is focused on that participant. This video feed is similarly framed and formatted as the video feeds of the online participants provided by the videoconferencing platform. In other words, when a participant in the back of the audience is given the microphone, the video feed for that participant will not provide a long-shot of the whole room, in which it is hard to discern the facial features and conversational gestures of the participant who is talking. Rather the video feed will provide a close-up shot of the participant in which the participant's face and upper body will fill the frame—in a similar manner as if the participant was sitting or standing right in front of a webcam located on his or her desk during a Zoom videoconferencing meeting.

2. BACKGROUND

Consider some very different current approaches to hybrid meetings: the Owl Labs webcam, similar Zoom Room Smart Gallery installations using webcams from a number of manufacturers (including DTEN, Neat, Poly, Logitech, and Yealink), and the hardwired lecture halls of the Penn State Law School.

Owl Labs Webcam: The Owl Labs webcam is a combination speaker-phone and 360° webcam, with a compact footprint (5"×5"×11" tall): https://resources.owllabs.com/hubfs/website/pdps/mo3%20datasheet/datasheet mo3 en.pdf. It is designed to sit in the center of a conference table around which meeting participants are seated. (A set of tables arranged in a large circle or "U" shape will work similarly, and a single row of seats around that table may accommodate from 12 to 20 people.) The 360° webcam is located on the top of the device. The device includes three speakers providing 360° coverage and 8 omnidirectional microphones. The camera uses a fisheye-style lens processed through software to provide a panoramic view of the entire room.

In addition, the Owl Labs webcam can simultaneously provide up to three additional and separate video feeds of individuals who are speaking. It does this by using Artificial Intelligence (AI). It analyzes different microphone inputs to determine the direction from which the sound of a voice is coming. It analyzes the panoramic video feed to identify faces and upper bodies. It determines closest face/body to the perceived direction of vocal sound and provides a video feed framed on that face/body.

The owl is designed for small to medium conference rooms, not auditoriums. That is because the video pickup is only about 10 feet and audio pickup is only about 18 feet. In the context of a conference table around which participants are seated, approximate voice direction is sufficient to identify participants within 10 feet of the webcam. A large screen or monitor that displays the images of online meeting participants (those who are joining the meeting via a videoconferencing platform such as Zoom, Google Meets, or Microsoft's Teams) is positioned at one end of the table.

Zoom Rooms and Zoom Rooms Smart Gallery: The Zoom videoconferencing platform provides special software called Zoom Rooms. Zoom Room Smart Gallery is a feature of the Zoom Rooms software that works with certain specific third-party hardware, allowing the Zoom platform to display multiple video feeds from that hardware. Zoom Smart Gallery provides a similar experience to the Owl Labs webcam, but with the webcam mounted on the wall rather than placed in the middle of the conference table.

Zoom Rooms is designed for conference rooms more permanently equipped to provide "an integrated experience for audio conferencing, wireless screen sharing, and video conferencing" (https://support.zoom.us/hc/en-us/articles/207483343-Getting-started-with-Zoom-Rooms). The conference room will include a built-in or wall-mounted TV (screen, or monitor), camera, and computer, designed to work with the Zoom Rooms software and Zoom platform. The camera (webcam) is usually mounted just above or below the screen.

Zoom Smart Gallery is a special feature of the Zoom videoconferencing platform which allows Zoom to display multiple video feeds from specific approved webcams (sometimes called Zoom Room appliances) incorporated into a Zoom Room (and using a Zoom Rooms software license): https://support.zoom.us/hc/en-us/articles/4403190845069-Getting-started-with-Smart-Gallery. https://blog.zoom.us/all-you-need-to-know-about-smart-gallery/Zoom Smart Gallery currently supports specific appliances from several manufacturers including DTEN, Neat, Poly, Logitech, and Yealink: https://support.zoom.us/hc/en-us/articles/4403190845069-Getting-started-with-Smart-Gallery.

The Zoom Rooms hardware designs are intended for a range of room sizes: from huddle rooms (up to 7 people), conference rooms (up to 12 people), boardrooms (up to 22 people) and classrooms (up to 25 people): https://support.zoom.us/hc/en-us/articles/3600 21724691-Zoom-Rooms-Design-Guide. This will not work for significantly larger spaces where microphones placed with the "webcam" at an end of the room (along with less precise room acoustics) do not provide sufficient audio separation for pinpointing the sound source.

Hard wired classrooms and lecture halls: The Pennsylvania State University (Penn State) located in State College, PA, merged with Dickinson Law School in Carlisle, PA in 2000. Until 2014, the Penn State Law School operated as one law school with two campuses over 80 miles apart (approximately 2 hours driving distance): https://en.wikipedia.org/wiki/Penn State Law. In 2009, when Penn State Law School built its Lewis Katz Building on Penn State's University Park campus in State College, the classrooms—from small seminar-sized conference rooms for a dozen or so students to larger capacity lecture halls (for approximately 50 to 75 students)—were all wired for videoconferencing to link and meld the two campuses. See for example https://pennstatelaw.psu.edu/sites/default/files/styles/content header image/public/PSL Students_in_classroom_0.png?itok=5kFmDfyJ.

In smaller classrooms, when a student speaks, the audio and video equipment will operate like a Zoom Room, and the video camera will focus on the speaking student based upon "triangulating" the audio input. In the larger lecture halls, each desk has a switch to turn on a microphone built into the desk in front of the student (for use when the student has been called on by the teacher). As the student switches on the microphone, the webcam at the front of the classroom will pivot and focus on that location using a motor-operated cradle/yoke for the webcam and based upon pre-programmed positions. One skilled in the art understands how this approach can be used for larger lecture halls and auditoriums.

However, this approach does not work for meetings which are held in general-purpose auditoriums, without microphones and switches at each seat. This approach also does not work where meetings are held in large general-purpose rooms (such as at hotel convention centers) where seats are provided by setting up folding chairs in auditorium-style rows.

Remotely focusing a webcam: The examples above detail several of the ways in which webcams can be positioned, aimed, and focused remotely. As known to those skilled in the art, webcams can be positioned by servo-motors swiveling the webcam mount in the x and y dimensions. Servo motors can also be used to optically move the webcam lens in and out as well, to achieve the correct focus for objects different distances from the camera. This focus can be done manually (with a camera operator's eye) or using one of various autofocus systems, which are well known to those skilled in the art. The servo-motors can be controlled remotely and via software.

Aligning and focusing the camera by moving its position and lens is considered "optical" or mechanical focusing which does not affect the resolution of the produced image or video. Alternatively, a webcam image (or video) can be aimed or focused digitally. This is like editing in a photo editing program where a portion of a digital image is considered the entire image and the rest cropped out. This results in a loss of pixels (loss of image resolution), compared to the original image, but is done using software only. Aligning and focusing a camera may involve both optical and digital components.

Security cameras are often aligned and focused based upon a noise, or movement. Some webcam software uses virtual reality and augmented reality principles to recognize the image/outline of a human face, torso, or other body part (see for example Snap Camera and Snap Lens Studio by Snap). The software then enables the camera to focus on that body part, or creates images in which the modeled body part fills a pre-specified portion of the image frame.

Locating objects using RFID chips: Electromagnetic waves, such as (but not limited to) those produced by Radio Frequency Identification (RFID) chips, Bluetooth devices, BLE (Bluetooth Low Energy chips), and GPS devices can be used to locate objects. In particular consider active RFID chips, which are battery powered. The signals of some (depending up on the frequency generated) have a range of hundreds of feet and their positions can be pinpointed within inches using triangulation: https://en.wikipedia.org/wiki/Radio-frequency identification. The range of active RFID chips (and some battery assisted passive chips) is comparable to the range of wireless microphones used in hybrid meetings such as (but not limited to) those recommended by Marc Rochkind.

RFID chips, embedded in tags or transponders are used in industry for warehouse and inventory control through a combination of hardware and software called Real-Time Location System (RLTS), also known as a Real-Time Tracking System. Per the Litium website (https://litum.com/blog/what-is-rtls-real-time-location-system-rfid/), the RLTS system creates a wireless mesh network (and virtual grid representation of it) by placing anchors (active RFID readers or interpreters) at key fixed reference points in a facility. These anchors send and receive radio signals, recognizing active RFID tags every time they come within the range of the anchor. When the anchors get a signal from an RFID tag, the location of the tag can be calculated by using triangulation, received signal strength (RSSI), time difference of arrival (TDOA), or similar methods known to those skilled in the art. This calculation is done by a location engine, which is a part of the RTLS software.

For a dynamic example, in 2015, the National Football League (NFL) equipped its football players with RFID chips that measured speed, distance and direction traveled by each player in real-time.

The chip triangulated the NFL player's position within six inches and was used to digitally broadcast replays. See https://www.dailydot.com/debug/nfl-rfid-player-tracking-zebra-technologies/. In contrast, using triangulation of sound waves to locate a sound source in an acoustically active (or live) room may be less precise or less practical at such long distances.

The disclosure below uses the term RFID for chips, tags and anchors. However, as is known to those skilled in the art, there are other types of wireless tags used in real-time location systems, such as WiFi tags, and UHFID tags. Reference to one, is intended to include wireless chips and tags which utilize other wireless frequencies, technologies, and standards. These tags are collectively referred to herein as "RTLS tags."

SUMMARY OF THE INVENTION

The invention is a system (apparatus) for auto-focusing a webcam on speakers in a hybrid meeting held in a large room with auditorium-style seating. In such a room, a member of the audience cannot be heard without standing up and speaking into a microphone. (Without amplification, neither other members of the in-person audience, nor members of an online audience, can hear him or her.) The present invention uses this principal to enable a webcam to automatically focus on (or zoom in on) the speaking audience member by (a) attaching a "homing" chip (such as in an RFID tag) to the microphone, (b) deploying triangulating sensing devices within the room (such as RFID anchors and interrogators) to measure the distance of the chip from those devices (that is, locate the chip within the confines of the room), and then (c) utilize software to instruct a remotely controllable webcam to aim at and focus on that location in the room and zoom in or frame the camera shot (the video feed) on the person holding the chip. The invention can also be used similarly to focus a webcam on different panelists at the front of the room, as they speak into different mics or pass the mic among them.

In a preferred embodiment, the invention is a system of interconnected audio and video equipment with triangulating control software. The system consists of at least one handheld wireless mic and at least one webcam and several chip anchor/readers. The wireless microphone has an embedded chip that when activated sends signals to a set of microwave readers or anchors. The triangulating software establishes the location of the microphone in relationship to the anchors and the webcam (which may also have a similar embedded chip) and sends instructions to the webcam servomotors or digital focusing software to frame and focus the webcam on the face and upper torso of the person standing at or near the calculated location of the microphone. (This face and body detection further improves the video being captured from the speaker.) The audio from the handheld microphone combined with the video feed from the webcam allows members of the in-person audience at a hybrid videoconference meeting to participate equally in the meeting (with respect to both their audio and their video) with online participants.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2A is generalized overhead schematic room plan, showing a panelist/speaker table at the front of the room and auditorium-style seating for the audience, along with a set of microphones as shown in FIG. 1A, a webcam as shown in FIG. 1B, three RFID anchors as shown in FIG. 1C, and a laptop computer with software for locating RFID chips and remotely controlling the webcam. Data flows among these devices are also shown.

FIG. 2C shows equipment used for the audio and video in this hybrid meeting, along with data flows among them. Included are one of the microphones shown in FIG. 1A and the webcam shown in FIG. 1B.

FIG. 8A is a flow chart for setting up the alternative embodiment shown in FIG. 7.

FIG. 8B is flow chart for processing information within the Microphone Locater Device shown in FIG. 7.

FIG. 8C is a flow chart for processing information among the component systems of the Microphone Locater System shown in FIG. 7.

FIG. 9 shows data and information flows among the components of an embodiment of the invention using smartphones.

FIG. 10C shows 20 filled in smaller circles.

FIG. 10D shows 19 filled in smaller circles.

FIGS. 11-13 show database tables for use in preferred embodiments of the present invention.

FIGS. 14-17 are flowcharts in accordance with preferred embodiments of the present invention.

DETAILED DESCRIPTION OF PREFERRED EMBODIMENTS

Figure 1A:
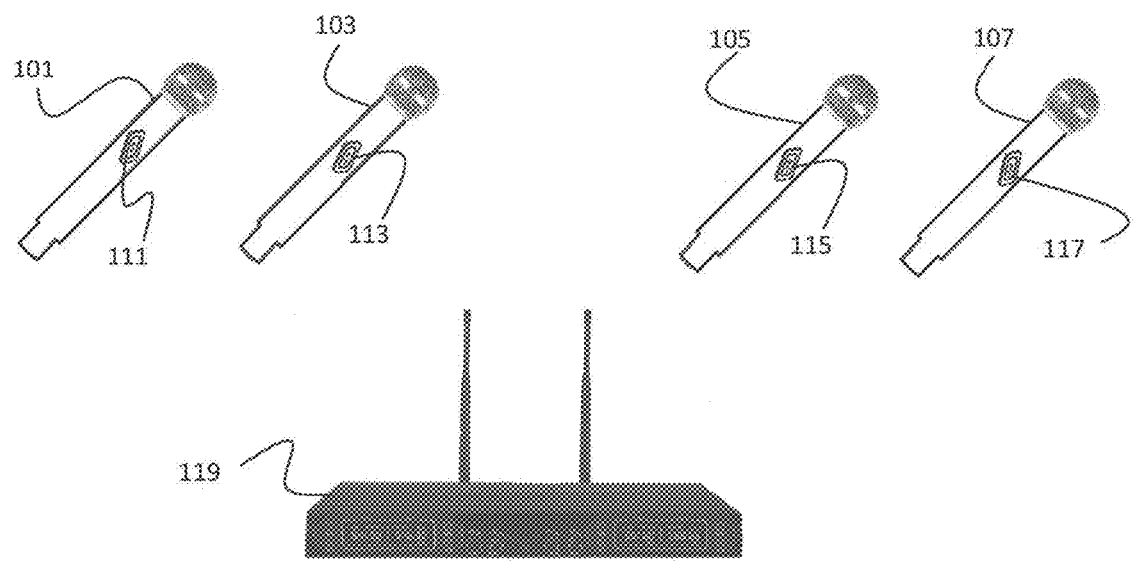
FIG. 1A shows a wireless microphone set with receiver, with an RFID chip embedded in each mic.

Certain terminology is used herein for convenience only and is not to be taken as a limitation on the present invention. The words "a" and "an", as used in the claims and in the corresponding portions of the specification, mean "at least one."

Definitions hybrid meeting—As discussed above, a hybrid meeting is gathering of people where some participants attend in-person, and other participants attend virtually via an online videoconferencing platform such as (but not limited to) Zoom. The in-person participants are also referred to herein as "in-room" participants.

live location—A live location is the location where the in-person participants attend the hybrid meeting, in contrast to one or more "remote locations' where the participants attending virtually (online) are located.

attendee—An attendee is a person who attends a conference or other gathering. The attendee may be a participant, audience member, speaker, or panel member of the conference or gathering.

voice-activated microphone—a voice-activated microphone is a microphone that relies upon a predefined threshold and other intelligence to determine when the audio signal of the microphone is indicative of a deliberate utterance (a likely spoken sound), as opposed to ambient noise, faint voice signals, or other background noise.

live microphone—a "live microphone" is a microphone that is turned on, as opposed to being turned off. It is sometimes referred to as a "hot mic."

active microphone—an "active microphone" as used herein is a microphone that one of the in-person attendees is about to speak into, or is currently speaking into, and which outputs an audio signal that is intended to be streamed to remote attendees via the videoconferencing system and is also intended to be broadcasted to the in-person attendees. The in-person attendee may be physically holding the microphone, or speaking into a stationary microphone, or a facilitator who is holding the microphone may be in sufficiently close proximity to the in-person attendee so that any utterances of the in-person attendee are captured by the microphone. The microphone may become "active" in any number of ways, including the following ways:

i. the microphone may be made "live" by turning it on.

ii. if the microphone is voice-activated, the microphone may become "active" when it determines that the audio signal of the microphone is indicative of a deliberate utterance.

A microphone may be "active" but the RTLS tag may be separately controlled (i.e., turned on and off) by its own switches or the like. Alternatively, the RTLS tag may be automatically turned on when the microphone becomes active by either of the ways described above, and may be automatically turned off when the microphone is not active. To minimize lag time when it is necessary to focus a camera on a specific in-person attendee, it may be desirable to continuously monitor the location of the RTLS tag by leaving it in an "on" state so that the current location is instantly available for camera focusing when or if the microphone becomes "active."

Part 1 of Disclosure

Consider first the special equipment used for the present invention, which is not usually used for in-person meetings or online-only meetings.

FIG. 1A shows a set of wireless microphones, 101, 103, 105, and 107 and the receiver (119) for them. Each microphone has an embedded chip and antenna such as used in an RFID tag. (Tag 111 is embedded in microphone 101, tag 113 is embedded in microphone 103, tag 115 is embedded in microphone 105, and tag 117 is embedded in microphone 107.) Each chip/tag has a unique identifying number which the chip broadcasts when energized. These particular microphones are similar to the Phenyx Pro Quad Channel Wireless Microphones which have a range of several hundred feet. Each microphone can send its audio data to the receiver on a different radio frequency. For some embodiments of the present invention this is important, for others, the mics can all send audio data on the same frequency. For some implementations a multi-microphone system is important, but for other embodiments, a system with a single microphone is sufficient.

Active RFID tags, and battery-assisted passive RFID tags have ranges of several hundred feet, comparable to the broadcast range of the Phenyx Pro Quad Channel Wireless Microphones.

These tags shown in FIG. 1A are embedded in and integral to the microphone. However, in alternative embodiments the unique tags can be attached to the microphones by a user, who purchases them separately. Broadly speaking, the RTLS tags are "fixed" to their respective wireless microphones which includes the embedded/integral embodiment and the simpler attachment embodiment.

Figure 1B:
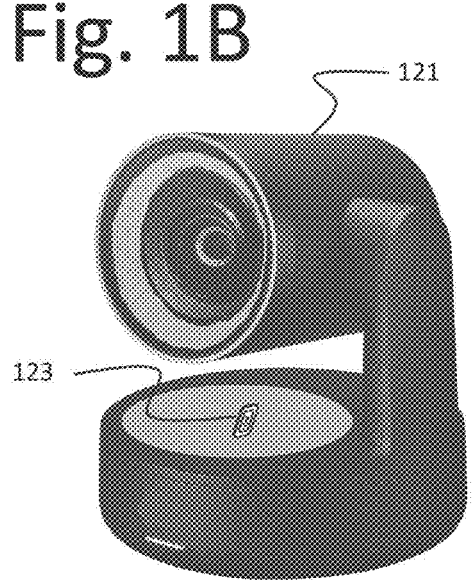
FIG. 1B shows a remotely controllable webcam with an embedded RFID chip.

FIG. 1B shows a webcam 121 with an embedded chip and antenna such as used in an RFID tag 123. The webcam is similar in resolution and capabilities to the Logitech Rally Camera (Premium PTZ camera with Ultra-HD imaging system and automatic camera control). The Logitech Rally Camera has a zoom capability of 15×; a pan capability of 180° (±90° from a central vertical axis), tilt capability of 80° (+35° to −45° from a horizontal axis). As known to those skilled in the art, other applicable webcams useable with the present invention have similar or different capabilities. For example, a 360° camera, such as used in the Owl Labs webcam, could be used if it has sufficient optics and resolution for digital focusing in a large room.

In FIG. 1B, the tag is shown as embedded in and integral to the webcam. However, in alternative embodiments of the present invention the tag is attached to the webcam by a user who purchases it separately. In other alternative embodiments, discussed below, the tag is omitted.

Figure 1C:
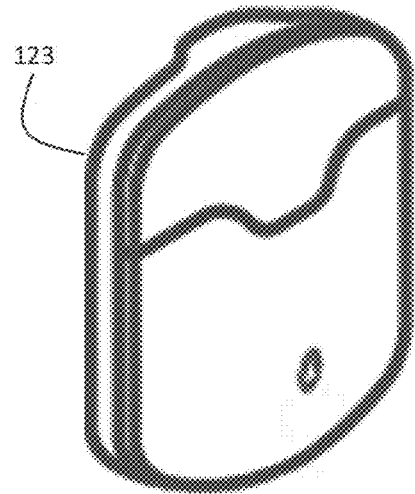
FIG. 1C shows a illustrative RFID anchor or interrogator, used for triangulating an RFID tag.

FIG. 1C shows an RFID anchor, 141, also known as a reader or interrogator, similar in form to those made by Litum, but with capabilities engineered for the present invention. Anchors can be active (sending radio frequency waves to RFID tags, which send a reply with their identity or stored data, powered in whole or part by the energy sent by the anchor), passive (receiving radio frequency waves beamed by active tags), or some mix.

Figure 2B:
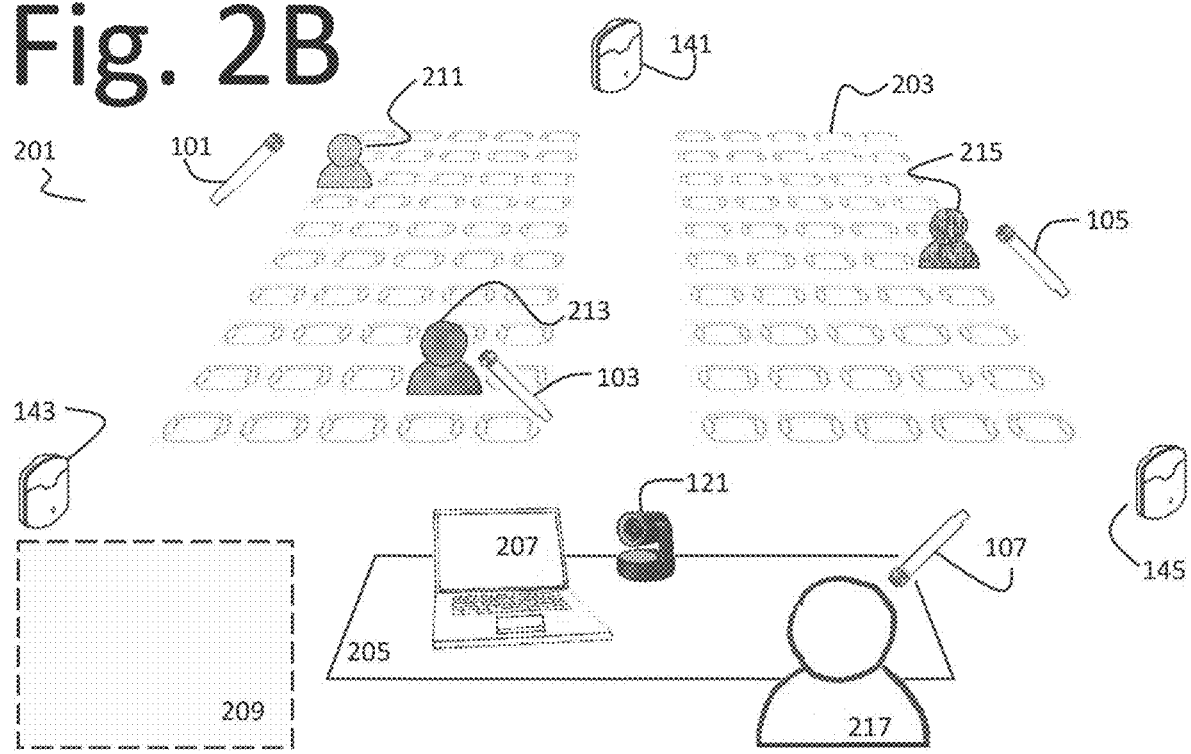
FIG. 2B is a perspective view of the room shown in FIG. 2A, from the point of view of a panelist or speaker. A panelist/speaker and three audience members are also shown.

Consider now how this equipment is deployed in a large room with auditorium-style seating, as shown schematically using an overhead view in FIG. 2A and a perspective view in FIG. 2B. To help illustrate the room in perspective, several people are shown schematically in FIG. 2B, but not in FIG. 2A.

A large room, 201, is set up for a presentation using rows of seats, such as seat 203, set-up in auditorium-style seating. That is, the seats are arranged in rows facing the "front" of the room where the presenters speak. In FIG. 2A and FIG. 2B a desk or table, 205, for panelists to sit or stand behind, is shown at the "front" of the room. (FIG. 2A shows chairs behind the speaker's table; for ease of illustration but without loss of generality, FIG. 2B does not.) Without loss of generality, instead of a table, 205, the room could have a lectern, podium, dais, or pulpit. Seats may be permanently affixed such as in an auditorium, or they may be folding chairs such as used for large meetings in many hotel ballrooms and convention centers.

FIG. 2A and FIG. 2B illustrate a room with 100 seats in the audience, but that number was chosen for ease of illustration only, and could be more or less. Rows of folding chairs are generally spaced 36 inches from the back of one row to the back of the next. Folding chairs are typically 18 inches wide. The schematic shown in FIG. 2A and FIG. 2B shows a room approximately 30' by 50', well within the capabilities of microphones such as the Phenyx Pro Quad Channel Wireless Microphones, which can cover serve a room several times this size.

RFID anchors: The room is shown with three RFID anchors, 141, 143, and 145. Each is similar to FIG. 1C, 141, but with a different unit number for use in triangulation calculations. A larger room might require additional anchors, depending upon their range.

The anchors are shown as portable and free standing, with their own stands. They are powered by electric cables connected to electric power sockets. They send their data via data cables, shown as solid lines in FIG. 2A. (These data flows are not shown in FIG. 2B, the perspective view of the room.) In an alternative embodiment, the anchors are built-into the room (for example, mounted on the walls or ceiling of the room) and hardwired for both power and data transmission. In an alternative embodiment, anchors are powered by batteries, and transfer data wirelessly, such as via wifi, in which case the room or installation would employ a wifi router (not shown).

The anchors are shown connected to a laptop computer, 207, but may alternatively first be connected to a USB interface or other device (not shown) which allows their data to be fed to the computer via USB connections.

Webcam and Laptop: The room is shown with a laptop computer, 207, and a webcam, 121, set on the speakers table, 205. The webcam contains an embedded chip (see FIG. 1B, 123, but too small to be shown in FIG. 2A or FIG. 2B) The webcam, 121, is shown as connected to the laptop, 207, via a data cable.

Alternatively, the webcam is built-into the room (for example, mounted on a wall facing the audience or hung from the ceiling of the room) and hardwired for both power and data transmission to a built-in computer. In an alternative embodiment, the webcam is powered by batteries, and transfers data wirelessly, such as via wifi, in which case the room or installation would employ a wifi router (not shown).

The webcam, 121, is shown as being aimed, focused, and zoomed via commands sent through a data cable between it and the laptop, 207. Alternately, or in addition, as is known to those skilled in the art the webcam may be aimed, focused, and zoomed via an app on a smart phone, a separate control computer, a hand held control pad operating wirelessly (such as via infrared, Bluetooth, or wifi), or via directional switches on the webcam itself. In alternate embodiments, the aiming, focusing, and zooming commands are sent wirelessly from the laptop or computer.

The laptop in addition, may have one or more webcams built into it as well, but they are not shown.

In FIG. 2A, the radio frequency waves sent by the RFID chip embedded in the webcam are shown as dashed lines connecting the webcam, 121, to the three RFID anchors, 141, 143, and 145. (These data flows are not shown in FIG. 2B.) These dataflows are used to determine the position/location of the webcam within the room RLTS grid, using the RLTS software in the laptop, 207, based upon information which the anchors, 141, 143, and 145 obtained from the RFID chip 123 embedded in the webcam 121, as well as the calculated orientation of the panning axes of the webcam with respect to the grid. (See FIG. 4 discussed below.)

In an alternative embodiment, the webcam, 121, as well as anchors 141, 143 and 145 are permanently affixed to walls or the ceiling, and the actual distance of the webcam from the anchors (as well as orientation of the webcam with respect to the anchors) is entered into the software. In this situation, the webcam does not need an RFID chip or tag. Affixing the webcam to the wall or ceiling will also fix its pan and tilt axes, as discussed below, and then need not be determined by calibration per FIG. 4.

The panelists/speakers see the online participants by looking at the screen of the laptop, 207.

The large screen: A large screen monitor, 209, is positioned at the front of the room, 201. It displays a copy of what is shown on the screen of the laptop, 207, and is positioned so that audience members (such as a person sitting in seat 203) can see the online participants clearly. In FIG. 2A and FIG. 2B, the large screen is shown as positioned behind the speakers/panelists, but alternatively, it is positioned above them, or on a side wall. The large screen is shown as a free-standing device, but alternatively it is built into the room. The large screen is shown as an active device such as a television monitor, but alternatively, it is reflective surface or wall upon which images are projected by a digital projector (not shown) connected to the laptop, 207, via wire or wirelessly. Such a digital projector is a portable device, or alternatively, built into the room.

Wireless Microphones: The heart of the system is the wireless microphones, 101, 103, 105, and 107, with embedded RFID chips/tags. The chips/tags are shown as 111, 113, 115, and 117 in FIG. 1A, but are too small to show in FIG. 2A and FIG. 2B. The microphones are hand-held and powered by batteries so they are portable. When deployed, they are passed from one person to another. Alternatively, an assistant or volunteer, carries a microphone to an audience member wishing to speak. Alternatively, the microphones are set into microphone stands and placed in the aisles between the rows of seats, in which case the microphones are stationary, and audience members must approach them to speak. Alternatively, when the microphones are stationary, they may be hardwired.

When activated, the RFID tag sends (broadcasts) a radio frequency signal to all anchors. For example, microphone 101 sends a signal to anchors 141, 143, and 145 when its RFID tag 111 is activated. Microphone 103 also sends a signal to anchors 141, 143, and 145 when its RFID tag in 113 is activated. Microphone 105, when activated, sends a signal to anchors 141, 143, and 145, when its tag 115 is activated;

and microphone 107, sends a signal to anchors 141, 143, and 145 when its tag, 117, is activated.

(Remember that under the meeting protocol for large meetings with few presenters and an audience seated in auditorium-style seating, only one microphone for audience inputs is turned on at a time. In a preferred embodiment, turning on the microphone also supplies battery power to the RFID chip. So, in this preferred embodiment, a microphone's chip is activated only when the microphone is turned on.)

The microphone RFID tag signals are shown in FIG. 2A as the dashed lines from the microphones to the anchors. The data flows of the microphone's RFID tag signals are not shown in FIG. 2B.

Other audio and video equipment: Consider now FIG. 2C which shows audio equipment for a hybrid meeting. The equipment may be placed on speaker's table 205, or under it. In alternate embodiments, the equipment is built into the room sound system. This equipment is based upon providing audio for a simple hybrid meeting per Marc Rochkind referenced above. Those skilled in the art will appreciate that various modifications and variations may be made to this equipment without departing from the scope and spirit of this invention.

When someone turns on a microphone, such as 107, and speaks into it, the microphone does two things. The microphone's tag sends a radio frequency signal to the anchors (141, 143, and 145) so they can determine its location in the room, but the microphone also converts the sound waves that the speaker creates into digital audio waves, and transmits them to the receiver, 119. The receiver sends this data to a USB audio interface, 221, which converts the audio wave into a digital form that can be inputted into a computer via a USB cable.

Importantly, this digital audio is sent two places. It is sent to the computer, 207, which transmits it to the hybrid meeting's online vidoconferencing platform (such as Zoom) on the internet (233) or a similar type of electronic network, so that online participants can hear the in-room produced audio. It is also sent via mixer, 223, and amplifier, 225, to an audio speaker (or audio sound system) in the room, 231, so that the audience in the room can hear what the person at the microphone is speaking into the microphone, 107. As mentioned previously, even in a small room, this is important. If a person speaking near the microphone does not hear audio feedback (by this is meant an amplified version of his or her voice, not the screech from the feedback loop of an improperly adjusted equipment setup), the speaker will not know if a microphone, particularly a directional mic (like the Phenyx Pro Quad Channel wireless mics), is accurately capturing and transmitting the speaker's voice.

The other audio—the audio from the online participants of the hybrid meeting—is transmitted from the internet (233) via videoconferencing platform (234) to the laptop, 207. From there it is sent to the audio mixer 223, and then on to the amplifier, 225 and sound system, 231.

In one non-limiting embodiment, the videoconferencing platform (234) may be the videoconferencing platform described in U.S. Pat. No. 11,107,490 (Slotznick), which is incorporated by reference herein. As shown in FIG. 2C, the videoconferencing platform (234) is in communication via an electronic network such as the internet (233) with a plurality of remote attendee computers 235, each of which receives a stream of the hybrid meeting.

In similar manner, prior art, such as Marc Rochkind, has integrated the audio of the in-person and online portions of a hybrid meeting. As those skilled in the art know, the laptop, 207, or other computer, can be connected to the internet (233) in a variety of ways, including but not limited to hard-wired ethernet and wireless wifi. Consequently, the details of this connecting system are not shown in the figures.

With respect to video, video from the online participants of the hybrid meeting is transmitted from an electronic network such as the internet (233) via the videoconferencing platform (234) to the laptop, 207, where it is shown on the laptop's screen (not labeled separately) for the speaker or panelist to see. The laptop sends a copy of that image/video to a larger screen or projector (209) for the in-person audience, seated in the auditorium-style seating (such as 203 in FIG. 2A and FIG. 2B) to see.

Video from the in-person in-room portion of the hybrid meeting is captured by the webcam, 121, sent to the laptop, 207, where it is transmitted via the videoconferencing platform (234) through an electronic network such as the internet (233) to the online participants and their computers (235) in the hybrid meeting.

Before discussing how the present invention determines what the webcam, 121, captures and how the webcam frames the video that it sends, additional explanation is provided regarding calibrating/locating/orienting the webcam in relationship to the radio frequency mesh established by the anchors and the virtual room dimensional grid that the RLTS software created from the data received by the anchors.

Calculating and locating the webcam panning axis: Consider FIG. 4 which is a flow chart for that calibration, designed for use with portable or permanent equipment. As the process starts, 401, the first question (403) is whether the anchors (141, 143, and 145) have been set up or installed. If not, then they have to be set up, 405, then turned on along with the laptop (207), step 407. In contrast, if the anchors had been set up (403), then again, they must be turned on along with the laptop (step 407).

The next question is whether the webcam has been set up or installed (408). If not, the webcam has to be set up (411), and then turned on (413). This will also turn on the RFID chip embedded in the webcam. On the other hand, if the webcam has been set up, then again, it has to be turned on, 413. Next the RLTS software has to be initialized, 415. This software creates a dimensioned grid, based upon data from the anchors (141, 143, and 145). At this point the only data being received is from the webcam (121) and its RFID tag (123). Using this data (radio frequency data flows from RFID tag 123 embedded in webcam 121, to anchors 141, 143, and 145; data flows shown in FIG. 2A), the RLTS software locates the position of the webcam in the virtual grid with respect to the anchors (step 417). However, this does not establish the orientation of the webcam's panning zero-degree axis in relationship to the RLTS grid. (Note that if the webcam is place on a flat, level surface, the horizontal zero degree tilt axis is established.)

To calibrate the grid with respect to the webcam's panning axis, the operator uses the operator controlled manual controls (whether physical buttons on a device or software controls in the webcam control program) to point/aim the webcam at one of the anchors (step 419). When the anchor is aligned in the laptop screen's rendering of the webcam's produced image, the operator OK's this alignment and enters the number or name of the anchor to which the webcam is aligned (step 421). Because the webcam can output the degree of pan and tilt to the RLTS software, the software can now calculate the zero degree axis of the webcam in relationship the webcam location on the RLTS virtual grid (423). The webcam is now calibrated and the process stops (425).

This calibration can be stored in permanent memory in cases where the anchors and webcam are permanently installed in the room. Then turning on the system will access and initialize the calibration.

Figure 4:
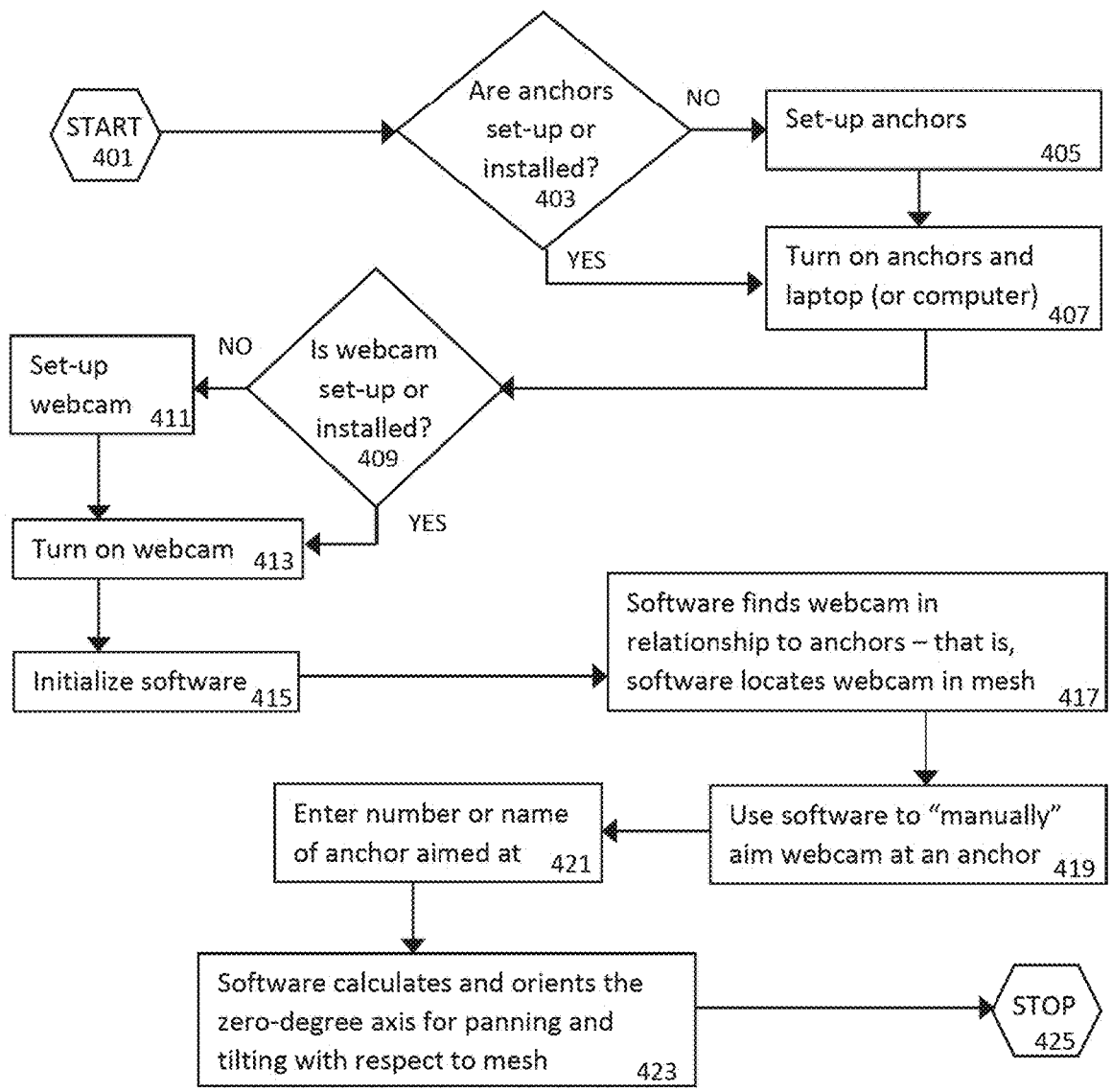
FIG. 4 is a flow chart for calibration of the RFID virtual mesh by which the webcam is located within the mesh.

In an alternative embodiment, where both the anchors and the webcam are permanently installed, the distance from the webcam to the anchors can be entered into the software, and the FIG. 4 calibration is not needed. For this same reason, in this scenario, an RFID chip is not required in the webcam, 121.

The discussion above has detailed how directional control of the webcam in the drawings can be calibrated with respect to the room grid created by the RTLS software for webcam control. In an alternative embodiment this calibration is provided automatically by instructing the software to initiate a calibration routine. For the calibration routine, the webcam scans the entire room (or rather its field of vision), and uses AI to hone in on one of the anchors. This may be accomplished using computer vision and pattern recognition or by finding a light or laser beam, or by identifying a wireless signal or signals in the context of the RTLS software.

Figure 5:
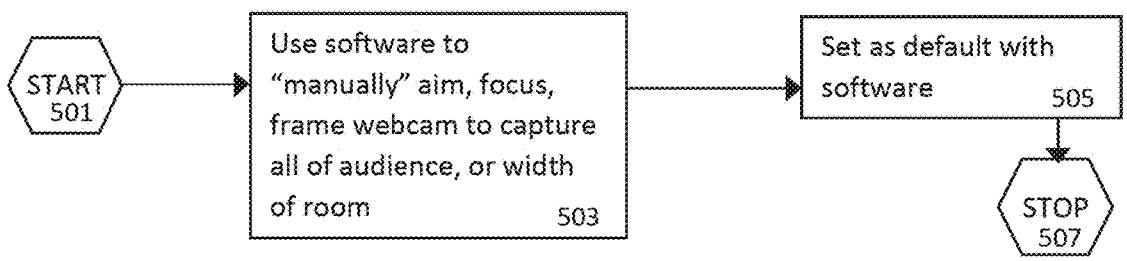
FIG. 5 is a flow chart for setting the default webcam view illustrated in FIG. 3A.

Default webcam framing view: The default view is generally the entire in-room audience shown in FIG. 2B. Setting the default view requires aiming, focusing and zooming (that is the framing) the video feed produced by the webcam, 121— which it sends to the laptop, 207, when no one is speaking, that is, when nobody in the audience is using a microphone. See FIG. 3A, 301 for an example of the default view of room 201. The process for setting the default view is detailed in FIG. 5. When the process starts, 501, the operator uses the software or application controls (or buttons on the webcam) to aim, focus, zoom, and frame the image shown on the screen of the laptop (207), so that it captures as much of the audience or width of the room as possible (step 503). The operator then sets this view as the default view for the webcam 121 (step 505) and the process stops (507).

The discussion above has detailed how a default view of the audience is manually set. In an alternative embodiment, this is set automatically. As known to those skilled in the art, AI can recognize human bodies using computer vision and virtual modeling techniques used for augmented and virtual reality. The AI adjusts the framed field of vision of the room so that all bodies are in the frame. This is set as the default view. The default view may change as people leave the room, or as more people enter it and sit down in the rows of seats.

Automatic focus on a speaking audience member: When an individual in a room speaks into one of the microphones with embedded RFID—say participant 211, in room 201, using microphone 101, with embedded chip 111—the present invention will cause the webcam 121 video to be aimed, focused, zoomed and framed as in 303 of FIG. 3B, whereby the head and upper body of participant 211 fills most of the video frame (303). This is accomplished via the process described in flow chart FIG. 6, using data flows shown in FIG. 2A.

Figure 6:
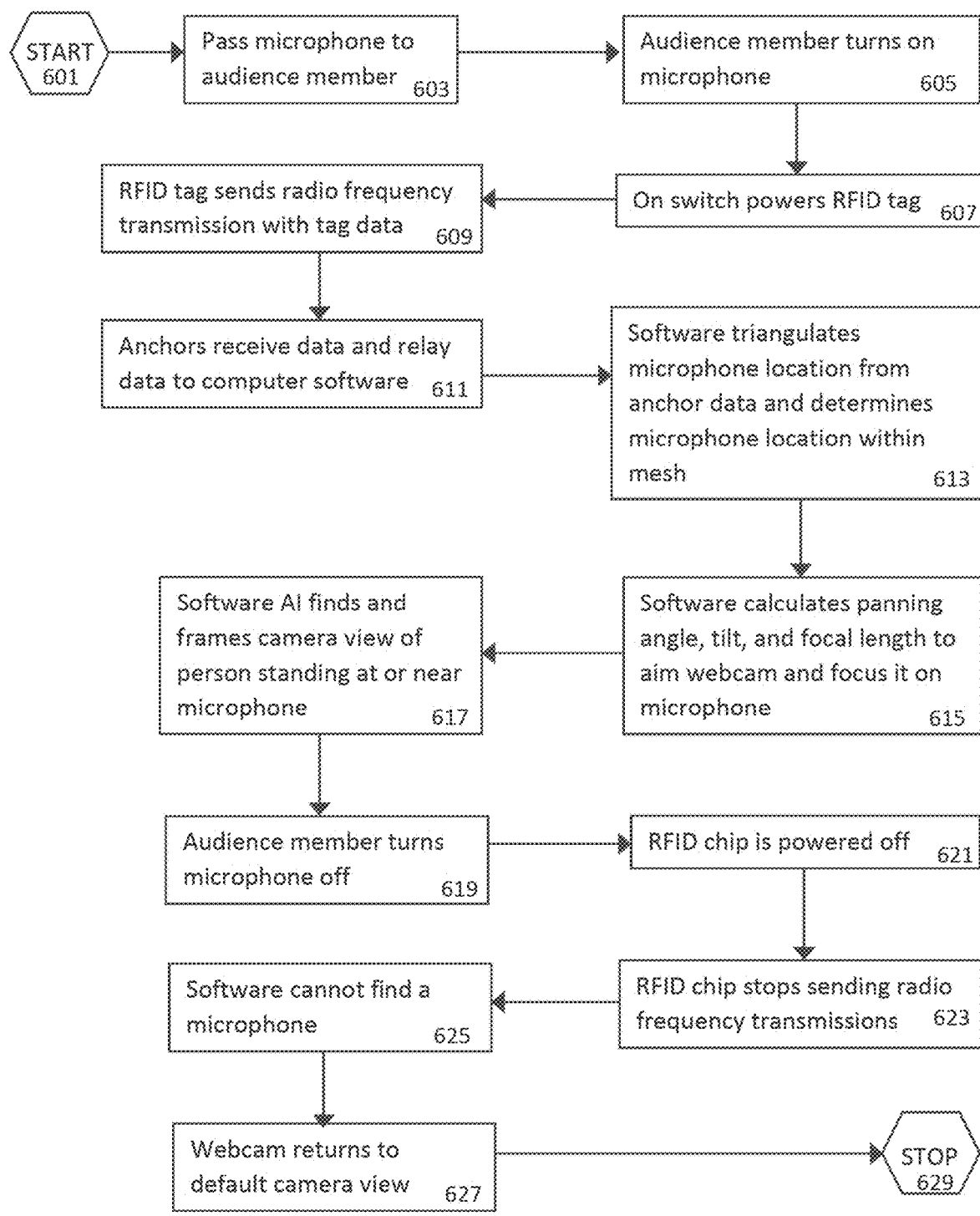
FIG. 6 is a flow chart for automated focusing of the webcam on an audience member who is speaking into microphone shown in FIG. 1A.

Per FIG. 6, the process of focusing starts (601) after a microphone (say, for example, 101 in FIG. 2A and FIG. 2B) is passed to an audience member (211 in FIG. 2B), in step 603. When the audience member turns on the microphone 101 (microphone 101 becomes "active") (step 605), this powers the RFID chip, 111 (step 607), which broadcasts radio frequency transmissions with data stored on the tag, such as its unique number (step 609).

In FIG. 2A, this is shown as the heavy dotted lines emanating from microphone 101 to anchors 141, 143, and 145. The anchors receive the relayed data including received signal strength and time difference of arrival, 611. As known to those skilled in the art, the differences in these values received by the three anchors (141, 143, and 145) enable the location engine, which is part of the RTLS software, to calculate the microphone location in relationship to the anchors using triangulation (613), and plot it on a virtual grid. The RTLS software can then use the information previously gained from calculating the location of the webcam by triangulation, as well as calibrating the panning and tilting axes of the webcam, to calculate how to move the webcam (the angle, tilt and focal length or zoom) to aim at and focus on the microphone (615). Artificial Intelligence (AI) is then used to fine-tune the aim and zoom so that the person holding the microphone (or rather the person's head and upper body, found through AI and virtual reality body segmentation) fills the frame of the video feed (617) as in FIG. 3B. This fine-tuning can be done by physically moving the camera using servomotors remotely controlled by the system, or by digitally processing the untuned video image that the webcam creates. The result is a video feed that looks like 303 of FIG. 3B.

When the audience member is finished speaking and turns the microphone off (619), the RFID chip is powered off (621) and stops sending radio frequency transmissions (623). Because the anchors do not register any tags, the RTLS software cannot find the tag 111 of microphone 101—or any other microphone. Consequently, the webcam returns to its default focus position, sending a video feed of the default camera view (627) and the process stops (629).

Of course, if the microphone 101 is handed to another person, who turns it on, or a different microphone (with embedded RFID tag) is handed to someone who turns that different microphone on, the process starts over, and the webcam focuses on the new speaker.

The discussion above concerning aiming, focusing, and zooming the webcam has often used language most appropriate for a webcam mounted in a cradle, yoke, or articulated arm, in which servomotors physically aim, focus or zoom the webcam. Alternatively, as known to those skilled in the art and particularly as used in systems such as the Owl Labs webcam, the webcam is focused digitally. In a variation of such alternative, the webcam (similar to the Owl Labs webcam or those webcam systems specially approved for Zoom Rooms) provides a video feed of the individual who is speaking, as well as a panorama or default view of the entire audience.

Some webcams, such as the Owl Labs webcam, have a 360° field of vision. In an embodiment of the present invention which utilizes a webcam with 360° field of vision, the webcam automatically focuses on any speaker wherever located in the room or space who uses a microphone with embedded RFID tags. This includes both panelists at the front of the room and audience members who are given one of the microphones to ask a question or comment.

Many laptops have built-in webcams which are aimed and focused so as to most appropriately video a user who is typing at the laptop keyboard. Other webcams can be added as peripherals to laptop computers using the USB interface. Most videoconferencing platforms allow the user to switch which attached webcam is used for the videoconference session, even mid-session. Now consider the scenario of a meeting where the in-person audience does not need to be seen until the end of the presentation, during a question-and-answer period. (Indeed, to make it easier for in-room audiences to see on-screen presentations, or the online participants, the portion of the room with the rows of auditorium-style seating may be darkened until the question-and-answer period.) In such a scenario, during his or her presentation, the speaker, 217, may engage the webcam (not shown) in the laptop, 207, rather than the webcam, 121, which focuses on the in-room audience. This will send video for the speaker to the online participants. When it is time for the in-person audience to make comments or ask questions, the speaker, 217, can then switch the video input for the videoconference platform to webcam 121 and the present invention.

In some scenarios it is desired that online participants always have a view of the in-room audience. In such a situation, a speaker or panelist either uses a microphone without an embedded tag, but which is added to the in-room and online audio mix as known by those skilled in the art, or the software controlling the webcam focusing allows the operator to assign the default view to that microphone.

In this scenario, a separate webcam would be needed to provide a video feed of a speaker or panelist using that microphone—and would require a separate computer providing a separate muted connection to the videoconferencing platform. Note that a videoconferencing platform such as Zoom, which automatically highlights the video feed of the person speaking, would not do so in this situation—where the audio feed of the speaker is sent to Zoom through a different connection (and computer) than the muted video feed of the speaker.

In an alternative embodiment, the in-person component of the hybrid meeting has two webcams, two computers (each with RTLS software), and two sets of wireless microphones with RFID tags. One webcam, computer, and set of microphones provides video and audio of the audience members as described above. The second webcam, computer, and set of microphones provides video and audio of the speakers and panelists at the front of the room. This second webcam is placed either on the panelist table (sometimes called a "head table") facing the speakers/panelists, or at the back of the room. In the latter instance, the webcam can focus on a speaker or panelist even if he or she walks into the audience. Note however, that the audio mix coming from both the panelist set of microphones and the audience set of microphones must be sent to the same mixer (223 of FIG. 2C) which feeds the in-room sound system. As known to those skilled int he art, this may require a mixer with additional input capabilities.

In the discussion above, the RFID chips embedded in the microphones are only turned on when the audio of the microphone is turned on by switching on the microphone. In an alternative embodiment, the circuit for an RFID chip is turned on by voice activation. That is, the microphone is turned on, but the RFID chip will not be turned on until the person holding the microphone starts to speak (or sing, or otherwise direct audio into the microphone). As is known to those skilled in the art, microphones can be designed to be narrowly directional (e.g., cardioid mics) as well as not register sound unless the sound source is in close proximity to the microphone. Directional microphones are often designed so that the user has to speak directly into the microphone for the microphone to register a sound. This helps prevent feedback loops from in-room speakers and amplifiers. In this embodiment, these features allow the voice to trigger the RFID chip, to send the location of the mic (and user's voice) to the system, so that the webcam can focus on the user.

In the discussion above, the RFID chips embedded in the microphones are only turned on when the audio of the microphone is turned on. In an alternate embodiment, these chips are always on, enabled and broadcasting their data over radio frequencies (continuously or at appropriate intervals as designed for this application and known by those skilled in the art)—whether or not the microphone is turned on. However, the RTLS software will then locate all of the chips and microphones. In this case, another method is needed to determine which microphone the webcam must focus on. One way to provide this is by using the separate broadcast frequencies for the different microphones in the microphone set. A circuit is added to the wireless microphone receiver, the USB audio interface, or a separate mixer, which sends the information to the computer concerning which microphone is broadcasting. Because each microphone is identified with a specific RFID tag, the RTLS software then ascertains which chip is associated with the broadcasting microphone, and the location of that chip (and microphone) is used to determine where the webcam needs to be aimed. The rest of the system is the same as previously discussed.

In the discussion above, the RFID chips/tags are described as embedded in the microphones. In an alternative embodiment, the chips and tags are attached or clipped to the microphones. Existing microphone sets can then be retrofitted with the tags produced by a different manufacturer in order to create a self-focusing webcam. One method of effectuating this alternative embodiment is by using a separate device referred to herein as a Microphone Locater Device (MLD), identified in FIG. 7 as 700, and as more fully described below and in FIG. 7, FIG. 8A, FIG. 8B, and FIG. 8C. The basic operation of the MLD is as follows: The MLD receives tag locations from the independent RTLS system of anchors and tags (742 of FIG. 7). The MLD receives separate input from the independent wireless microphone system (740 of FIG. 7), more specifically separate originating audio input from each wireless microphone (101, 103, 105, and 107 of FIG. 7) and delivered to the MLD through the wireless microphone system (740). These are identifiable by their use of separate broadcast frequencies. Tag locations are stored in the MLD (700) cache memory (721, 723, 725, and 727). In the MLD, the tags (and their locations) are associated with the separate mics (based upon used broadcast frequency) using methods such as described below. The Microphone Locater Device (MLD) then outputs the location of the microphone which is transmitting actual audio (user input)— and sends that location (731*a*, 731*b*, 731*c*, or 731*d*) to the webcam (or the computer that controls the webcam). A more complete disclosure follows.

Figure 7:
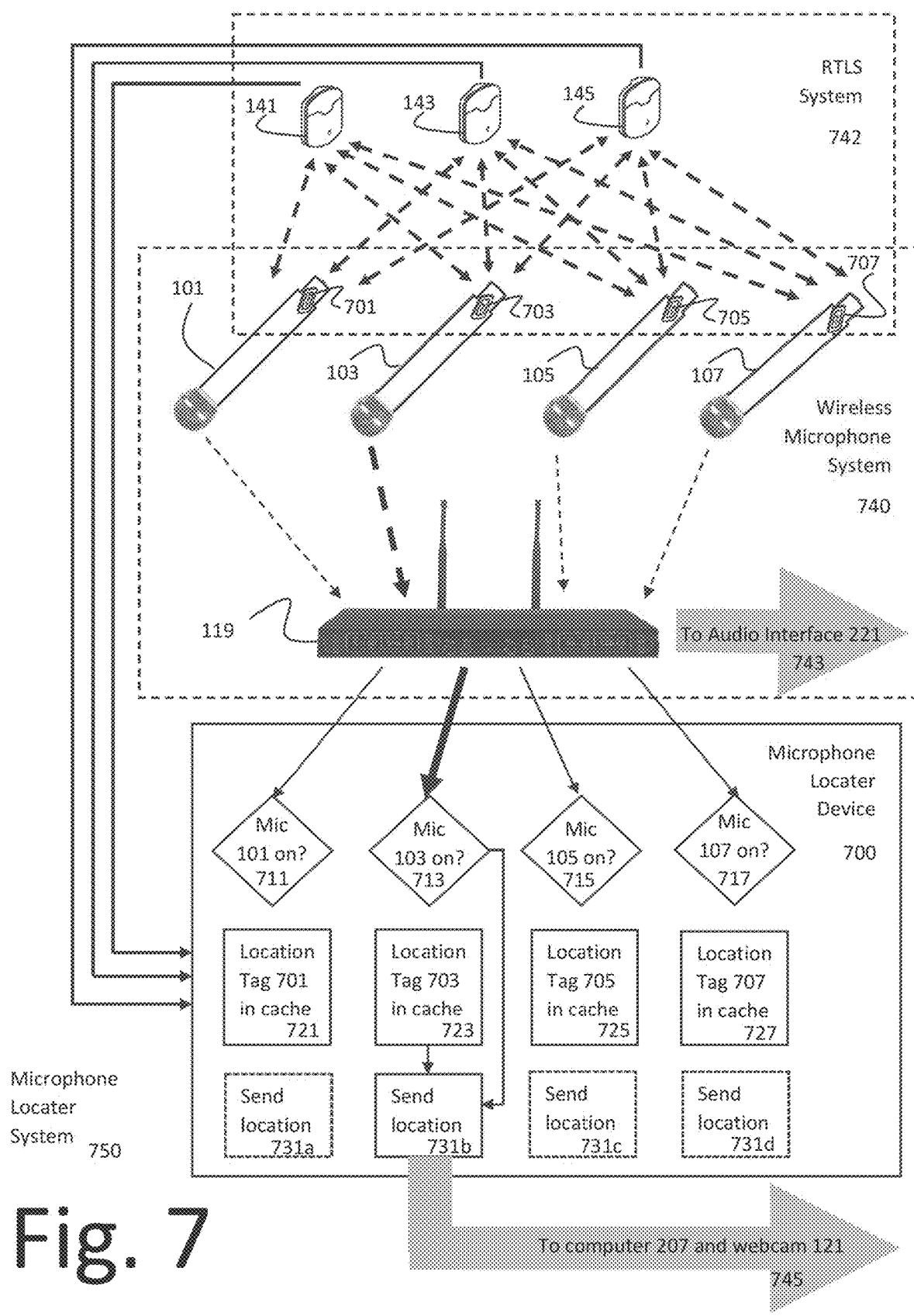
FIG. 7 is a component view of an alternative embodiment of the present invention, along with data flows among the components.

Consider now FIG. 7 in more detail. This shows the components of the Microphone Locater System (750), and the dataflows between them, but unlike FIG. 2A and FIG. 2B does not show the actual location of the components within the physical room in which the participants are using the microphones.

The components of the Microphone Locater System (750 in FIG. 7) include an independent wireless microphone system 740 with microphones 101, 103, 105, and 107, and a receiver 119. These are the same or similar to the microphones and receiver shown in FIG. 1A, FIG. 2A, FIG. 2B, FIG. 2C, FIG. 3A, and FIG. 3B.

(As discussed more fully below, the tags shown in FIGS. 7 (701, 703, 705, and 707) are not embedded in, or built into, the microphones (101, 103, 105, and 107), but rather are attached to the microphones, and operate independently of the microphone circuitry.)

The data flows between the microphones (101, 103, 105, and 107) and the receiver 119 are shown in FIG. 7. For exemplary purposes, at the moment of operation being illustrated, only microphone 103 is transmitting audio to the receiver 119, which is shown by a heavy dashed line. Likewise, only the audio output for microphone 103, received at the receiver 119 and then sent from the receiver to the MLD, 700, is non-null (see heavy arrow from 119 to 713).

The receiver 119 of such a wireless microphone system 740 typically provides separate audio output for each microphone (101, 103, 105, and 107) which can be sent to an audio mixer via cables. (The cables from the receiver 119 to the MLD 700 are not shown, but are represented in FIG. 7 by the four arrows from the receiver to the MLD.) These multiple audio outputs are provided so that the typical microphone system can be used not just in a presentation setting (where only one person at a time is expected to speak) but also by a musical group with a number of different musicians (e.g., singers and instrumentalists) each singing or playing into a separate microphone, thereby producing audio and music at the same time, which distinct audio inputs can be adjusted by a separate audio mixer. These audio cables will be connected to the Microphone Location Device 700, as discussed in more detail below.

As with FIG. 2C, the audio output of the receiver 119 is also sent to the Audio Interface 221, after which it will be send to a computing system 207 for transmission to a videoconferencing platform 234 such as Zoom, via the internet 233. The audio output will also be sent via mixer, 223, and amplifier(s) 225 to an audio speaker or in-room sound system 231. This is indicated more schematically in FIG. 7 by the large grey arrow labeled 743 from the receiver pointing to the right, and labeled as indicating data flow to the Audio Interface 221.

The Microphone Locater System 750 also includes a separate independent RTLS system 742 with RFID tags (701, 703, 705, and 707) and anchors (141, 143, and 145). The anchors in FIG. 7 are similar to those shown in FIG. 1C, FIG. 2A, and FIG. 2B, and thus are numbered the same.

The anchors shown in FIG. 7 are distributed about the room where the microphones are used in the same manner as the anchors in FIG. 2A and FIG. 2B, so that the anchors can accurately perform triangulation of the RFID tags. The RFID tags in FIG. 7 are both similar to and different from those shown in FIG. 2A and FIG. 2B. They are similar, because they use the same frequencies and have the same range. They may be active and battery powered, or passive and battery assisted. However, the tags in FIG. 7 are different in that they are not connected to the batteries operating the wireless mics (101, 103, 105, and 107) and are not connected to the on-off circuitry of those mics. Instead, the tags in FIG. 7 are always "on" (but not necessarily continually transmitting)—the same as RFID tags in other independent RTLS systems. For this reason, the tags in FIG. 7 are numbered differently than the tags in FIG. 1A. Most importantly, and as mentioned above, the tags (701, 703, 705, and 707) shown in FIG. 7 are not embedded in microphones 101, 103, 105, and 107, but rather attached or affixed to them. This is accomplished via glue, double-sided tape, mounting clips, or tie-downs in one of the many ways known to those skilled in the art.

As previously discussed, the anchors are connected (either via cable or wirelessly) to a processor or computing device that is running RTLS hardware and software, which has the capability of processing the different signals transmitted by the tags to the anchors, so that the RTLS system can use triangulation to determine the location of the tags in the room. The processor may be located in an anchor, in the webcam (not shown), in the Microphone Locater device (700), in a separate computer such as 207, or in a standalone RTLS appliance (not shown).

The webcam used for the hybrid meeting is not shown, but is the same or similar to that shown in FIG. 1B as 121. The webcam likewise has an RFID tag 123 either embedded in it or attached to the webcam. In setting up the RTLS system used in FIG. 7, the location and orientation of the webcam with respect to the anchors is calculated and calibrated as previously described in FIG. 4. The webcam default view is likewise set up per FIG. 5.

As before, the RTLS system (742) uses triangulation of the radio transmissions received by the anchors (141, 143, and 145) to calculate the relationship of the location of the tags (701, 703, 707, and 709) attached to the microphones (101, 103, 105, and 107) to the location of the webcam 121 (or rather its tag 123). The RTLS system then sends that locational information to the Microphone Location Device 700.

Consider now the Microphone Locater Device (700) which ties the Microphone Locater System 750 together and integrates information from the independent wireless microphone system (740) with the tag locations determined by the independent RTLS system (742).

The Microphone Locater Device (700) includes electronic circuitry and special processors (both not shown), along with both long-term and short-term memory, such as, but not limited to, memory cache to store tag location (721, 723, 725, and 727). The processors and circuitry include digital and/or analogue circuits (not shown).

Each RFID tag is associated with a specific audio cable input during the system set up as described in flow chart FIG. 8A. After the start of the process, 803, a tag is attached to each of the microphones, 803, in the wireless microphone system. The serial number (or internal RTLS identifier number) for the tag is entered in the MLD, 805. This may be by keyboard, dial, or automated detector (such as the IR detectors used to pair wireless mics with receivers). These various methods of entering tag identifiers are known to those skilled in the art. The tag identifier is stored in the memory of the device 700. In a preferred embodiment, this is non-volatile memory, so that once the device is set up, the device remembers the tags' identifiers when the system is turned off, and then the device remembers the identifiers when turned on again for subsequent use during hybrid meetings. Then each tag identifier is similarly associated with one of the microphone inputs, 807. This too is stored in non-volatile memory, and the process stops, 809. The MLD has input ports similar to a mixer. Each port takes one individual microphone output of the receiver. (Remember that each microphone broadcasts on a different frequency, so that the receiver can produce these individual outputs, even if all microphones are being used at once by a musical group.)

Just as wireless microphone systems are produced for different microphone configurations (such as 2 mics, 4 mics, 8 mics, etc.), often with a separate wireless radio channel for each mic and a separate audio output for each wireless radio channel, the Microphone Location Device is produced in similarly different configurations, with inputs for 2 mics, 4 mics, 8 mics, etc.

The RTLS system 742 sends location data of the tags to the MLD 700. This location data for each tag is stored in a separate cache assigned to that tag (via the tag identifier entered into the MLD in step 807 of FIG. 8A). In the example shown in FIG. 7, the location of tag 701 is stored in cache 721; the location of tag 703 is stored in cache 733; the location of tag 705 is stored in cache 735; and the location of tag 707 is stored in cache 735.

Each audio output cable for a specific mic coming out of the receiver is plugged into the MLD input chosen for that associated mic/tag combination in step 807 of FIG. 8A.

In a permanently installed or rack-mounted system, this connection is done only once. For a portable system, designed to assist hybrid meetings in different rooms or different locations, the installer must take care to correctly match the cables from the receiver mic outputs to the MLD inputs. (As with other audio equipment, using color-coded cables or affixing labels to the cables, outputs, and inputs, will assist with this task.) Otherwise, the installer, runs through the set-up process (FIG. 8A) again.

For purposes of illustration in FIG. 7, when a decision point or component is labeled as "Mic xyz is on?" (see 711, 713, 715, and 717), a more correct description is a query that the mic is broadcasting audio to the receiver. However, there is not enough room in the diagram for all of those words, though that is the intent of the label.

When the Microphone Locater Device 700 detects that a mic is broadcasting audio, say via mic 103 at 713, the location of the associated tag 703 will be retrieved from its cache 723, and the location will be sent as output 731*b* from the MLD 700. The location is then transmitted to the computer 207 and webcam 121, as indicated by the large grey arrow 745. The process by which the MLD 700 does this will be described in greater detail below.

First, consider that flow chart shown in FIG. 8C, which corresponds to (and describes the processes within) the schematic data flows pictured in FIG. 7, and shows how the processes of three independent systems (shown in both figures) interact. The three independent systems are the wireless microphone system (841 in FIG. 8C and 740 in FIG. 7), the RTLS system (851 in FIG. 8C and 742 in FIG. 7), and the Microphone Locater Device (860 in FIG. 8C and 700 in FIG. 7). FIG. 7 and FIG. 8C also show the output from these independent systems to the other components of the videoconferencing system (e.g., the output to the computing, audio, video, and networking equipment more fully shown in FIG. 2C).

The process in FIG. 8C starts (831) with a user or operator turning on the microphone locater system (833). In actuality, the user/operator would also have to turn on the rest of the videoconferencing system for meaningful interaction—that is, the rest of the equipment shown in exemplary fashion in FIG. 2C has to be turned on as well. This includes, but is not limited to, the webcam, 121, the computing device, 207 the large screen monitor or projector, 209, the various local audio equipment (such as audio interface, 221, audio mixer (s), 223, amplifier(s) 225, audio speaker or sound system, 231), the internet access point, 233, and the videoconferencing application installed on the computing device, 234.

If the equipment is permanently installed in the building, this might be accomplished by turning on one switch. But in other cases, the operator must separately turn on a number of distinct pieces of audio, video, and computing equipment and software.

After turning on the system, 833, the process flows through node 835, and two of the systems (the wireless microphone system, 841, and the RTLS system, 851) begin gathering audio and locational data.

Within the RTLS system, 851 (also shown as 742 in FIG. 7), the anchors (141, 143, and 145) wirelessly transmit and receive data from the RFID tags (701, 703, 705, and 707) as shown in step 853 (with data flows among the tags and anchors shown in FIG. 7). Then the RTLS system software calculates the locations of the tags (step 855) and sends the location of each tag to the Microphone Locater Device (shown as 700 in FIGS. 7 and 863 in FIG. 8C) in step 857, where the location of each tag is stored in cache (shown in FIGS. 7 as 721, 723, 725, and 727) in step 861.

At the same time, in parallel, the wireless microphone system 841 gathers audio when a mic (101, 103, 105 or 107) picks up sound, 843. The mic transmits the audio to the receiver, 119, in step 845, which the receiver receives, 847. The receiver sends the audio signal to the Microphone Locater Device (700 in FIGS. 7 and 860 in FIG. 8C) in step 849. At the same time the audio signal is sent to the videoconferencing platform as well as the in-room speaker or sound system, shown in 743 (shown in both FIG. 7 and FIG. 8C). These components are illustrated in more detail in FIG. 2C. After step 827, the process arrives at node D, 863.

Figure 3A:
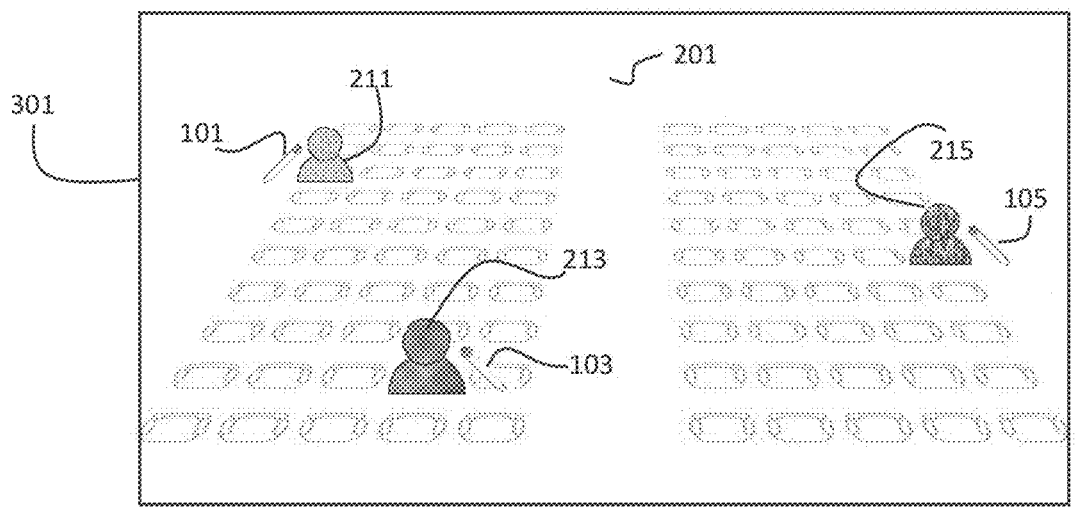
FIG. 3A is a screen shot from a video taken by the webcam of the audience shown in the perspective view of the room per FIG. 2B, when no member of the audience is speaking into a microphone—otherwise set as the "default view".
Figure 3B:
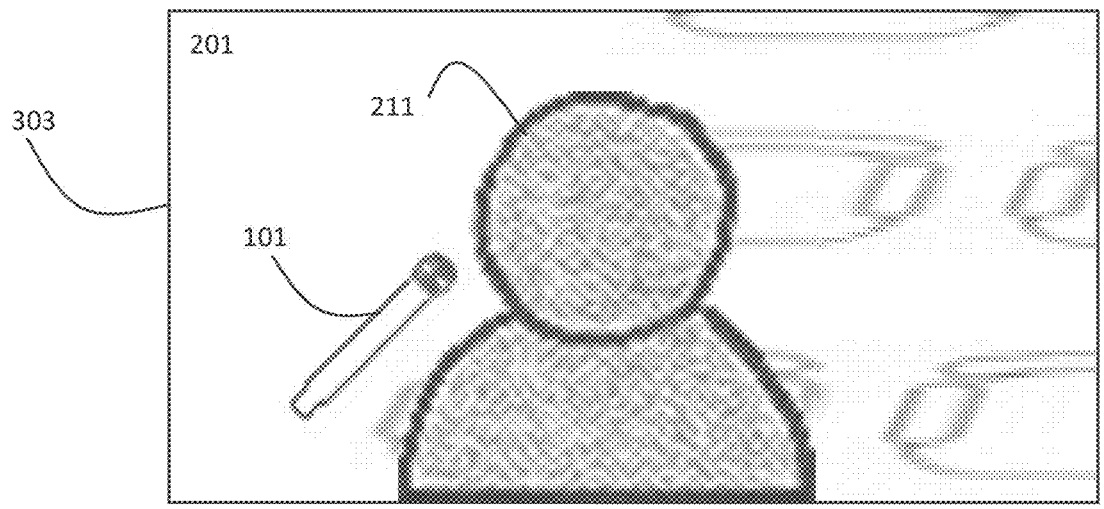
FIG. 3B is a screen shot from the video taken when an audience member speaks into one of the microphones shown in FIG. 1A, and the system zooms in on the person/speaker holding a microphone.

The Microphone Locater Device, 860 in FIG. 8C, processes the information received from node D, 863, through to node E, 865. It uses the audio information from the microphone signal to determine which tag location information to extract from cache, as detailed in FIG. 8B, and described below. Then in step 745 (as shown in both FIG. 7 and FIG. 8C) the MLD sends the location of the active microphone to the rest of the system, that is, to the computer and webcam, so that the webcam focuses and frames the video of the person speaking into the active microphone. (In FIG. 7 the active microphone is 103.) If no microphone is active, the Microphone Locater Device, 860, instructs the webcam to provide the default view (an example of which is shown in FIG. 3A).

After node E, 865, if the system is still turned on (871), the process returns to node A, 835, for the wireless microphone system, 841, and the RTLS system, 851, to gather more audio and locational data. If at decision node, 871, the system is no longer turned on, the process stops, 873.

Consider now FIG. 8B which shows detail of the processing within the MLD (860 in FIG. 8C and 700 in FIG. 7). FIG. 8B is to be combined with the processes shown in FIG. 8C. After node D, 863 in FIG. 8C, that process continues at node B, 811 in FIG. 8B. The process then, in step 803, counts the number of microphone inputs (N) obtained from the receiver 119 and connected to the MLD (700/860). It does this utilizing sensors incorporated into the MLD cable input jacks (not shown, but known to those skilled in the art). The MLD circuitry and software then runs a software "do" loop to determine which microphone is active. As shown in FIG. 8B, the mic input counter (MIC) variable is set to 1, step 815. An audio load sensor (or gateway) then determines if the mic input is sending audio, step 817. If so, the MLD program retrieves the location of the tag associated with the mic input, step 819, from where it was stored (e.g., 723 in FIGS. 7 and 861 in FIG. 8C)—and then sends that tag location (e.g., 731*b* in FIG. 7) to the computer and webcam for automatic focusing, step 821 (745 in FIG. 7 and FIG. 8C).

The process then proceeds through node C, 823, of FIG. 8B, to node E, 865 of FIG. 8C, completing this cycle of MLD processing.

Note that FIG. 7 and FIG. 8B have different illustrations of the process. Step 817 in FIG. 8B includes the queries 711, 713, 715, and 717 shown in FIG. 7. In contrast, FIG. 7 shows all of the queries at once to indicate that the query is made of each input. FIG. 8 shows the queries being made one at a time via a "do" loop. Somewhat similarly, step 821 in FIG. 8B includes potential actions 731a, 731b, 731c, and 731d in FIG. 7, however, only one of those potential actions (sending the location of the tag respectively numbered 721, 723, 725, or 727) is taken by the device (see steps 821 and 829 in FIG. 8B), depending upon which microphone (if any) is active.

Returning to step 817, if the mic input being checked is not sending audio, the process queries whether all mic inputs have been checked (that is, if MIC=N), step 825. If so, this means that even though all of the mics may be turned on (and "live") no one is talking into any one of them. No mic is active. Consequently, the MLD sends a null location indicator to the computer and webcam, effectively instructing the webcam to focus per the default view previously established, step 829 (data flow 745 in FIG. 7 and FIG. 8C). An example of a default view is shown in FIG. 3A.

The process then proceeds through node C, 823, of FIG. 8B, to node E, 865 of FIG. 8C, completing this cycle of MLD processing.

Returning to step 825, if MIC≠N (the mic input counter variable does not equal N the number of inputs), then the program increments the microphone input counter by 1, 827 and returns to step 817 to ask again whether this other mic input is sending an audio signal.

In this way the MLD is continually checking which microphone (if any) is sending an audio signal and (a) sending the tag location of the active microphone (if any) to the webcam for focusing and framing, or (b) sending a null or default signal to engage the default webcam view when no microphone is sending an audio signal.

To prevent momentary pauses in audio transmission from a microphone from triggering a signal to show the default view, an alternate embodiment incorporates a timer before signaling the default view.

In an alternative embodiment, the Microphone Locater Device is built into the receiver. In an alternative embodiment, as mentioned above, the RFID tag is embedded in the microphone housing, but not connected to the microphone circuitry, battery, or power switch, and microphone location is determined by an MLD integrated into the receiver.

In an alternate embodiment, the microphones are wired (rather than wireless) but portable, their audio signals are sent over cables and wires to the sound system for processing (rather than wirelessly), and their signals are first processed by a mixer or audio interface (rather than a wireless receiver). In deploying this embodiment, some of the wired mics are placed on microphone stands at various places in the in-room facility. These include floor stands in the aisles of an auditorium, or short stands placed in front of panelists at a table on stage in the front of the auditorium. In an alternate embodiment, some of the in-room microphones are wired, and some are wireless.

For ease of illustration and discussion, the figures above show four microphones. However, as known to those skilled in the art, a wireless microphone system can have more or fewer microphones, and as known by those so skilled, the disclosure above and related figures can be readily modified to accommodate wireless microphone systems with more or fewer microphones.

In the discussion above, the anchors are described as standalone devices, and details of the speakers and sound system are not provided. In an alternate embodiment, the anchors are built into portable speakers which are then placed around the room as appropriate.

The RTLS software is discussed as loaded onto the laptop computer, 207. In an alternate embodiment, the RTLS software is embedded in a processor built into the webcam. In an alternate embodiment, both the RTLS software and the software for aiming, focusing, and zooming the webcam and framing its video are built into a separate device.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for performing auto-focusing of a camera on an in-person attendee in a hybrid meeting who is speaking into a wireless microphone, wherein the computer program product comprises non-transitory computer-readable media encoded with instructions for execution by a processor (including the processor that the RTLS software is embedded into) to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Part 2 of Disclosure

In the embodiments of the present invention disclosed above, it is taught how to use a Real Time Location System (RTLS) in conjunction with a wireless microphone to locate that microphone, for the purpose of locating the person speaking into that microphone, in order to video that speaker in the context of a hybrid videoconferencing meeting.

In an alternate embodiment, preferred embodiments of the present invention are used outside a videoconferencing context. For example, in a live event, such as a rock concert, live video of a person holding a microphone (such as a singer) is often displayed on large screens surrounding the stage, so that people attending the concert who are far from the stage can still see the facial features of the speaker or singer. Such videos are often employed in concerts and presentations to large audiences even when the event is not broadcast or streamed. This embodiment of the invention allows video feeds of speakers, singers, or performers to be obtained automatically and without adding the cost of video camera operators. As understood by those skilled in the art, this embodiment is accomplished via the same methods as described above, but does not involve connecting the system to the internet. (Some equipment or software used to connect to the internet may be eliminated in this embodiment. That is, networked equipment and networked software, such as shown in FIG. 2C, would not be used in this embodiment.)

In this context the word "speaker" refers not only to a person speaking or singing into a microphone, but also a person playing a musical instrument into the microphone, or similarly creating audio which is picked up by the microphone for amplification and communication to the audience.

With this embodiment (as well as some previously discussed embodiments), an audio-visual or production engineer is employed to decide which among the various automatically obtained video feeds is to be displayed, and manually switches between them. Alternatively, the switching cues are pre-programmed to be implemented automatically using conventional video production control technology. Alternatively, a combination of manual and pre-programed automatic switching is used to advance through the camera cues for an event. An alternative embodiment of the present invention, discussed below in Section L, teaches how to incorporate into theatrical and production control technology, methods of the present invention by which cameras and lighting fixtures automatically track and follow a performer.

A. Venue is a Stadium or Performance Setting

In an alternate embodiment, the setting is not in an auditorium, but rather in an arena or stadium with stadium-style seating and standing room. The standing room is either in the stadium's "stands", in elevated decks, on the field, or at ground level. The person speaking into the microphone is seated in or standing at any seating or standing area reserved for audience members or attendees. In an alternative embodiment, the person speaking into the microphone is seated or standing on a stage or platform. In an alternative embodiment, the event is a performance setting rather than a meeting or gathering. For example, the event may be a theatrical performance, a sporting event, or a rock concert.

B. Focusing of a Theatrical Light on the Person Holding the Mic

In an alternative embodiment, the RTLS system provides locational information of the microphone in order to locate the person speaking into the mic—not for the purpose of focusing a camera on that person, but rather to shine a theater spotlight on that person. Instead of a software controlled PTZ camera, the location data is fed to a software-controlled spotlight (also referred to as a programmable moving head, intelligent lighting, automated lighting, lighting fixture, lighting instrument, or follow spot). For more on automated lighting, see for example https://en.wikipedia.org/wiki/Intelligent_lighting. Just as a PTZ camera can be programmed to pan, tilt, or zoom, so can automated lighting. (The term "zoom" with respect to a camera refers to making a subject appear closer or further away in an image: https://www.androidauthority.com/camera-zoom-optical-digital-hybrid-1021264/. Zooming into a subject will result in the subject filling a larger part of the camera's field of vision or frame. The term "zoom" with respect to theatrical lighting fixtures refers to the ability of the fixture to adjust the size of its beam into a wider or narrower field or angle: https://en.wikipedia.org/wiki/Stage lighting instrument. Both originally involved adjusting the distance between multiple lenses within the camera or lighting fixture or instrument.)

In this embodiment of the invention, the singer in a rock concert is automatically followed by a spotlight as he or she performs. (FIG. 9, described more fully below, shows a moving head, 901, being automatically focused by another embodiment of this invention.)

In an alternative embodiment, the location of the microphone—and hence the location of the person speaking into the microphone—is sent to more than one moving head, each placed at a different location, so that a number of lighting fixtures can shine light on the person from a number of angles, using one or more colors or effects to enhance the event.

A lighting technician or engineer manually switches among (and adjusts) automatically focused follow spotlights or moving heads. Alternatively, switching among (and adjusting) the moving heads is pre-programmed as a lighting cue (or cues) using conventional theatrical lighting control technology which then automatically implements the cues. Alternatively, a combination of manual and pre-programed automatic switching is used to advance through an event's lighting cues. An alternative embodiment of the present invention, discussed below in Section L, teaches enhanced theatrical and production control technology which incorporates aspects of the present invention and is specifically designed to control auto-focusing cameras and lights that automatically follow a performer.

In an alternative embodiment, the location of the microphone—and hence the location of the person speaking into the microphone—can be sent to both one or more webcams (PTZ video cameras) and one or more moving heads. The moving heads provide light for the webcam video.

In an alternative embodiment, the PTZ camera is built into or attached to a moving head based on a yoke with motorized pan and tilt. In this embodiment, the camera and lighting fixture share an automated yoke for tilt and pan purposes. Zooming for the camera requires different programming and circuitry than zooming for the light fixture, but both rely upon the RTLS system to determine location of the microphone, hence the distance for the throw of the light and range for the camera, and the necessary amount of zoom to correctly frame, light, and video the person speaking into the microphone.

As discussed above, with respect FIG. 3B, in an alternative embodiment, Artificial Intelligence (AI) and body segmentation algorithms are coupled with the use of a digital camera and Augmented Reality (AR) software to fine-tune the aim and zoom that the RTLS system generated for that camera to properly frame the person speaking into the microphone that has the RTLS tag. In an alternative embodiment, the same adjustment coordinates obtained by AI for fine-tuning the aim and zoom of one camera trained on the speaker are used to fine-tune the aim and zoom a moving head (lighting fixture) being used to illuminate that speaker.

C. Use of a Lavalier Mic or Madonna Mic, and the Tag is Attached to the Mic's Headset or Bodypack The figures referenced above (i.e., FIG. 1A, FIG. 2A, FIG. 2B, FIG. 2C, FIG. 3A, FIG. 3B, and FIG. 7) have shown a wireless microphone of the style that can be held in the speaker's hand, held in front of one speaker's mouth by another person, or clipped into a microphone stand. Other commonly used wireless microphone styles included lavalier (or lapel) microphones and Madonna mics: https://en.wikipedia.org/wiki/Wireless_microphone. Lavalier mics are small microphones clipped onto the speaker's clothing such as a tie, a jacket lapel, or a shirt front. To keep the microphone profile small, the larger wireless transmitter for the mic (also referred to as a "bodypack" which contains a battery that powers the transmitter) is clipped to the speaker's belt, slipped into one of the speaker's pockets, or attached to the speaker's clothing. A wire runs from the lavalier mic to the body pack. A headset mic or Madonna mic (named for Madonna, one of the singers who popularized its use) is a small microphone built into a headset and positioned near the mouth of the speaker or singer. A wire from the mic connects to a wireless transmitter (such as a bodypack) that is less visible to the audience. Lavalier and Madonna mics allow the speaker or singer to gesture with both hands, and dance or otherwise move about the venue or presentation stage. Generally, a lavalier or Madonna mic is not passed from person to person, but rather worn by one person for the duration of the scene or event.

These type of mics are known by other names to those skilled in the art, often indicating where the mics are attached or hidden, such as (but not limited to) body mics, collar mics, neck mics, personal mics, wig mics, hair mics, and hairline mics. The mics and their bodypacks may be attached to (and hidden in) ears, wigs, hats, or woven into a speaker's hair. In the finale of some productions of the musical "The Full Monty", both mics and body bodypacks are hidden in the characters' policemen's hats—which are just about all that the actors are wearing in the finale.

In an alternative embodiment of the present invention, the RTLS tag is not affixed to the microphone itself, but rather is affixed to a headset or bodypack attached to the mic—for example, with a lavalier or Madonna mic. Because the headset or bodypack is attached to the speaker, the RTLS system (by locating the RTLS tag) still provides the location of the speaker. In an alternative embodiment, fine-tuning for framing a video feed of the speaker or aiming a lighting fixture at the speaker is effected by AI and AR software using torso or body segmentation as discussed above, and known to those skilled in the art.

In an alternate embodiment of the present invention, the user or administrator enters tag/bodypack locational information into the RTLS system to assist with the AI segmentation. That is, the location of the bodypack on the performer's body is entered via checklist, such as belt, back, hat, wig, or hand. This allows the system to choose the most appropriate body segmentation algorithm for fine-tuning the framing and aiming.

In this embodiment, using a lavalier or Madonna mic, the RTLS is not using one tag on a microphone to locate a series of different people who speak sequentially into that one microphone, but rather following one person as that person moves about the venue or presentation stage—whether or not the person is speaking, singing, or creating sound at that moment. This RTLS calculated location is used to automatically focus one or more video cameras or intelligent lights on that moving person. As noted above, audio-visual, lighting, and production engineers may switch among (or adjust) the multiple resulting video feeds and intelligent lights focused on that person. Alternatively, the switching for a show, presentation, concert, or event is accomplished via pre-programmed software and hardware (e.g., as automatically implemented production camera and lighting cues). Alternatively, a combination of manual and pre-programed automatic switching is used to advance through an event's camera and lighting cues.

When using multiple instances of this embodiment—such as multiple cameras and lights following one tag on one person, plus multiple tags (on multiple people) coupled with additional cameras and lights—these multiple instances are capable of automatically lighting and producing video feeds of multiple people moving about the space. Again, audio-visual, lighting, and production engineers switch among (or adjust) video feeds or lighting fixture beams—choosing not only which camera and lighting angle to feature, but also which person/speaker to feature. Again, this choice of video feed and lighting may be automatically pre-programmed, in whole or part.

D. Wireless Microphone can be the Mic in (or Attached to) a Smartphone

Smartphones are increasingly being used as part of systems which capture, record, or stream audio, video, or both—including for applications like vlogs, podcasts and YouTube. One reason is that smartphones not only have exceedingly powerful audio and video components as well as advanced electronics built into them, but they are also ubiquitous. Almost everyone has one.

Smartphones used for these purposes include, but are not limited to, the iPhone manufactured by Apple using the iOS operating system and the many smartphones based on Google's Android operating system. The term "smartphone" as used in this disclosure includes other small computing devices (including some tablet computers) which have a built-in microphone that can capture sound and transmit it wirelessly through one or more networks or systems to other smartphones and similar devices. For a discussion of streaming on smartphones see https://www.dacast.com/blog/how-to-stream-live-from-iphone/. The microphones built into smartphones are sometimes used for these purposes, but external plug-in microphones have been designed to enhance the audio capture capabilities of smartphones. Plug-in mics are currently made by many manufacturers, including well known microphone brands, such as Sennheiser, Shure, Rode, and Zoom. (See for example https://www.digitalcameraworld.com/buying-guides/best-microphones-for-iphone.) Plug-in mics include, but are not limited to, lavalier mics, omni-directional mics, mini shotgun mics, and cardioid mics. Some of these, including the Shure MV88 and the Zoom iQ7, are designed so that a smartphone can be used like a hand-held mic.

In an alternative embodiment of the present invention, instead of a stand-alone hand-held wireless mic (such as the Phenyx Pro), a wireless lavalier mic, or wireless Madonna mic, the invention uses the microphone integrated in or attached to a smartphone. The basic principle remains the same: using an RTLS system and tags (or chips) to locate the microphone (now part of or attached to a smartphone) also serves to locate the person speaking into the microphone—that location can be used to automatically focus a video camera or lighting fixture on the person speaking into the smartphone microphone.

There are a number of ways to accomplish this.

Consider first the issue of RTLS tags. In a preferred embodiment the tag circuitry is built into the phone itself, and (if an active tag or battery assisted tag) the tag can make use of the smartphone's battery. Indeed, many smartphones already include circuitry and chips (a) for locating other smartphones and similar devices, as well as (b) for enabling other smartphones and devices to locate them. Both Android and iOS phones include circuitry, downloadable helper applications, and in-the-cloud locational databases for finding those phones. Android's "Find My Device" application is based on GPS, wifi and mobile phone data (https://en.wikipedia.org/wiki/Find_My_Device). In contrast, Apple's "Find My" application (see https://en.wikipedia.org/wiki/Find_My) makes use not only of GPS, wifi and mobile phone data, but also ultra-wideband (UWB). Newer iPhones and Android-based Samsung Galaxy phones incorporate a U1 chip which uses ultra-wideband (UWB) technology for generating more precise locational data than wifi, mobile, or Bluetooth. In comparison, Litum (mentioned above) combines UWB and active RFID technology in its real-time location system: https://litum.com/ble-vs-uwb-which-technology-is-better-for-rfid-rtls/. (Both newer Android and iOS smartphones are also incorporating Bluetooth 5.0 which has an increased potential range of 800 feet in a venue without walls.)

In an alternative embodiment, the tag circuitry is built into an accessory that is plugged into the smartphone. In particular, the tag circuitry can be built into an external microphone designed to be plugged into a smartphone. (See discussion above.) The tag circuitry (like the plug-in-mic) can then be powered from the smartphone's battery if necessary. In an alternative embodiment the tag is attached to the plug-in accessory. In contrast to the smooth body of most smartphones, plug in accessories are more often designed with clips and other attachments in mind. In an alternative embodiment, the tag is built into a smartphone case that is handed to attendants (or attendees) at the event.

In yet another alternative embodiment the tag is affixed to the smartphone (or its case) by an adhesive strip that comes already attached to the tag. (Compare the Sticker smart tag by Tile.)

In an alternative embodiment two or more of these different embodiments of tag implementation are used in a single event. That is, multiple smartphones are each used as a wireless mic in an event, and different instances of these smartphones each employ a different embodiment of the invention with respect to tag technology or audio transmission.

In one preferred embodiment, the smartphone user intentionally sends audio from the smartphone to a pre-published phone number obtained by the event production team, which the user has manually entered into the phone. In an alternative embodiment, the user has entered the phone number by use of a QR code associated with the event, or a software application embodied in the event ticketing and entry process, in ways known to those skilled in the art. Any such instance of a user intentionally transmitting audio via smartphone for use in the event is referred to herein as a "dialed event phone call".

Consider now FIG. 9. In a preferred embodiment, a smartphone (905) transmits audio (in digitized or electronically modulated form) from the speaker (the person speaking into the phone) to the event audio production engineers (or event moderators) and their equipment (collectively shown as smartphone audio system, 941) using the cell phone network (via cell phone tower, 913, and external transmission system, 911). In an alternative embodiment, the smartphone (903) transmits the audio to a local wireless gateway, 909 (using wifi, Bluetooth, radio waves or other standard) which then sends the audio to the event audio production engineers (or moderators) and their equipment, 941, via an external transmission system (911) such as (but not limited to) the internet (using VOIP) or telephone land-line network. In an alternative embodiment, the smartphone (907) transmits the audio to a local wireless gateway (145 which in this scenario also serves as an anchor in the local RTLS system, but without limitation may be a separate gateway device similar to 909) which sends the audio to the event audio production engineers (or moderators) and their equipment, 941, via an internal transmission system, 915, for the event venue (such as, but not limited to, a PBX-style telephone system or a Local Area Network).

The actions of the audio production engineer(s) or event moderator(s) detailed in FIG. 9, can be accomplished in some systems by pre-programmed automated call management and event production software—and in other instances such actions are accomplished by a combination of manual choice by engineers or technicians and pre-programmed automation. In particular, call routing software and hardware for customer service call centers allow myriad people to call the same phone number and be routed to operators and technicians who in parallel provide service to (or take actions with respect to) multiple callers at the same time.

The original paradigm in Part 1 of the disclosure is a meeting or event, where one speaker at a time talks. Consider when the speaker or presenter is speaking (or singing) into a smartphone (such as 903, 905, or 907) rather than a wireless microphone, shown as 101, 103, 105, or 107 in FIG. 1A, FIG. 2A, FIG. 2B, and FIG. 7.

In a preferred embodiment, speaking into the smartphone uses voice activation to turn on an RTLS tag embedded in or attached to a smartphone. While the term "voice activation" can have several colloquial meanings, including starting a program or search using a digital assistant such as Siri or Alexa, this disclosure instead uses the term "voice activation" to refer to the computationally simpler voice activity detection. Voice activity detection as used herein also includes use of a voice-operated switch. See https://en.wikipedia.org/wiki/Voice_activity_detection and https://en.wikipedia.org/wiki/Voice-operated switch for fuller discussions of both terms.

In an alternative embodiment the action (e.g., pressing a physical control on the smartphone, or virtual button in a software application on the smartphone) not only dials the dialed event phone call to send audio to the event audio system, but also activates the RTLS tag, via internal circuitry, or wireless activation of the tag, such as via Bluetooth. Representative smartphones are shown in FIG. 9 as 903, 905, or 907. The tags themselves are not separately shown or labeled. Each tag, when activated, sends a wireless signal to the anchors (representatively shown as 141, 143, and 145 in FIG. 9). The data from these signals are forwarded from the anchors to the RTLS system 951. This corresponds to the data flows in FIG. 2A, where the RTLS system in FIG. 2A is represented by a software program running in the laptop 207.

Under this paradigm (one speaker at a time), there is only one phone, one tag, and one audio transmission active at a given time, so the RTLS system can be greatly simplified from what is shown in FIG. 9 (and more like that shown in FIG. 2A). The RTLS system (951) processes the tag data (via triangulation, trilateration, time of flight, angle of arrival, strength of signal or some combination) and sends the location instructions to the PTZ camera (121 in both FIG. 2A and FIG. 9) or moving head (901) via node 977. This data flow is represented in FIG. 2A as the arrow between 207 and 121. Under this one-speaker-at-a-time paradigm, the smartphone audio processing system (941) can also be simplified, and for the same reason. Regardless of how the audio is transmitted from the smartphone to the audio system (941) the audio signal is only sent to the event sound system or audio interface (see 743 in FIG. 7 and FIG. 8C, as well as 973 in FIG. 9). In this way when a speaker talks (sings, or creates audio) into the phone, the camera or lighting fixture focuses on the correct speaker.

Consider a slightly different situation. When the RTLS tags are sending signals independent of user actions or vocalizations, and there is more than one smartphone with a tag, the RTLS system can still locate the tags. However, randomly or intentionally choosing one of these tags does not mean that the person speaking into one of the smartphones is holding the smartphone with the chosen tag. Consequently, in this situation, the system must provide one or more methods for each tag to be paired with a unique and identifiable smartphone which is sending the audio transmission. Such an RTLS system locates all tags which are broadcasting their identification information. The production audio engineer (or event moderator) chooses which smartphone audio transmission to use. Then a smartphone locater device (analogous to the microphone locater devise described previously) matches the chosen smartphone's device ID (or phone number) with the pairing information and sends the location of the tag that has been paired with the identified smartphone (making the chosen transmission) to the camera or programmable spotlight.

The wireless microphones shown in FIG. 1A and FIG. 7—and their transmitted audio—are each be uniquely identified by the frequency or channel on which each transmits to the receiver. The smartphones in FIG. 9 cannot be identified that way, however each can be uniquely identified by their assigned phone number, device identification number, transmission account address, user name, or other ID.

In the following discussion the term "phone number" or "device ID" includes not only a name or identification number unique to a smartphone device, but also (and not limited to) the account address, user name, or other ID of a transmission account (such as a Skype account) by which the receiving device can uniquely identify the transmitting device or user.

The wireless microphones shown in FIG. 1A and FIG. 7 pair the RTLS tags with the unique channel (or frequency) used by the corresponding microphone via the Microphone Locater Device, 700. Now consider ways in which the phone number or device ID of each smartphone in FIG. 9 can be paired with the tag embedded in or attached to it.

RTLS tags can transmit more than their device ID. They can be coupled with sensing circuitry to transmit other environmental information, as known to those skilled in the art. Conversely, smartphones can include circuitry which receives tag ID information, especially if sent via Bluetooth, UWB or wifi—and as known to those skilled in the art, current tag technology allows tags to transmit their information via these and other wireless protocols.

Consider embodiments in which the tag ID is acquired by the smartphone.

In a preferred embodiment of the present invention, the tag ID is entered into settings on the smartphone when the tag is affixed to or embedded in the phone. In the case when the tag circuitry is physically incorporated into the phone, the tag ID (like the smartphone's device ID) is installed in the factory. Otherwise, in a preferred embodiment, the tag ID is entered manually via the smartphone keyboard. In an alternative embodiment, the tag ID is entered via voice recognition (the smartphone user speaks the tag ID). In an alternative embodiment, the tag ID is entered via bar code, QR code or other visual code using the smartphone's camera and application software installed on the smartphone that reads and stores the code. (Note that such visual codes are used not only to enter basic data, but to point browsers to websites where application and helper software are downloaded.) In a preferred embodiment of this use, the visual code is printed on the tag, so that the user scans the visual code using the smartphone before affixing the tag to the phone (or its case). In an alternative embodiment, where the tag is embedded into a plug-in accessory for the smartphone (such as an enhanced microphone), the installation software reads and stores the tag ID in the smartphone. In an alternative embodiment, when the tag wirelessly transmits its ID, the tag ID is read by the smartphone using appropriate circuitry built into the smartphone which understands the wireless protocol (including but not limited to Bluetooth, UWB, and wife) which the tag uses in its transmissions. Then the smartphone saves the tag ID into memory.

In a preferred embodiment, the tag ID is stored (or accessed) only in applications and instances in which the user gives permission. An example is a tag given out at a rock concert, which includes an application by which the user interacts via use of the smartphone microphone at the event—with the concert, the performers, or others. Another example is a tag embedded in the smartphone circuitry, which includes a toggle switch in the smartphone privacy settings to enable applications to access the tag ID. In an alternative embodiment, user permissions for access to the tag ID are not required. An example might be smartphones designed for young children.

Then, when embodiments of the present invention in which the tag ID is acquired by the smartphone are in use, and the smartphone makes a dialed event phone call to the event receiving phone number (in one of the manners described previously), the tag ID is appended to the phone number in the same way that telephone PBX or VOIP services permit the caller to configure customized caller ID information such as adding extension information, or in other ways known to those skilled in the art. (See for example https://en.wikipedia.org/wiki/Caller ID.) The receiving device for the event (which receives the dialed event phone calls) then uses software to reformat this information as a tag-phone ID pair in various formats, as known to those skilled in the art. In particular, in a preferred embodiment, the tag-phone ID pair is re-formatted by the smartphone audio system, 941 in FIG. 9, into a format acceptable to the Smartphone Locater Device, 961.

Consider now embodiments in which the phone number or device ID of the smartphone is acquired by the RTLS tag attached to or embedded in the smartphone.

In a preferred embodiment of the present invention, when the tag circuitry is physically incorporated into the smartphone, both the smartphone ID (and the tag ID) are installed into the smartphone in the factory.

In an alternative embodiment, where the tag is embedded into a plug-in accessory for the smartphone (such as an enhanced microphone), the accessory's installation software reads the phone ID or phone number. Then the software stores the phone ID or phone number which is accessed by the tag when it makes transmissions. Otherwise, in an alternative embodiment, when the tag is affixed to the smartphone, installation of application software associated with the tag reads and stores the phone ID or number. The stored ID is sent to the tag at appropriate times using appropriate circuitry built into the smartphone which sends the wireless protocol (including but not limited to Bluetooth, UWB, and wife). In cases where the tag has a memory circuit, the tag saves the smartphone device ID or phone number to that memory.

In a preferred embodiment, the smartphone device ID or phone number is stored (or accessed) only in tags and tag applications and instances in which the user gives permission. An example is a tag given out at a rock concert, which includes an application by which the user interacts via use of the smartphone microphone at the event—with the concert, the performers, or others. In an alternative embodiment, user permissions for access to the tag ID are not required. An example might be smartphones designed for young children.

Then, when embodiments of the present invention in which the smartphone device ID or phone number is acquired by the RTLS tag are in use, and the RTLS tag transmits information to RTLS anchors in the vicinity, the tag appends the information from the smartphone (that is, the phone number or device ID) to the tag ID. The RTLS anchor relays this information to the RTLS system. The RTLS system uses software to reformat this information as a tag-phone ID pair in various formats, as known to those skilled in the art. In particular, in a preferred embodiment, the tag-phone ID pair is re-formatted by the RTLS system, 951 in FIG. 9, into a format acceptable to the Smartphone Locater Device, 961.

Consider again FIG. 9, first with respect to information flows within the RTLS system, 951. The anchors transmit and receive data from the tags attached to or embedded in the smartphones, 851. At that point the system asks if a phone number or device ID was received by the tag and sent to the anchor, 921. If no, the process proceeds to 855, at which the RTLS system calculates the locations of tags by triangulation, trilateration, and other means discussed above, or known to those skilled in the art.

On the other hand, if at 921, the tag sent the smartphone phone number or device ID to the anchor, then two things happen: (a) the tag-phone number pair is sent to the Smartphone Locater Device (SLD), 961, where it is stored in memory, 963, and (b) the process continues within the RTLS system (941) at point 855, at which the RTLS system calculates the locations of tags by methods described above or known to those skilled in the art.

After step 855, the RTLS system continues at step 857, at which point the location of each tag is sent to the Microphone or Smartphone Locater system (961), where the location of each tag is stored in memory, 965. (FIG. 9, step 965 refers to both a Microphone Locater Device or a Smartphone Locater Device to indicate that an enhanced RTLS system used for an embodiment of the invention utilizing smartphones, also works for some embodiments of the invention using wireless microphones such as those in FIG. 1A.)

Consider now FIG. 9, with respect to information flows within the Smartphone audio system, 941. The smartphone mic having picked up sound (audio), 943, the smartphone sends the audio through the transmission system in one of the methods described above, 943, to a receiving device associated with the event, 947. Without loss of generality, the receiving device may be a smartphone, a telephone, a PBX style private phone system, a computing system that can receive phone calls over land lines, cell, or VOIP, or otherwise. After 947, the process reaches decision point 948, "Is a tag ID number embedded in the dialed event phone call or caller ID?" If the answer is no, the process continues to operation 949, at which the event audio engineer (or moderator) chooses an active dialed event phone call (and its audio) to participate in the event. In the preferred embodiment, when there is only one smartphone making a call to the smartphone audio system, 941, that one smartphone is chosen.

If on the other hand, there is a tag ID number embedded in the dialed event phone call or caller ID, two things happen: (a) the tag—phone #pair is sent to the Smartphone Locater Device, 961, and stored in the SLD memory, 963, and (b) the process continues within the Smartphone audio system (941) to point 949, at which point the event audio engineer (or moderator) chooses which smartphone is to be the active one (i.e., which smartphone's audio is to be used).

After step 949, the process again does two things: (a) it sends the audio signal to the sound system or audio interface, 973, for use in the event, and (b) it sends the active smartphone's phone number or device ID (labeled step 960), to the Smartphone Locater Device 961 decision point 969. (To clarify, step 960 is "Send the active smartphone's phone number or device ID to SLD", but there is not enough room on FIG. 9 in the box for step 960 for these words.) At decision point 949 the SLD checks whether the active phone number is paired with a tag.

Consider now the Smartphone Locater Device 961. It receives three pieces of information: (a) tag-phone number paired identifiers (from either the RTLS system 951 or the Smartphone audio system 941) which are stored in the SLD memory, 963; (b) locations of each tag (from the RTLS system 951) which are stored in SLD memory 965; and (c) the phone number of the active smartphone (chosen by the event audio engineer, or moderator, at step 949, and sent to the SLD via step 960) for processing at decision point 969.

At decision point 969, if the active smartphone has been paired with a tag (i.e., the answer to the decision point is "yes"), then the SLD sends the location of the tag on the active smartphone (step 975) to the computer, webcam (121), and/or the programmable spotlight (901) via node 977, for focusing and framing. Otherwise, if at decision point 969, the smartphone has not been paired with a tag, the SLD sends the default focusing instructions (as described above) to the computer, webcam (121), and/or programmable spotlight (901) via nodes 971 and 977. For example when the smartphone is not paired with a tag, the default instructions may tell the webcam to provide the widest field of view of the event venue on the video feed (for example, focus on the entire audience in an auditorium), or the default instructions may tell the programmable lighting fixture to dim the spotlight to black and not illuminate anyone.

In an alternative embodiment of the invention, shown by the dotted line from step 963 to 949, the SLD (961) sends information on tag-phone pairs (963) to the Smartphone audio system (941) so that at operation 949, the person (or program) choosing the smartphone audio to be featured knows that because no tag has been paired with the smartphone, no video feed of the phone or the person holding the phone is possible.

In an alternative embodiment, step 949 is modified to read, "Choose an active phone or active wireless microphone". This acknowledges that an event may use audio captured from both smartphones and wireless microphones such as those shown in FIG. 1A. As is known to those skilled in the art, this alternative embodiment also incorporates the Microphone Locater Device (860 in FIG. 8C) described previously but not shown in FIG. 9, as well as a branching data flow so that only one of these two devices (Microphone Locater Device or Smartphone Locater Device) sends location instructions to the webcam (121) or moving head (901).

In an alternate embodiment the Microphone Locater Device and the Smartphone Locater device are incorporated into one piece of equipment. As is understood by those skilled in the art, the various devices and systems shown in FIG. 9 and FIG. 8C may be combined or reconfigured.

E. Real Time Locater System Incorporates a Bluetooth (or UWB) Dense Wireless Smartphone Mesh and Online "Find My"-Style Database In an alternative embodiment, the RTLS system (951 in FIG. 9) is (or is augmented by) a wireless mesh network created primarily by the smartphones themselves, along with smart tags or beacons that interact with that mesh network. Consider, for example, the Apple "Find My" network. When a first Apple smartphone encounters the Bluetooth signal of another Apple device (including an Apple AirTag or another Apple smartphone), the smartphone uploads its own location information to the "Find My" database in the cloud along with encrypted information about the device which can be used to identify that device. For example, if a user accidentally drops an iPhone, AirTag, or other Apple Bluetooth device while jogging along a path. The next (second) iPhone which passes near the lost item (for example, the iPhone of the next jogger or walker on the path) sends the location of the second iPhone to the cloud (along with the encrypted device ID of the lost item)—which gives an approximate location of the lost item. The owner of the lost item can use the "Find My" network to find the approximate location of the lost item. When the owner of the lost item returns to that location (the location sent to the "My Find" network by second iPhone), the owner can use another iPhone that has a U1 chip and Apple's "Precision Finding" feature to tell the owner how far, and in which direction the lost item is (within a range of 15 to 30 feet): https://appleinsider.com/inside/airtags. (The owner can also use Bluetooth to activate a "chirping" sound that is emitted by the device to help find it.) As discussed previously, Google's Android phones have a somewhat similar "Find My Device" feature. Indeed, Apple and Google have proposed joint standards to allow both iOS and Android devices to detect an always on Bluetooth signal: https://gizmodo.com/airtag-apple-google-find-my-app-1850396569 However, locating a device with a tag or chip in a densely attended event (such as a rock concert)—where almost everyone has a smartphone—is different than locating a lost device in a park or the wilderness. In a well-attended event, where most attendees have smartphones, and many of those will be iPhones, the "Find My" network is pervasive. In many instances it can be used to provide precise relative locations of all the iPhones in real time, and similarly precise locations of smart tags affixed to all smartphones in the venue. See discussion below.

Single-use smart tags for time-limited events such as rock concerts do not need high-capacity batteries. Because of the high-density mesh network, they may even use passive tag technology. For these reasons, such single-use tags can be smaller than the tracker tags currently produced for such consumer mesh networks.

Figure 10A:
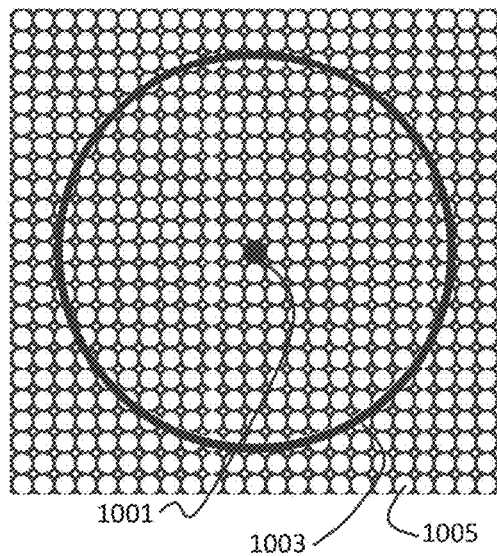
FIG. 10A shows a representation of a grid of circles, each with a diameter of 3 feet, approximating the space taken by people in auditorium style seating, or a standing room situation. Also shown is a larger circle with a 30-foot radius centered on a filled in smaller circle.

FIG. 10A shows a square room that is approximately 69 feet on a side. There are 529 circles (each with diameter of 3 feet) within the square. A sample circle is labeled 1005. Each circle represents a person and the approximately 9 square feet that the person occupies at a variety of social events, ranging from a standing cocktail reception to sitting in a packed stadium with auditorium-style seating.

Consider some "rules of thumb" for occupancy density in different spaces. With auditorium (or stadium) style seating, each person occupies approximately 6 to 8 square feet. For standing events each person occupies approximately 6 square feet. For reception style seating with a dance floor allow 9 square feet per person (https://www.socialtables.com/blog/event-planning/capacity-party-space-calculator/ by Cvent).

Consider a person, 1001, standing (or sitting) in the middle of this square room, with a smartphone. The smartphone can sense the range of Bluetooth devices held by the 250+ people within a 30-foot radius (the circle labeled 1003).

Figure 10B:
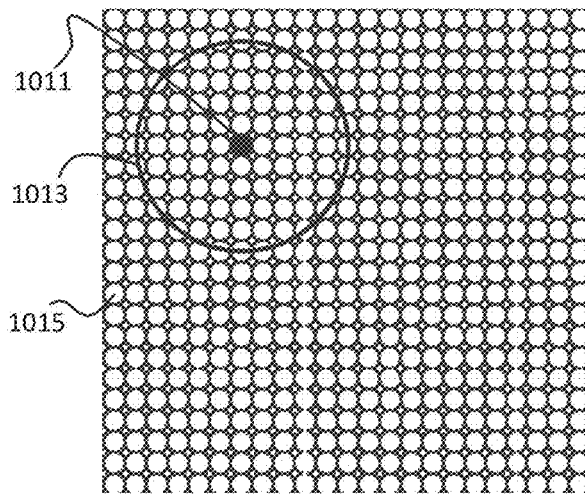
FIG. 10B shows a representation of grid of circles, each with a diameter of 3 feet. Also shown is a larger circle with a 15-foot radius centered on a filled in smaller circle.
Figure 10C:
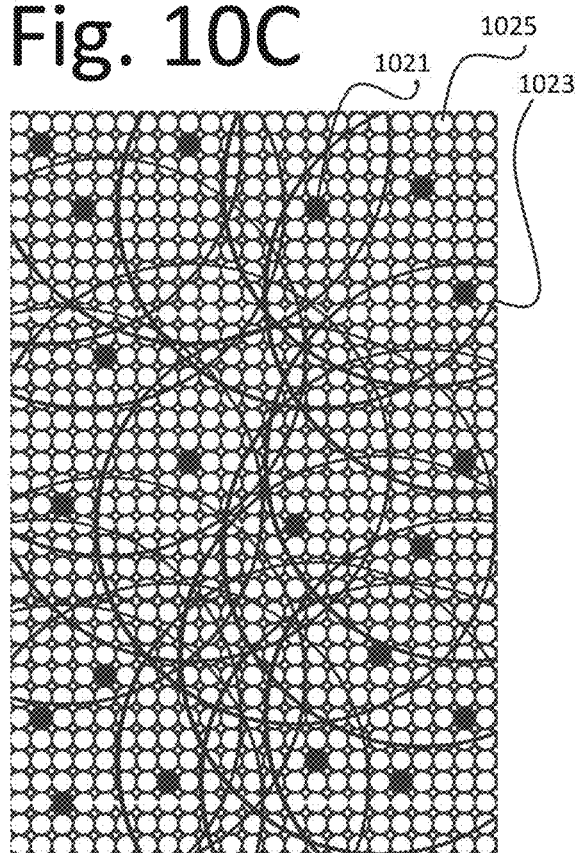
FIG. 10C shows a representation of a grid of circles, that is 23 circles wide and 35 circles high, each circle with a diameter of 3 feet. Also shown are a series of larger circles or partial circles, each with a radius of 30 feet, along with the filled in smaller circle at the center of each larger circle (or partial circle). Each small circle is within at least 3 larger circles.

FIG. 10C shows a room measuring 69 feet by 105 feet, occupied by 805 people (represented by 3-foot diameter circles, such as 1025). Also shown in black are filled-in circles such as 1021, which represent an individual with a smartphone, along with a thin-line circle, such as 1023, which shows the area within a 30-foot radius of a filled-in circle. (Thirty feet is chosen as a lower bound for this example, because many sources consider Bluetooth-powered smart tags most effective within a 30-foot radius.)

In FIG. 10C, there are 20 circles filled in with black. They have been chosen so that every person in the room is within 30 feet of at least three of these black filled-in circles—that is, every person (small empty circle) is within 30 feet of at least three smartphones. Assume every person has a smartphone with an affixed Bluetooth tag, then the location of every smartphone (hence every person) can be determined using trilateration from the smartphones of the people shown as filled-in black dots. Importantly, these black dots represent less than 2.5% of the circles in FIG. 10C. However, in many large and dense gatherings, not only will almost everyone be carrying a smartphone—but in the United States, approximately half will be iPhones (see https://www.bankmycell.com/blog/number-of-iphone-users), with a well-established Bluetooth mesh network having a cloud-based location database.

As noted previously, Apple (makers of the AirTag smart tag) is not the only manufacturer of smart tags with helper software applications and online databases. Consequently, Apple iPhones are not the only kind of wireless mesh network of interest. Other smart tags include the Samsung Galaxy SmartTag that works with the Android-based Samsung Galaxy, and the Tile tag which works with both Android and iOS phones. As known to those skilled in the art, independent third-party tags, downloadable applications, and cloud-based location databases can be built to service smartphones from all manufacturers.

Consider now FIG. 10B, which shows the same 69-foot square room as FIG. 10A, populated by the same 529 people (each represented by a 3-foot diameter circle such as 1015). However, the thin-line circle (1013) around blackened dot 1011 has only a 15-foot radius, showing that approximately 68 people are within 15 feet of person 1011.

Figure 10D:
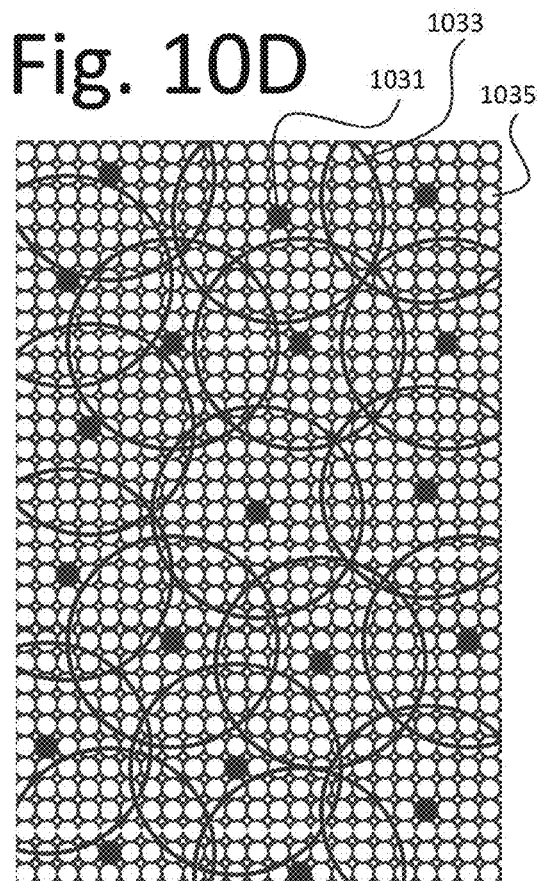
FIG. 10D shows a representation of a grid of circles, that is 23 circles wide and 35 circles high, each circle with a diameter of 3 feet. Also shown are a series of larger circles or partial circles, each with a radius of 15 feet, along with the filled in smaller circle at the center of each larger circle (or partial circle). Each small circle is within at least 1 larger circle.

FIG. 10D shows a room measuring 69 feet by 105 feet (a similar room as shown in FIG. 10C). It is occupied by 805 people (represented by 3-foot diameter circles, such as 1035). Also shown in black are filled-in circles such as 1031, which represent an individual with a smartphone, along with a thin-line circle, such as 1033, which shows the area within a 15-foot radius of a filled-in circle. (The fifteen-foot radius is chosen because Apple AirTag's use of UWB has been found effective within that distance for providing distance and heading readouts using Precision Finding.)

In FIG. 10D, there are 19 circles filled in with black. These represent people with newer iPhones with the U1 chip. They have been chosen so that every person in the room is within 15 feet of at least one of these black filled-in circles—that is, every person (small empty circle) is within 15 feet of at least one smartphone. Assume every person in the room has a smartphone affixed with a UWB tag, then the location of every smartphone (hence every person) can be determined from the smartphones of the people shown as filled-in black dots. Importantly, these black dots represent less than 2.5% of the circles in FIG. 10D, however, since the 2019 introduction of the iPhone 11, all new Apple iPhone models have the U1 chip. Instances of dense UWB mesh networks of iPhones are growing though not yet ubiquitous.

These are only exemplary illustrations of dense wireless smartphone mesh networks that work with smart RTLS tags and include encryption and range constraints to prevent stalking. It should be appreciated by those skilled in the art that various modifications and variations may be made to such dense wireless smartphone mesh networks for use in the present invention without departing from its scope and spirit, some of which increase location precision and accuracy.

F. Mic is the Microphone Built into a Wireless Earphone that is Paired to a Smartphone Many of today's wireless (e.g., Bluetooth) earphones, including headphones, bone-conduction wireless headphones and earbuds (including but not limited to Apple's Airpods) not only pair with smartphones to listen to music or podcasts, but also have built-in microphones. These microphones (built into the headphones or earbuds) can be used to speak during phone calls through the smartphone with which the device is paired. That is, microphone(s) in the headphone or earbud are used instead of the microphone in the smartphone. The software application on the smartphone contains settings for the paired Bluetooth device, including settings that control which microphone (smartphone or earphone) is used when the earphone is active. There are a variety of such wireless earphones for both Apple and Android smartphones (https://www.cnet.com/tech/mobile/best-wireless-earbuds-and-bluetooth-headphones-for-making-calls/. The microphone(s) in these earphones can be used to engage with the AI powered virtual assistants built into the paired smartphone, thereby enabling hands-free phone calling using the combination of paired earphone (with built-in microphone) and smartphone.

As discussed above, an RTLS tag in the bodypack of a wireless microphone can be used to locate the person speaking into the microphone attached or paired with the bodypack. In similar manner, in an alternative embodiment of the present invention, an RTLS tag or chip embedded in or attached to a smartphone is used to locate the person who is speaking into wireless earphones (that the person is wearing) which are paired with that smartphone.

G. Cueing System Coupled with RTLS System Database Assigns Devices to Follow Different Performers in Different Scenes In previously discussed embodiments, the RTLS system (having tags in a plurality of microphones) is used to focus a camera or lighting fixture (or several of them) on the one of the mics into which a person is actually speaking—or rather uses that RTLS determined position to focus on the person speaking into the microphone. In other previously discussed embodiments, the RTLS system is used to continually focus a camera or lighting fixture (or several of them) on a person to whom a tag is attached (by way of a microphone or bodypack), even if that person is not continually speaking. Rather, the RTLS system is used to focus the camera or lighting fixture on a person who is wearing, carrying, or holding a microphone in preparation for speaking into it.

In another embodiment, the RTLS system provides a continuously real-time updated database of the position of microphones—and those potential speakers, actors, or performers involved in the event to whom the mics are affixed or assigned—which RTLS system communicates with a programmable cueing, playback or show control system linked to lighting fixtures, video cameras, and other theatrical devices. Using this cueing, playback or show control system, when a scene changes (or on the activation of a mid-scene cue) in a theatrical play or performance event, the fixtures, cameras, and devices can be assigned to track and focus on a different set of speakers, actors, or performers.

Consider when one scene might be on the right side of the stage and another scene might be on the left side of the stage. Currently, programmable show control systems are coupled with moving heads (or PTZ cameras) to provide the equivalent "fixed" lighting (or video feeds) for both scenes with the same lighting fixtures (or cameras). For the one scene, the devices are focused on the right side of the stage; for the other scene the same devices are focused on the left side of the stage. This practice uses fewer devices, than if each fixture or camera was in a fixed position for the run of the show. The presently described embodiment of the present invention, provides similar programmable cueing flexibility to follow spots and following cameras. In one scene certain lights and cameras are used to follow one set of performers. In the next scene the same lights and cameras follow a different set of performers.

H. Audio from the Mic can be Suppressed, or Displayed as Text on the Videofeed

In the discussions above, audio input transmitted from the wireless microphones (whether wireless mics similar to those in FIG. 1A or smartphones as shown in FIG. 9) has been described as being sent to the event sound system or an audio interface, where it can be shared as part of a recorded, streamed, broadcast, online, or hybrid event. In an alternative embodiment, the audio is muted or first passes through speech recognition software before being shared, shown, or displayed as text, whether in the event, or on a streamed, broadcast, recorded, online, or hybrid version of the event. An exemplary use is when the present invention is used in a rock concert to obtain live video of an audience member singing along with (or shouting encouragement to) the concert performers. The video shows on a large screen monitor, jumbotron, or projection behind the performers, with or without the captioned text. The audio of the audience member is not itself played at the event (but may be mixed into a recording of the event). This is in order to prevent audio conflict or feedback between the audio from the audience member and the audio from the performer. However, many fans would appreciate seeing (and hearing) themselves as if a backup singer to their performing idols, would pay for the privilege, and would even pay for photos or videos evidencing that. (Consider the souvenir photos and videos taken by amusement parks of people on the various thrill rides.) As noted previously, the audio input that is sent to the event can be processed in parallel and a number of video feeds can be displayed (using video mixing software) at the same time on one screen or on multiple screens.

I. Active Mic Considerations

Some of the embodiments described above require a mic to be turned on and active. Others only require the RTLS tag to be active (which has a different meaning for a passive tag versus a battery-run or battery-assisted tag). Some embodiments use the active state of the mic to locate the person associated with the active mic. Others do not. In some embodiments the mic is active, turned on, and transmitting audio, but a production engineer for the event at an audio-mixing or audio-control console, is tasked with deciding whether to mute or unmute the audio from any particular mic, or adjust gain (volume) of any mic. For example, to prevent ambulatory noise and minimize feedback, the production engineer may mute the audio signals from performers who are not presently speaking or singing, even if the bodypacks of those performers are turned on for the entire scene. (For example, an actor's bodypack may be turned on for all the whole of a theatrical performance. But if the bodypack is turned on for some scenes, but not others, this switching is likely to be done between scenes rather than while the performer is on stage during a scene.)

J. RTLS Tag Tracks the Performer

In current practice, the specific movements of a performer, speaker, actor, dancer, or musician in a venue or performance space are often prescribed, scripted, or "blocked out" before the actual performance or show—and the performers practice those specific movements. Lighting fixtures and video cameras are aimed at specific x-y-z positions or areas in the performance venue, where the performers are scripted to be at a specific time in the performance. (In stage performances, sometimes tape is used to "mark" important positions on the stage for the performers to stand when playing a scene.) At that time, the light or video camera is turned on. Everything works as expected when the performer is at the specific place at the specific time, but sometimes the performer is not. This is sometimes called "missing the mark". Then the performer will still be in darkness when the light comes on, or the video from the video camera will not include the performer. An advantage of the present invention is that the lighting fixture or video camera focuses on the RTLS tag affixed to or held by the performer, rather than a specific x,y,z position in the performance venue. Thus, when using the present invention, even if the performer "misses the mark", the performer will be lit, and a video of the performer captured.

K. Tags without Mics are Worn by, or Affixed to, Some Performers

In the above disclosed embodiments, the only people on which lighting fixtures or video cameras are automatically focused by the present invention are those who are expected to speak, either at that moment or at another time during the event or performance. However, some performances such as ballet or ice dancing have no performer speaking. Other performances (such as musical theater) have some performers speaking and others moving about without speaking (e.g., the chorus line of dancers in a musical). Nonetheless, these non-speaking performers may need to be lit or videoed. In an alternative embodiment, the present invention is deployed when fitting a non-speaking performer with a bodypack, activating it, and then muting the audio at the production engineer's control or audio mixing console.

An alternative embodiment places a transmitting RTLS tag on one or more performers, but without having a microphone affixed to, attached to, or affiliated with the tag. The x-y-z position of each tag is located in real time by the RTLS system, the several positions being stored in the RTLS database and used in the control console or production control system to automatically focus lights or cameras on those tags (or rather the people wearing those tags). Some of the performers wear or are fitted with tags affixed to, embedded in, or linked with a microphone, whereas other performers (such as the chorus line) wear (are fitted with) microphone-less tags.

That is, in some embodiments, some tags are worn by, or attached to respective performers who do not need to be mic'ed, and some tags are attached to an object that the respective performers is wearing, carrying, or holding, and the object is a microphone used by the respective performers who are active during a respective scene to capture their respective talking.

L. Incorporation of Preferred Embodiments of Invention into Production Control Systems (I.E., Lighting or Video Control Panel and Control Software)

In the embodiments described above, the present invention is incorporated into the event control console or production control system. The control console or production control system used in these embodiments may be operated manually in real-time, pre-programmed to engage a recorded cue, or coded to step through a series of lighting and camera controls at an activation of a button or switch.

In an alternative embodiment of the invention as incorporated into a production control system, some cues focus the lights and video cameras on specific x-y-z positions, other cues focus the lights and video cameras on (the tags of) specific people, and still other cues present a mix of these features, focusing some lights and cameras on x-y-z positions and other lights and cameras on specific people.

M. Database Tables Used in Event Control Console or Production Control System

FIGS. 11-13 show database tables that may be used to facilitate the event control console or production control system. FIG. 11 shows database 1100 which maintains an association of RTLS tags, each having a unique identifier, with respective performers. The names of the performers are shown in database 1100 for illustration purposes only. The names of the performers may change based on the current roster of performers for a particular performance. It is not necessary to identify the performers by name to implement this embodiment of the present invention. FIG. 12 shows database 1200 which identifies on a scene-by-scene basis which performers require lighting and an active microphone. For example, in scene 1, performer P1 is scripted to talk. Thus, P1 needs lighting and an active microphone. A camera may need to be focused on P1 if the performance is being recorded and/or broadcasted. The database 1100 indicates the RTLS tag that is associated with P1. The RTLS system may then locate the position of the RTLS tag for P1. Together, these databases are used by the event control console or production control system to auto-focus one or more lighting fixtures, cameras (if the performance is being recorded and/or broadcasted), and microphones.

The performers who require either lighting or an active microphone are the performers who are "active" during the respective scenes. In one preferred embodiment, a performer who is active during a respective scene is a performer who is either scripted to talk during the respective scene or who is scripted to dance or perform non-verbal performance art during the respective scene. A performer may do one or both of these actions. Talking includes singing and/or speaking. Non-verbal performance art includes playing a musical instrument. If the audience is supposed to see or hear (even if not visible) a performer to fully understand or appreciate the performance, then the performer is considered to be "active," even if the performer is not talking, dancing or playing a musical instrument. For example, a bystander may be a performer in a particular scene, in which case the bystander needs to be properly lighted.

In an alternative embodiment, the location of multiple RTLS tags may be used to determine where to position a lighting fixture or camera. For example, if there is only one lighting fixture available and three performers who are active in a scene, various algorithms may execute to determine a central location of the performers to position the lighting fixture or camera to best capture all of the performers. The central location may not even be a position of any one of the performers. Consider a simplistic example of three active performers positioned on a stage in a horizontal row and equally spaced from each other. In this example, the lighting fixture would be positioned on the middle performer, assuming that the lighting beam is sufficiently wide to adequately light the two adjacent performers. Likewise, a camera would be focused on the middle performer, assuming that the camera's field of view is sufficiently wide to adequately capture images of the two adjacent performers. More complex algorithms would be necessary in other scenarios, but the principle is the same as the simplistic example.

FIG. 13 shows database 1300 that may be used when there is a plurality of lighting fixtures, and each lighting fixture auto-focuses on a subset of the performers in the venue who are active in the currently performed scene. In this illustrative example, there are two lighting fixtures. The database 1200 indicates which performers are active in the respective scene, and the database 1300 indicates which lighting fixtures are used for the respective performer. A similar scenario may exist for auto-focusing multiple cameras wherein each camera auto-focuses on a subset of the performers in the venue who are active in the currently performed scene. The database 1300 also indicates which cameras are used for the respective performer.

The databases of FIGS. 11-13 allow for real-time (on-the-fly) reassignment of an RTLS tag to a performer in the event of a failure in the RTLS tag. Similarly, if a lighting fixture fails, an immediate reassignment to another lighting fixture can be made, assuming that one is available.

While the databases of FIGS. 11-13 are shown as separate tables, they may be integrated into a single table.

N. RTLS Receiver

The RTLS system relies upon an RTLS tag and an RTLS receiver to locate a position of the RTLS tag in three-dimensional space. Various embodiments of the RTLS receiver were described above. However, to summarize the above-described embodiments, they include an embodiment that uses a plurality of RTLS anchors and another embodiment that uses a wireless mesh network. (Some RTLS systems are hybrid. Their RTLS receivers use both anchors and a wireless mesh network. Their RTLS tags incorporate a variety of chips that utilize a variety of radio frequency protocols including RFID, Bluetooth, and UWB. Embodiments of the present invention are intended to include such hybrid systems, receivers, and tags.) When the RTLS receiver is a plurality of RTLS anchors, the RTLS tag is an RFID tag and the RTLS anchors detect RFID signals emitted by the RFID tag. The position of the RTLS tag in three-dimensional space in the venue is identified by using the signal transmitted from the RTLS tag and received by the RTLS anchors to calculate the position of the RTLS tag in three-dimensional space. When the RTLS receiver is a wireless mesh network (e.g., a cellular wireless mesh network), the RTLS tag is an ultra-wide band device. The position of the RTLS tag in three-dimensional space in the venue is identified by using the signal transmitted from the RTLS tag and received by the wireless mesh network to calculate the position of the RTLS tag in three-dimensional space.

In addition to the embodiments discussed above, there are embodiments using hybrid RTLS systems with receivers that utilize both a mesh network and anchors. In addition to the embodiment discussed above, there are embodiments using hybrid RTLS tags that utilize more than one chip and radio frequency protocol. RTLS 1808 encompasses such hybrid embodiments.

As discussed above, an ultra-wide band device may be a chip embedded into a smartphone such as the U1 is a chip from Apple. Samsung has a corresponding ultra-wide band chip called "Exynos Connect U100" which may be incorporated into smartphones soon. Both of these ultra-wide band devices are currently used in tracking devices such as Apple's AirTag and Samsung's SmartTag+. In the case where it is only necessary to locate a person in a venue or a performer for purposes of auto-focusing a camera or a lighting fixture, any such ultra-wide band device is suitable. In the case where the person or performer needs to use a microphone, one suitable embodiment is to equip the person or performer with a smartphone that contains an ultra-wide band device. In this manner, the microphone of the smartphone may be used by the person or performer.

Consider a performance venue wherein an audience member is enabled to participate in the performance in a limited capacity (e.g., sing-along) due to the purchase of a higher-priced ticket. The audience member pre-registers their ultra-wideband-enabled smartphone so that the venue knows the tracking device ID. At the appropriate time for the participation, the wireless mesh network locates the audience member and can receive signals from the smartphone, including any microphone inputs which may be turned into speech-to-text and displayed on a venue screen or outputted by the sound system of the venue, assuming that the audience member's voice does not detract from the performance.

Wireless mesh networks, such as cellular wireless mesh networks, are well-known in the art and thus are not described in further detail herein. However, certain components of such networks are worthy of mentioning for explanatory purposes. For example, such networks maintain an online, cloud-based database that continuously collects data regarding the relative location of ultra-wide band devices to other ultra-wide band device, and such data allows the network to calculate an absolute location of any particular ultra-wide band device.

O. Flowcharts for Part 2 Preferred Embodiments

FIGS. 14-17 provide flowchart overviews of selected preferred embodiments of the present invention that were discussed above. These embodiments are described below in terms of computer program products but can be equally implemented as methods or apparatus for performing similar functions.

Referring to FIG. 14, as background to the steps shown in FIG. 14, a computer program product is provided for auto-focusing a camera on a person in a venue who is wearing, or carrying, or holding, or speaking into a microphone at the venue. The venue includes a real-time location system (RTLS) having a RTLS tag and an RTLS receiver for locating a position of the RTLS tag in three-dimensional space. The RTLS tag is fixed to the microphone and transmits a signal that is received by the RTLS receiver. The computer program product comprises a computer readable medium tangibly embodying non-transitory computer-executable program instructions thereon that, when executed, cause one or more computing devices to perform the steps shown in FIG. 14, as follows:

Step 1400: Detect when the microphone is active.

Step 1402: Identify, using the RTLS, the position of the RTLS tag in three-dimensional space in the venue by using the signal transmitted from the RTLS tag and received by the RTLS receiver to calculate the position of the RTLS tag in three-dimensional space. The position of the RTLS tag in three-dimensional space in the venue is presumed to be the same position as the microphone that the RTLS tag is fixed to.

Step 1404: Auto-focus the camera on the identified position of the RTLS tag in the three-dimensional space in the venue when the microphone is active. The camera thereby outputs a video signal of an area that is in proximity of the RTLS tag which is presumed to include an image of the person in the venue who is wearing, or carrying, or holding, or speaking into the microphone, having the RTLS tag fixed thereto.

In one alternative embodiment, the RTLS receiver is a wireless mesh network, and the RTLS tag is an ultra-wide band device such as a U1-equipped smartphone or an Apple AirTag. The position of the RTLS tag in three-dimensional space in the venue is thus identified by using the signal transmitted from the RTLS tag and received by the wireless mesh network to calculate the position of the RTLS tag in three-dimensional space. The ultra-wide band device may be embedded in a smartphone and the microphone may be a microphone of the smartphone.

In another alternative embodiment, the RTLS receiver is a plurality of RTLS anchors as described above.

In another alternative embodiment, the live location includes a video monitor and audio system that receive respective input signals from the camera and the microphone, thereby allowing the in-person attendees to view the same live location camera image and hear the same audio signal that are captured by the camera and the microphone.

In one alternative embodiment, the camera auto-focusing further uses face and body detection in the area that is in proximity of the RTLS tag to more accurately ensure that an image of the in-person attendee who is speaking into the microphone having the RTLS tag fixed thereto is included in the video signal.

In one alternative embodiment, the microphone is a wireless microphone.

In another alternative embodiment, the microphone becomes active when it is powered on.

In another alternative embodiment, the microphone becomes active by voice activation.

In an alternative version of the FIG. 14 embodiment, there is no microphone. Instead, the RTLS tag is worn by, or attached to, a person in the venue, or is attached to an object that the person in the venue is wearing, carrying, or holding (other than a microphone). For shorthand, these scenarios are collectively referred to as defining an "RTLS-tagged person." In this alternative version, it is not necessary to detect when a microphone is active. Instead, the position of the RTLS tag in three-dimensional space in the venue is presumed to be the position of the RTLS-tagged person. The camera is then auto-focused on the identified position of the RTLS tag in the three-dimensional space in the venue. The camera thereby outputs a video signal of an area that is in proximity of the RTLS tag, which is presumed to include an image of the RTLS-tagged person. The alternative embodiments of the FIG. 14 embodiment described above (except for the microphone features) operate in a similar manner for this alternative version.

Methods for performing the steps shown in FIG. 14 and the alternative embodiments of FIG. 14 are also provided.

Figure 15:
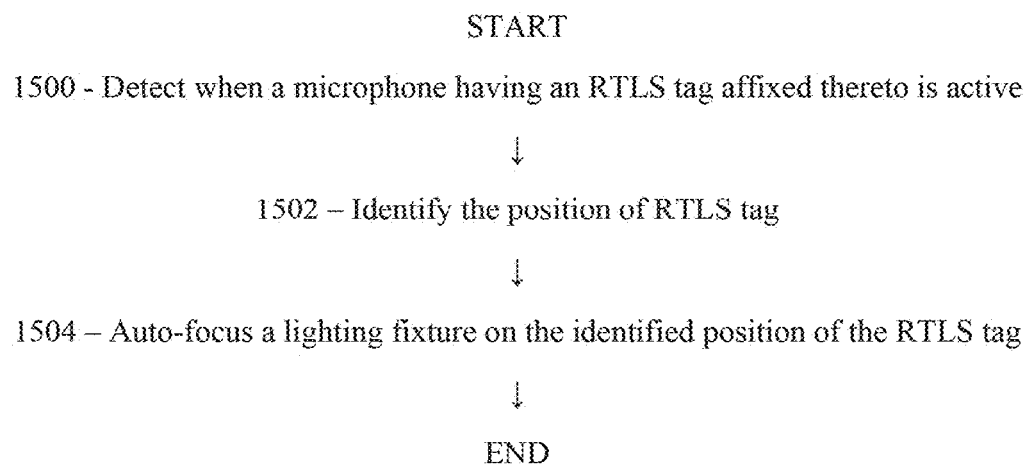

Referring to FIG. 15, as background to the steps shown in FIG. 15, a computer program product is provided for auto-focusing a lighting fixture on a person in a venue who is wearing, or carrying, or holding, or speaking into a microphone at the venue. The venue includes a real-time location system (RTLS) having a RTLS tag and an RTLS receiver for locating a position of the RTLS tag in three-dimensional space. The RTLS tag is fixed to the microphone and transmits a signal that is received by the RTLS receiver. The computer program product comprises a computer readable medium tangibly embodying non-transitory computer-executable program instructions thereon that, when executed, cause one or more computing devices to perform the steps shown in FIG. 15, as follows:

Step 1500: Detect when the microphone is active.

Step 1502: Identify, using the RTLS, the position of the RTLS tag in three-dimensional space in the venue by using the signal transmitted from the RTLS tag and received by the RTLS receiver to calculate the position of the RTLS tag in three-dimensional space. The position of the RTLS tag in three-dimensional space in the venue is presumed to be the same position as the microphone that the RTLS tag is fixed to.

Step 1504: Auto-focus the lighting fixture on the identified position of the RTLS tag in three-dimensional space in the venue when the microphone is active. The lighting fixture thereby illuminates an area that is in proximity of the RTLS tag which is presumed to include the person in the venue who is wearing, or carrying, or holding, or speaking into the microphone, having the RTLS tag fixed thereto.

In one alternative embodiment of FIG. 15, the RTLS receiver is a wireless mesh network, and the RTLS tag is an ultra-wide band device such as a U1-equipped smartphone or an Apple AirTag. The position of the RTLS tag in three-dimensional space in the venue is thus identified by using the signal transmitted from the RTLS tag and received by the wireless mesh network to calculate the position of the RTLS tag in three-dimensional space. The ultra-wide band device may be embedded in a smartphone and the microphone may be a microphone of the smartphone.

In another alternative embodiment of FIG. 15, the RTLS receiver is a plurality of RTLS anchors as described above.

In an alternative version of FIG. 15, there is no microphone. Instead, the position of the RTLS tag in three-dimensional space in the venue is presumed to be the position of an RTLS-tagged person. The lighting fixture is then auto-focused on the identified position of the RTLS tag in the three-dimensional space in the venue. The lighting fixture thereby illuminates an area that is in proximity of the RTLS-tagged person. The alternative embodiments of the FIG. 15 embodiment described above (except for the microphone features) operate in a similar manner for this alternative version.

In an alternative embodiment, the system includes not only a lighting fixture but also a camera adjacent to or in close proximity to the lighting fixture. Both the lighting fixture and the camera are auto-focused on the RTLS tag by the RTLS system. The camera auto-focuses further using face and body detection in the area that is in proximity of the RTLS tag to more accurately determine the position of the person in three-dimensional space. AR software incorporated into the face and body detection is used to frame the video feed around the person's face (or alternatively, the AR software is used to frame the video feed around the person's torso or entire body). In any event, the difference in coordinates between x-y position of the RTLS tag as determined by the RTLS system (and measured with respect to the center of this AR adjusted video frame) and the actual center of the video frame (as adjusted by the AR software) forms a translation vector. This translation vector is calculated by the system in real time, and applied to the location of the RTLS tag as a position adjustment. (The term "position adjustment" is used interchangeably with the term "translation vector".) The new more accurate location (the position adjusted identified position of the RTLS tag) is used to auto-focus the lighting fixture. This way the system more accurately lights a person who is moving in the venue. In an alternative embodiment, the camera is fixedly attached to the lighting fixture.

Figure 19:
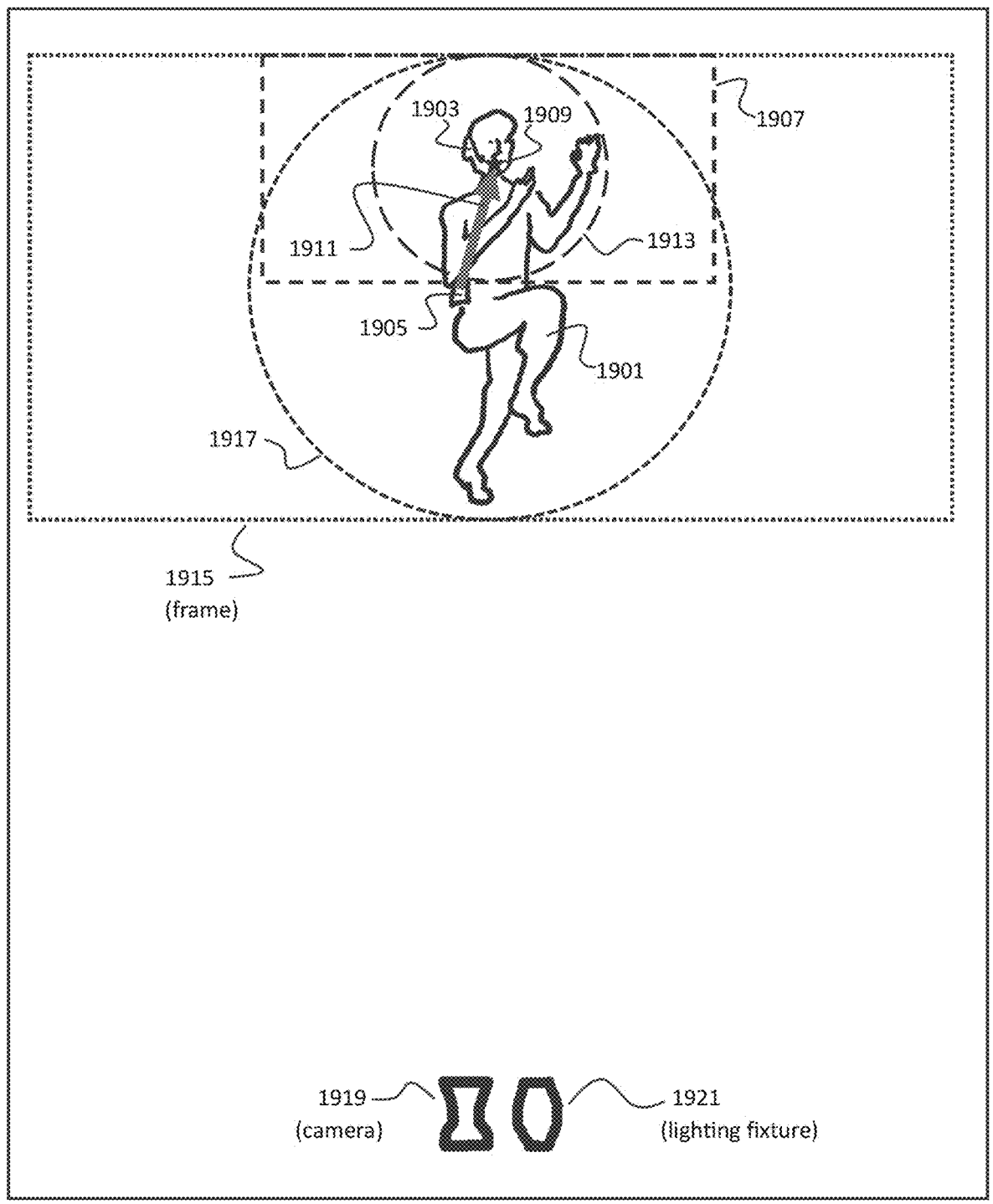
FIG. 19 is a diagram of a venue showing a performer who is performing in the venue which includes both a camera and a lighting fixture that are auto-focused on the performer in accordance with a preferred embodiment of the present invention.

Consider now FIG. 19, in which performer 1901 is performing (singing and dancing) in venue 1900. The venue includes both a camera 1919 and a lighting fixture 1921 that are auto-focused using the present invention. The camera (1919) is attached to the lighting fixture (1921)—that is, both are affixed to the same PTZ yoke. (Alternatively, they are in close proximity.) The performer, 1901, is fitted with a Madonna mic, 1903, that transmits audio wirelessly to the venue sound system using a bodypack, 1905, attached to the performer's clothing at the performer's waist. The bodypack (1905) contains an RTLS tag (not shown).

Camera 1919 is auto-focused on the RTLS tag using the present invention. Face detection software (or more exactly in FIG. 19, upper torso detection) analyzes the video feed from camera 1919 and reframes the video feed as centered on a point (the star at 1909) within frame 1907. The translation vector (i.e., the position adjustment) is shown as a grey arrow 1911. It is the vector from the bodypack 1905 to the center (1909) of frame 1907.

Without the use of the translation vector, the lighting fixture (1921) would focus on the bodypack (1909). Instead, programming the system to use face detection (upper torso detection) from the camera (1919) to focus this lighting fixture (1921) does two things. First, it sends the translation vector (calculated via the camera AR software) to the lighting fixture control software, so that lighting fixture (1921) focuses on 1909. Second it instructs the lighting fixture that the light beam illuminates the performer's face/upper torso rather than the performer's whole body—that is the light beam from the lighting fixture (circle 1913) fits into the frame of the video feed. (This is the zoom part of the PTZ fixture.) Alternatively, the radius of the light beam is set by the production control system, using methods known to those skilled in the art.

In contrast, if the production control system chooses body detection instead of face detection, the AR software analyzing the video feed from camera, 1919, would re-frame the video using frame 1915. (The center of frame 1915 is not shown. Note, however, that this frame is not centered exactly on the RTLS tag in the bodypack 1905.) When the system is programmed to use body detection, so that the video feed from camera 1919 is re-framed using 1915, the lighting fixture 1921 illuminates the entire body of the performer 1901—illustrated by circle 1917, which has the same center as frame 1915.

In an alternative embodiment, the system is not restricted to just detect a specific body part (such as, but not limited to, the face, the upper torso, or whole body). Rather the system provides smooth transitions from different choices of framing. For example, if the cue entered into a production control system is to first illuminate a performer's whole body, and then at the end of the song, smoothly zoom in to illuminate just the performer's upper torso, the system sends the lighting fixture the necessary adjustments to smoothly pan, tilt, and zoom the lighting fixture.

When the camera is not attached to or in close proximity to the lighting fixture, a camera system of at least two cameras properly positioned around the venue (as known by those skilled in the art) is needed to calculate a three-dimensional position adjustment from the x-y-z location of the RTLS tag to the x-y-z framing center for the face or body being detected.

The x-y-z position adjustment is based on the x-y-z position where two lines intersect—or where they are closest (i.e., where the distance between them is minimized). To find this, construct a line from each camera through the center of its AR adjusted video frame. If they intersect that is the adjusted position. If they do not, find the point on each line that is closest to the other line, then the midpoint of a line connecting these two points is the x-y-z position adjustment. (Each camera only provides a two-dimensional translation vector providing a position adjustment from the RTLS tag to the AR software identified portion of the body within the viewed plane of the camera framing. The three-dimensional translation vector needs to be constructed from them.) This calculation produces an x-y-z three-dimensional translation vector which can be used to more accurately aim a lighting fixture positioned anywhere in the venue.

Figure 20:
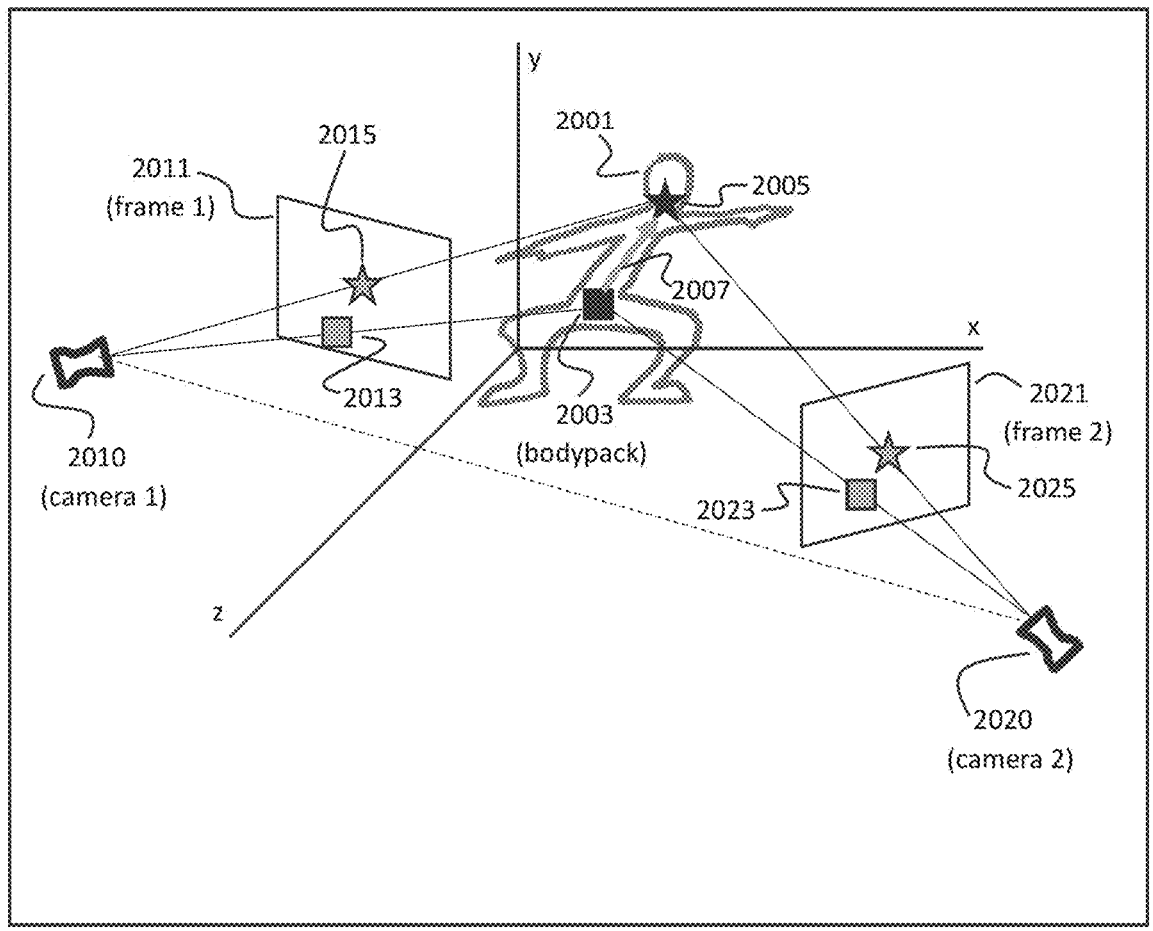
FIG. 20 is a diagram of a venue showing two cameras using face or body detection to frame their video feeds of a performer where the center of the video frame is not the RTLS tag which is attached to the performer.

Consider now FIG. 20 of a venue 2000, with performer 2001. Affixed to the performer is RTLS tag 2003 represented by a small black square. The RTLS tag may be embedded in a body pack. A set of two cameras (2010 and 2020) first use the present invention to each auto-focus on the RTLS tag (2003), thereby giving a proximate view of the performer 2001. Each camera then applies face and body detection (more precisely, in the illustrated case of FIG. 20, upper torso detection) to adjust and more precisely frame the video. This would be frame 1 (2011) for camera 1 (2010) and frame 2 (2021) for camera 2 (2020). The black star shows the approximate location on performer 2001 upon which each camera frames its video. This is shown as the grey star 2015 in frame 1 (2011) for camera 1 (2010) and the grey star 2025 in frame 2 (2021) for camera 2 (2020). Also shown in each frame is a grey square. This is the image of the location in the video feed of the RTLS tag (even if the tag is hidden).

This is tag "image" 2013 in frame 1 (2011) for camera 1 (2010) and tag "image" 2023 in frame 2 (2021) for camera 2 (2020).

The RTLS system outputs the x-y-z location of the RTLS tag (2003) to this embodiment of the present invention. The x-y-z locations of the two cameras (2010 and 2020) are also known—they had been entered into the embodiment during setup as described previously. Two key angles are formed by the lines from the tag to the camera to the focal star. These are determined using the relative location of the "image" of the tag and center of the frame. With these locations and angles, the precise location of the star can be determined; and the translation vector (or position adjustment), 2007, in the three-dimensional space of the venue is calculated. This position adjustment is used to auto-focus a lighting fixture on the star (2005) wherever the lighting fixture is located in the venue, as long as the star is not located along the line between the two cameras.

Having the star located along the line between two cameras is easy to avoid in a traditional performance on a proscenium stage, but may occur when the performer moves into the audience or performs on a portion of the stage projected into or above the audience. It is most likely to occur when the performance venue has been designed for a "theater in the round" or an arena with the audience surrounding the performance stage. Then additional cameras would be needed to ensure triangulation from at least two of them.

However the position adjustment is obtained (one camera or more), the software may provide a smoothing function so that the video frame (or spot light) does not appear to be jerking around.

In one alternative embodiment, the microphone is a wireless microphone. In another alternative embodiment, the microphone becomes active when it is powered on. In another alternative embodiment, the microphone is activated by voice activity detection.

Methods for performing the steps shown in FIG. 15 and the alternative embodiments of FIG. are also provided.

Figure 16:
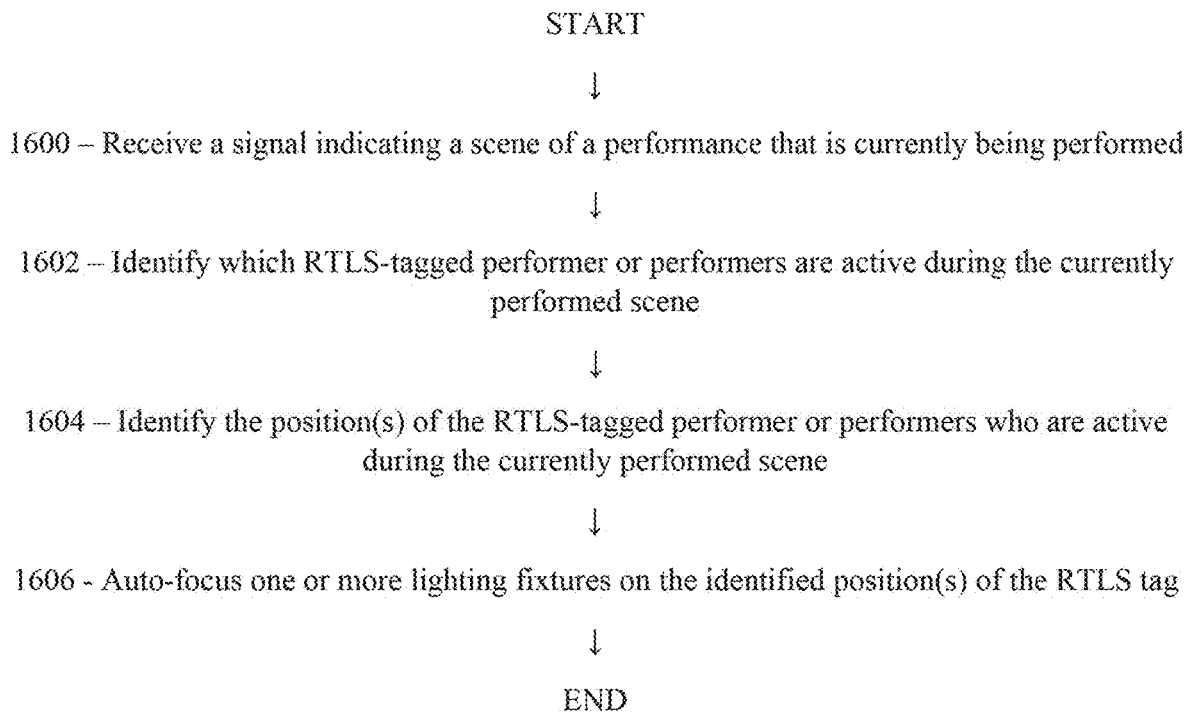

Referring to FIG. 16, as background to the steps shown in FIG. 16, a computer program product is provided for auto-focusing one or more lighting fixtures on selected persons in a venue. The selected persons in the venue are performers of a performance occurring at the venue. The venue includes a real-time location system (RTLS) having a plurality of RTLS tags and an RTLS receiver for locating a position of each of the RTLS tags in three-dimensional space. Each of the RTLS tags is worn by, or attached to, one of the performers, or is attached to an object that one of the performers is wearing, carrying, or holding. That is, each of the RTLS tags is associated with an "RTLS-tagged performer." Each of the RTLS tags transmits a signal including a unique RTLS tag identifier that is received by the RTLS receiver. One or more databases stores (i) a plurality of scenes of the performance, (ii) the performer or performers who are "active" during the respective scenes, and (iii) the unique RTLS tag identifier associated with each performer. The meaning of a performer being "active" is the same meaning as discussed above. The computer program product comprises a computer readable medium tangibly embodying non-transitory computer-executable program instructions thereon that, when executed, cause one or more computing devices to perform the steps shown in FIG. 16, as follows:

Step 1600: Receive at a controller a signal indicating the scene that is currently being performed.

Step 1602: Identify, using the controller and the database of the performer or performers who are active during respective scenes, which performer or performers are active during the currently performed scene.

Step 1604: Identify, using the RTLS, the position of the RTLS tags in three-dimensional space in the venue of the performer or performers who are active during the currently performed scene by using (i) the signals transmitted from the RTLS tags and received by the RTLS receiver to calculate the position of the RTLS tags in three-dimensional space, and (ii) the database that stores the unique RTLS tag identifier associated with each performer. The identified positions of the RTLS tags in three-dimensional space in the venue are presumed to be the same positions as the performers associated with the respective RTLS tags.

Step 1606: Auto-focus the one or more lighting fixtures on the identified positions of the RTLS tags in three-dimensional space in the venue during the currently performed scene. The one or more lighting fixtures thereby (i) illuminate areas that are in proximity of the identified RTLS tags which are presumed to include the performers in the venue who are active in the currently performed scene, and (ii) follow the respective RTLS-tagged performers during any movement by the respective performers during the currently performed scene.

In one alternative embodiment of FIG. 16, the RTLS receiver is a wireless mesh network, and the RTLS tag is an ultra-wide band device such as a U1-equipped smartphone or an Apple AirTag. The position of the RTLS tag in three-dimensional space in the venue is thus identified by using the signal transmitted from the RTLS tag and received by the wireless mesh network to calculate the position of the RTLS tag in three-dimensional space. The ultra-wide band device may be embedded in a smartphone.

In another alternative embodiment of FIG. 16, the RTLS receiver is a plurality of RTLS anchors as described above.

In one preferred embodiment of FIG. 16, a performer who is active during a respective scene is a performer who is either scripted to talk during the respective scene or who is scripted to dance or perform non-verbal performance art during the respective scene. A performer may do one or both of these actions. As discussed above, talking includes singing and/or speaking, and non-verbal performance art includes playing a musical instrument.

In one preferred embodiment of FIG. 16, there are a plurality of lighting fixtures, and each lighting fixture auto-focuses on a subset of the performers in the venue who are active in the currently performed scene. In this manner, the same lighting fixture may illuminate multiple performers who are in close proximity to one another in a particular scene.

In one preferred embodiment of FIG. 16, one or more of the RTLS tags is attached to an object that one of the performers is wearing, carrying, or holding, and the object is a microphone. The microphone is used by the performers who are active during a respective scene to capture their respective talking. In the case wherein the RTLS tag is an ultra-wide band device embedded in a smartphone, the microphone may be a microphone of the smartphone.

Methods for performing the steps shown in FIG. 16 and the alternative embodiments of FIG. 16 are also provided.

Figure 17:
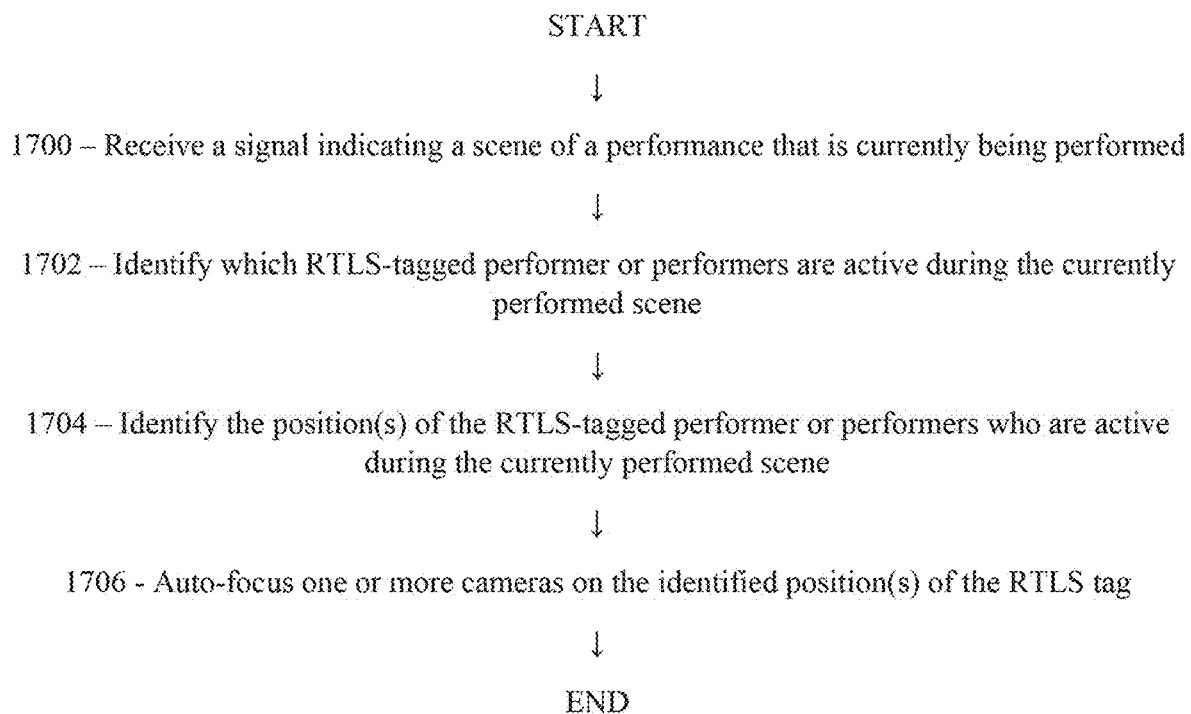

Referring to FIG. 17, as background to the steps shown in FIG. 17, a computer program product is provided for auto-focusing one or more cameras on selected persons in a venue. The selected persons in the venue are performers of a performance occurring at the venue. The venue includes a real-time location system (RTLS) having a plurality of RTLS tags and an RTLS receiver for locating a position of each of the RTLS tags in three-dimensional space. Each of the RTLS tags is worn by, or attached to, one of the performers, or is attached to an object that one of the performers is wearing, carrying, or holding. That is, each of the RTLS tags is associated with an RTLS-tagged performer. Each of the RTLS tags transmits a signal including a unique RTLS tag identifier that is received by the RTLS receiver. One or more databases stores (i) a plurality of scenes of the performance, (ii) the performer or performers who are "active" during the respective scenes, and (iii) the unique RTLS tag identifier associated with each performer. The meaning of a performer being "active" is the same meaning as discussed above. The computer program product comprises a computer readable medium tangibly embodying non-transitory computer-executable program instructions thereon that, when executed, cause one or more computing devices to perform the steps shown in FIG. 16, as follows:

Step 1700: Receive at a controller a signal indicating the scene that is currently being performed.

Step 1702: Identify, using the controller and the database of the performer or performers who are active during respective scenes, which performer or performers are active during the currently performed scene.

Step 1704: Identify, using the RTLS, the position of the RTLS tags in three-dimensional space in the venue of the performer or performers who are active during the currently performed scene by using (i) the signals transmitted from the RTLS tags and received by the RTLS receiver to calculate the position of the RTLS tags in three-dimensional space, and (ii) the database that stores the unique RTLS tag identifier associated with each performer. The identified positions of the RTLS tags in three-dimensional space in the venue are presumed to be the same positions as the performers associated with the respective RTLS tags.

Step 1706: Auto-focus the one or more cameras on the identified positions of the RTLS tags in three-dimensional space in the venue during the currently performed scene. The one or more cameras thereby (i) outputt a video signal of an area that is in proximity of the identified RTLS tags which are presumed to include the performers in the venue who are active in the currently performed scene, and (ii) follow the respective performers during any movement by the respective performers during the currently performed scene.

In one alternative embodiment of FIG. 17, the RTLS receiver is a wireless mesh network, and the RTLS tag is an ultra-wide band device such as a U1-equipped smartphone or an Apple AirTag. The position of the RTLS tag in three-dimensional space in the venue is thus identified by using the signal transmitted from the RTLS tag and received by the wireless mesh network to calculate the position of the RTLS tag in three-dimensional space. The ultra-wide band device may be embedded in a smartphone.

In another alternative embodiment of FIG. 17, the RTLS receiver is a plurality of RTLS anchors as described above.

In one preferred embodiment of FIG. 17, a performer who is active during a respective scene is a performer who is either scripted to talk during the respective scene or who is scripted to dance or perform non-verbal performance art during the respective scene. A performer may do one or both of these actions. As discussed above, talking includes singing and/or speaking, and non-verbal performance art includes playing a musical instrument.

In one preferred embodiment of FIG. 17, there are a plurality of lighting fixtures, and each lighting fixture auto-focuses on a subset of the performers in the venue who are active in the currently performed scene. In this manner, the same lighting fixture may illuminate multiple performers who are in close proximity to one another in a particular scene.

In one preferred embodiment of FIG. 17, one or more of the RTLS tags is attached to an object that one of the performers is wearing, carrying, or holding, and the object is a microphone. The microphone is used by the performers who are active during a respective scene to capture their respective talking. In the case wherein the RTLS tag is an ultra-wide band device embedded in a smartphone, the microphone may be a microphone of the smartphone.

P. System Architecture for Embodiments in FIGS. 9-17

Figure 18:
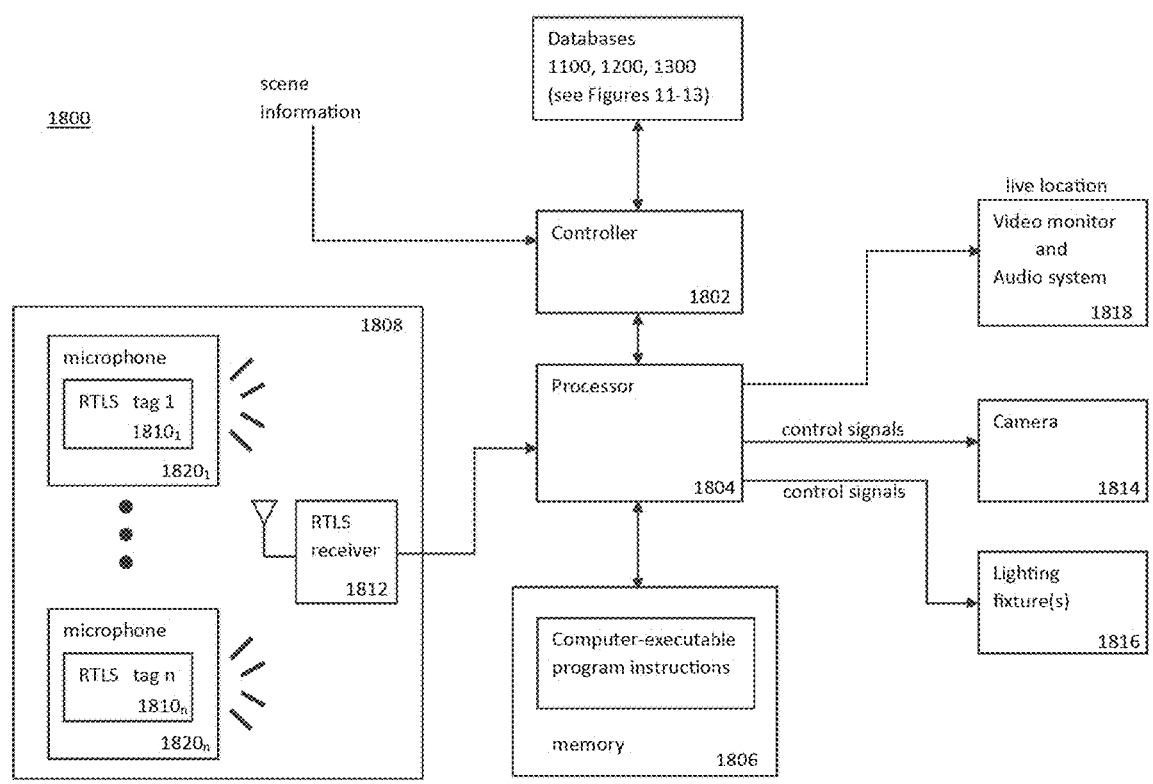
FIG. 18 is a schematic diagram for implementing preferred embodiments of the present invention shown in FIGS. 9-17.

FIG. 18 is a schematic diagram of a system 1800 for implementing preferred embodiments of the present invention shown in FIGS. 9-17. Certain elements of the system 1800 are only used for some of the embodiments of FIGS. 9-17. FIG. 18 is a consolidated schematic diagram of all of the components used for each of the embodiments of FIGS. 9-17. The system 1800 includes controller 1802 which receives input from databases 1100, 1200, 1300 of FIGS. 11-13, as well as scene information, to determine the tag identifiers of the currently active performers.

This information is provided to processor 1804 which may be part of the controller 1802 or a separate component. The processor 1804 executes the various embodiments of computer-executable program instructions stored in memory 1806, as discussed above. The processor 1804 receives RTLS information from RTLS system 1808 which includes one or more RTLS tags $1810_1$-$1810_n$ and RTLS receiver 1812. The processor 1804 uses the information from the controller 1802 and the RTLS system 1808 to generate control signals for camera(s) 1814 and lighting fixture(s) 1816, as well as to generate an output signal to a video monitor and audio system 1818 at a live location, where appropriate. FIG. 18 shows one of the preferred embodiments wherein each of the RTLS tags are fixed to a respective microphone $1820_1$-$1820_n$. However, as discussed above, some embodiments described in Part 2 of the disclosure do not necessarily require microphones as part of their system. That is, in some instances, an RTLS-tagged person or an RTLS-tagged performer does not require use of a microphone.

Q. Computer-Related Components and Software Elements

Similar to Part 1 of the Disclosure, the preferred embodiments in Part 2 of the Disclosure can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

Similar to Part 1 of the Disclosure, the storage media in Part 2 of the Disclosure can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

Similar to Part 1 of the Disclosure, the computer(s)/ processor(s) used in the preferred embodiments of Part 2 of the Disclosure may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Similar to Part 1 of the Disclosure, such computers/processors used in the preferred embodiments of Part 2 of the Disclosure may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Similar to Part 1 of the Disclosure, the various methods or processes used in the preferred embodiments of Part 2 of the Disclosure may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Similar to Part 1 of the Disclosure, the terms "program" or "software" are used in the preferred embodiments of Part 2 of the Disclosure in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Similar to Part 1 of the Disclosure, in the preferred embodiments in Part 2 of the Disclosure computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Similar to Part 1 of the Disclosure, data structures in the preferred embodiments in Part 2 of the Disclosure may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

Similar to Part 1 of the Disclosure, preferred embodiments in Part 2 of the Disclosure may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A computer program product for auto-focusing one or more lighting fixtures on selected persons in a venue, wherein the selected persons in the venue are performers of a performance occurring at the venue, the venue including a real-time location system (RTLS) having a plurality of RTLS tags and a RTLS receiver for locating a position of each of the RTLS tags in three-dimensional space, wherein each of the RTLS tags is worn by, or attached to, one of the performers, or is attached to an object that one of the performers is wearing, carrying, or holding, and each of the RTLS tags transmits a signal including a unique RTLS tag identifier that is received by the RTLS receiver, and wherein one or more databases stores (i) a plurality of scenes of the performance, (ii) the performer or performers who are active during the respective scenes, and (iii) the unique RTLS tag identifier associated with each performer, the computer program product comprising a computer readable medium tangibly embodying non-transitory computer-executable program instructions thereon that, when executed, cause one or more computing devices to:
    (a) receive at a controller a signal indicating the scene that is currently being performed;
    (b) identify, using the controller and the database of the performer or performers who are active during respective scenes, which performer or performers are active during the currently performed scene;
    (c) identify, using the RTLS, the position of the RTLS tags in three-dimensional space in the venue of the performer or performers who are active during the currently performed scene by using (i) the signals transmitted from the RTLS tags and received by the RTLS receiver to calculate the position of the RTLS tags in three-dimensional space, and (ii) the database that stores the unique RTLS tag identifier associated with each performer,
        wherein the identified positions of the RTLS tags in three-dimensional space in the venue are presumed to be the same positions as the performers associated with the respective RTLS tags; and
    (d) auto-focus the one or more lighting fixtures on the identified positions of the RTLS tags in three-dimensional space in the venue during the currently performed scene, the one or more lighting fixtures thereby (i) illuminating areas that are in proximity of the identified RTLS tags which are presumed to include the performers in the venue who are active in the currently performed scene, and (ii) following the respective performers during any movement by the respective performers during the currently performed scene.

2. The computer program product of claim 1 wherein the RTLS receiver is a wireless mesh network, and the RTLS tag is an ultra-wide band device, and wherein the position of the RTLS tag in three-dimensional space in the venue is identified by using the signal transmitted from the RTLS tag and received by the wireless mesh network to calculate the position of the RTLS tag in three-dimensional space.

3. The computer program product of claim 1 wherein the RTLS receiver is a plurality of RTLS anchors, and the RTLS tag is an RFID tag, and the RTLS anchors detect RFID signals emitted by the RFID tag, and wherein the position of the RTLS tag in three-dimensional space in the venue is identified by using the signal transmitted from the RTLS tag and received by the RTLS anchors to calculate the position of the RTLS tag in three-dimensional space.

4. The computer program product of claim 1 wherein a performer who is active during a respective scene is a performer who is scripted to talk during the respective scene.

5. The computer program product of claim 1 wherein a performer who is active during a respective scene is a performer who is scripted to dance or perform non-verbal performance art during the respective scene.

6. The computer program product of claim 1 wherein there are a plurality of lighting fixtures, and each lighting fixture auto-focuses on a subset of the performers in the venue who are active in the currently performed scene.

7. The computer program product of claim 1 wherein one or more of the RTLS tags is attached to an object that one of the performers is wearing, carrying, or holding, and wherein the object is a microphone, and wherein the microphone is used by the performers who are active during a respective scene to capture their respective talking.

8. An automated method for auto-focusing one or more lighting fixtures on selected persons in a venue, wherein the selected persons in the venue are performers of a performance occurring at the venue, the venue including a real-time location system (RTLS) having a plurality of RTLS tags and a RTLS receiver for locating a position of each of the RTLS tags in three-dimensional space, wherein each of the RTLS tags is worn by, or attached to, one of the performers, or is attached to an object that one of the performers is wearing, carrying, or holding, and each of the RTLS tags transmits a signal including a unique RTLS tag identifier that is received by the RTLS receiver, and wherein one or more databases stores (i) a plurality of scenes of the performance, (ii) the performer or performers who are active during the respective scenes, and (iii) the unique RTLS tag identifier associated with each performer, the method comprising:
  (a) receiving at a controller a signal indicating the scene that is currently being performed;
  (b) identifying, using the controller and the database of the performer or performers who are active during respective scenes, which performer or performers are active during the currently performed scene;
  (c) identifying, using the RTLS, the position of the RTLS tags in three-dimensional space in the venue of the performer or performers who are active during the currently performed scene by using (i) the signals transmitted from the RTLS tags and received by the RTLS receiver to calculate the position of the RTLS tags in three-dimensional space, and (ii) the database that stores the unique RTLS tag identifier associated with each performer,
  wherein the identified positions of the RTLS tags in three-dimensional space in the venue are presumed to be the same positions as the performers associated with the respective RTLS tags; and
  (d) auto-focusing the one or more lighting fixtures on the identified positions of the RTLS tags in three-dimensional space in the venue during the currently performed scene, the one or more lighting fixtures thereby (i) illuminating areas that are in proximity of the identified RTLS tags which are presumed to include the performers in the venue who are active in the currently performed scene, and (ii) following the respective performers during any movement by the respective performers during the currently performed scene.

9. The method of claim 8 wherein the RTLS receiver is a wireless mesh network, and the RTLS tag is an ultra-wide band device, and wherein the position of the RTLS tag in three-dimensional space in the venue is identified by using the signal transmitted from the RTLS tag and received by the wireless mesh network to calculate the position of the RTLS tag in three-dimensional space.

10. The method of claim 8 wherein the RTLS receiver is a plurality of RTLS anchors, and the RTLS tag is an RFID tag, and the RTLS anchors detect RFID signals emitted by the RFID tag, and wherein the position of the RTLS tag in three-dimensional space in the venue is identified by using the signal transmitted from the RTLS tag and received by the RTLS anchors to calculate the position of the RTLS tag in three-dimensional space.

11. The method of claim 8 wherein a performer who is active during a respective scene is a performer who is scripted to talk during the respective scene.

12. The method of claim 8 wherein a performer who is active during a respective scene is a performer who is scripted to dance or perform non-verbal performance art during the respective scene.

13. The method of claim 8 wherein there are a plurality of lighting fixtures, and each lighting fixture auto-focuses on a subset of the performers in the venue who are active in the currently performed scene.

14. The method of claim 8 wherein one or more of the RTLS tags is attached to an object that one of the performers is wearing, carrying, or holding, and wherein the object is a microphone, and wherein the microphone is used by the performers who are active during a respective scene to capture their respective talking.

\* \* \* \* \*